(12) United States Patent
Boyd et al.

(10) Patent No.: US 9,690,038 B2
(45) Date of Patent: Jun. 27, 2017

(54) SYSTEMS AND METHODS FOR CONTROLLING BACKLIGHT OUTPUT CHARACTERISTICS

(75) Inventors: Gary T. Boyd, Woodbury, MN (US); Ji-Young Choi, Gyeonggi-Do (KR); John T. Cowher, Austin, TX (US); Yasuyuki Daigo, Machida (JP); Kenneth A. Epstein, St. Paul, MN (US); Shandon D. Hart, Corning, NY (US); Charles D. Hoyle, Stillwater, MN (US); Min-Young Ji, Suwon (JP); Chideuk Kim, Gyunggi-Do (KR); Byung-Soo Ko, Seoul (KR); Keith M. Kotchick, St. Paul, MN (US); Wade D. Kretman, Afton, MN (US); David J. Lamb, Oakdale, MN (US); Seo-Hern Lee, Kyonggi-Do (KR); Eric W. Nelson, Stillwater, MN (US); Youngsoo Park, Kyonggi-Do (KR); Xianneng Peng, Shanghai (CN); Yuji Saito, Sagamihara (JP); Naoya Taniguchi, Sagamihara (JP); John F. Van Derlofske, III, Minneapolis, MN (US); Leland R. Whitney, St. Paul, MN (US); Xingpeng Yang, Shanghai (CN); Yang Yu, Suzhou (CN); Jie Zhou, Shanghai (CN); Rui Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 1719 days.

(21) Appl. No.: 12/664,855

(22) PCT Filed: Jun. 20, 2008

(86) PCT No.: PCT/US2008/067696
§ 371 (c)(1),
(2), (4) Date: Feb. 22, 2011

(87) PCT Pub. No.: WO2009/002853
PCT Pub. Date: Dec. 31, 2008

(65) Prior Publication Data
US 2011/0261584 A1    Oct. 27, 2011

Related U.S. Application Data

(60) Provisional application No. 60/936,845, filed on Jun. 22, 2007.

(51) Int. Cl.
*F21V 7/04* (2006.01)
*F21V 8/00* (2006.01)
*G02F 1/1335* (2006.01)

(52) U.S. Cl.
CPC .......... *G02B 6/0053* (2013.01); *G02B 6/0055* (2013.01); *G02F 2001/133607* (2013.01); *Y10T 29/49002* (2015.01)

(58) Field of Classification Search
CPC ..................... G02B 6/0053; G02F 1/133615
USPC ........ 362/351, 607, 608, 616–620, 627, 628
See application file for complete search history.

(56) References Cited

U.S. PATENT DOCUMENTS

| | | |
|---|---|---|
| 4,298,249 A | 11/1981 | Gloor |
| 5,128,787 A | 7/1992 | Blonder |
| D360,201 S | 7/1995 | Nelson |
| 5,467,208 A | 11/1995 | Kokawa |

(Continued)

FOREIGN PATENT DOCUMENTS

| | | |
|---|---|---|
| JP | 3621959 | 6/1997 |
| JP | 3422917 | 5/1999 |

(Continued)

OTHER PUBLICATIONS

Anon, "Lamination with Stanylan Polyethylene", Poliplasti. Plast. Rinf., Nov. 1970, vol. 18, No. 156, pp. 16-24.

(Continued)

*Primary Examiner* — Andrew Coughlin
*Assistant Examiner* — Meghan Ulanday
(74) *Attorney, Agent, or Firm* — Robert S. Moshrefzadeh

(57) ABSTRACT

A backlight includes a light source and one or more light recycling films. The light source generates light that exits the light source with an angular exit distribution. The light recycling films are oriented in relation to the light source so that the prism peaks of the recycling films are oriented away from the light source. The recycling films have a range of optimal incident angles that allow light to pass through the recycling films without recycling. The components of the light source, the characteristics of the recycling films, or both, are configured to control the overlap between the exit distribution of the light source and the optimal incident angle range of the recycling films.

45 Claims, 45 Drawing Sheets

(56) References Cited

U.S. PATENT DOCUMENTS

| | | | |
|---|---|---|---|
| 5,529,741 | A | 6/1996 | Rubin |
| D372,710 | S | 8/1996 | Nelson |
| 5,771,328 | A | 6/1998 | Wortman |
| 6,011,602 | A | 1/2000 | Miyashita |
| 6,204,903 | B1 | 3/2001 | Hayashi |
| 6,354,709 | B1 | 3/2002 | Campbell |
| 6,384,881 | B1 | 5/2002 | Arai |
| 6,692,133 | B2 | 2/2004 | Katsu |
| 7,545,569 | B2 * | 6/2009 | Cassarly ........... 359/628 |
| 2003/0087069 | A1 | 5/2003 | Winiker |
| 2005/0024754 | A1 | 2/2005 | Epstein |
| 2005/0259939 | A1 | 11/2005 | Rinko |
| 2006/0045989 | A1 | 3/2006 | Minami |
| 2006/0210726 | A1 | 9/2006 | Jones |

FOREIGN PATENT DOCUMENTS

| | | |
|---|---|---|
| JP | 10-2002-0018219 | 3/2002 |
| KR | 10-1998-0020174 | 6/1998 |
| KR | 10-2003-0052612 | 6/2003 |
| KR | 10-2005-0070457 | 7/2005 |

OTHER PUBLICATIONS

Ishiyama, "Effects of Humidity on Young's Modulus in Poly(methyl methacrylate)", Journal of Polymer Science: Part B: Polymer Physics, 2002, vol. 40, pp. 460-465.

Lazzarini, "Large Board Lamination Technique", IBM Technical Disclosure Bulletin, Jan. 1985, vol. 27, No. 8, pp. 4906-4907.

Ma, "Poly(methyl methacrylate) Based Ionomers. 1. Dynamic Mechanical Properties and Morphology", Macromolecules, 1995, vol. 28, pp. 3953-3962.

Ma, "Poly(methyl methacrylate) Ionomers. 2. Deformation Modes Under Simple Tension", Macromolecules, 1995, vol. 28, pp. 5526-5534.

Shen, "Effects of Sorbed Water on Properties of Low and High Molecular Weight PMMA: 1. Deformation and Fracture Behaviour", Polymer, Apr. 1985, vol. 26, pp. 511-518.

Siitonen, "Coupling of Light from an LED into a Thin Light Guide by Diffractive Gratings," Appl. Opt., Oct. 2004, vol. 43, No. 30, pp. 5631-5636.

Smith, "The Effect of Water on the Tensile Yield of Polystyrene", Polymer, Sep. 1982, vol. 23, pp. 1540-1543.

Wonch, "Industrial Lamination, Processes and Adhesives", Polymers, Laminations, and Coatings, and Extrusions Division Conference., Chemical products group, Tappi Place Conf., 1984, pp. 174-177.

Yang Xingpeng, "Research on Backlight System of Liquid Crystal Displays", Diss. Tsinghua University, Apr. 2006.

International Search Report for PCT/US2008/067696, 3 pages.

Written Opinion of the ISA for International Application PCT/US2008/067696, 4 pages.

* cited by examiner

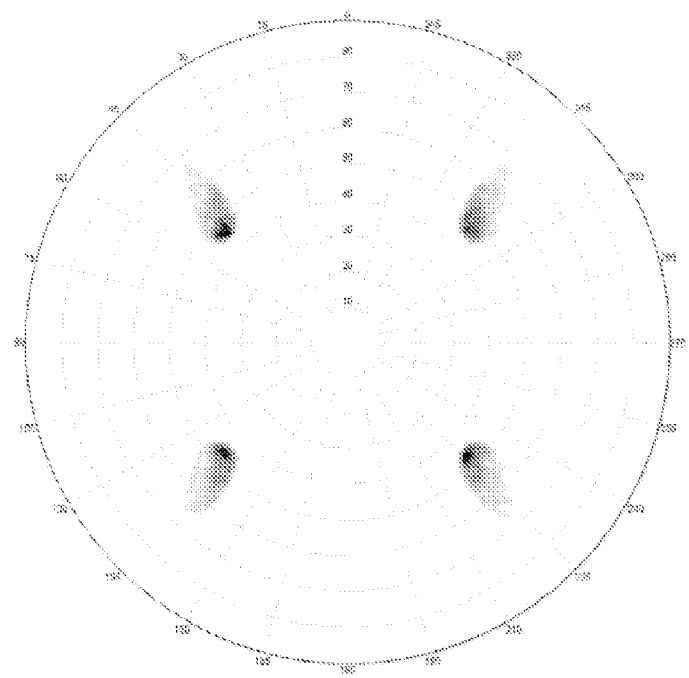
*Figure 9*
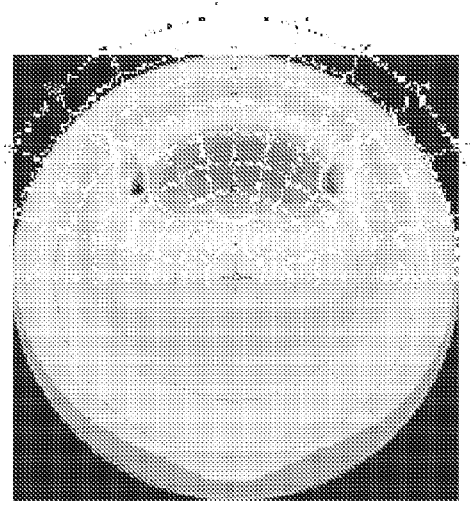 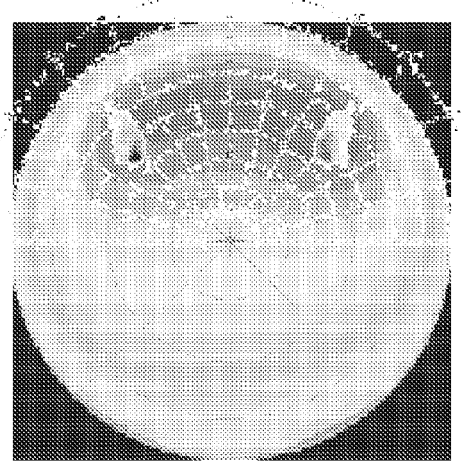
*Figure 10A*              *Figure 10B*

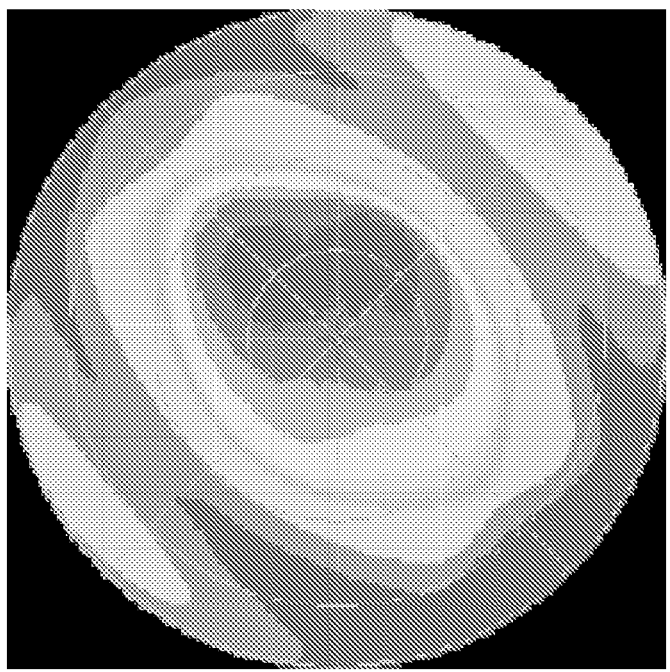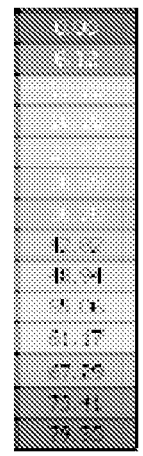
*Figure 15D*
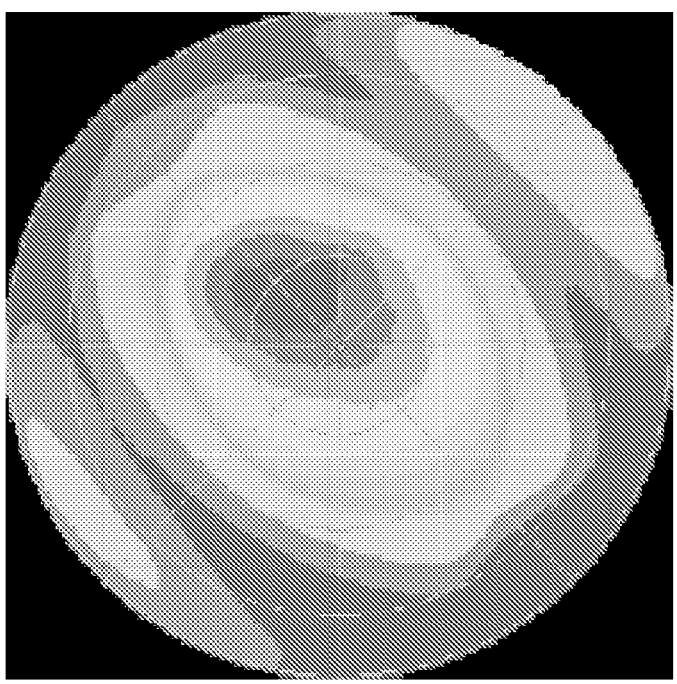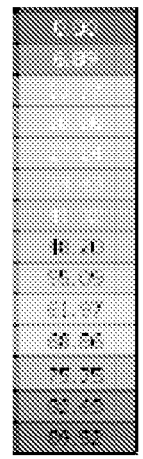
*Figure 15E*

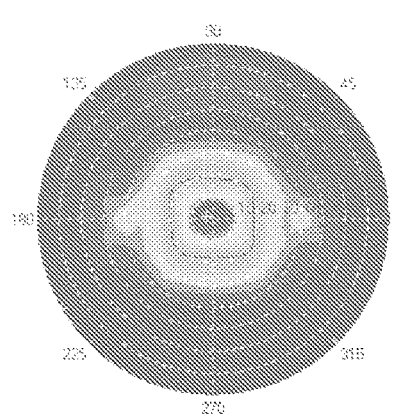 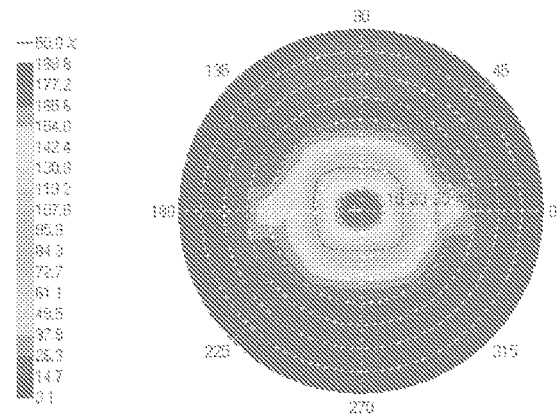
*Figure 30A*  *Figure 30B*
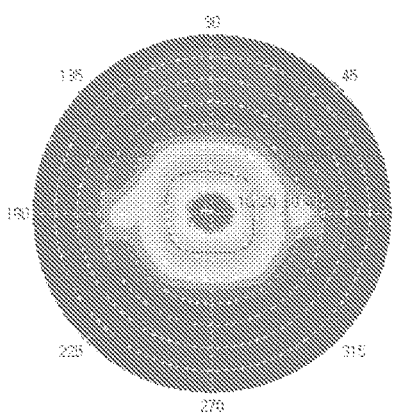 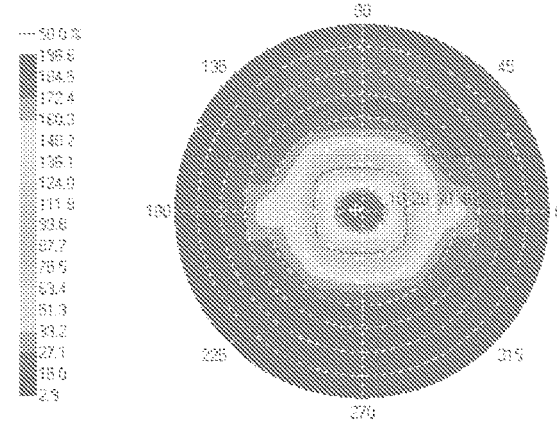
*Figure 30C*  *Figure 30D*
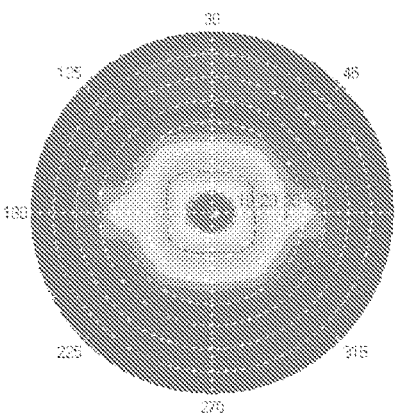
*Figure 30E*

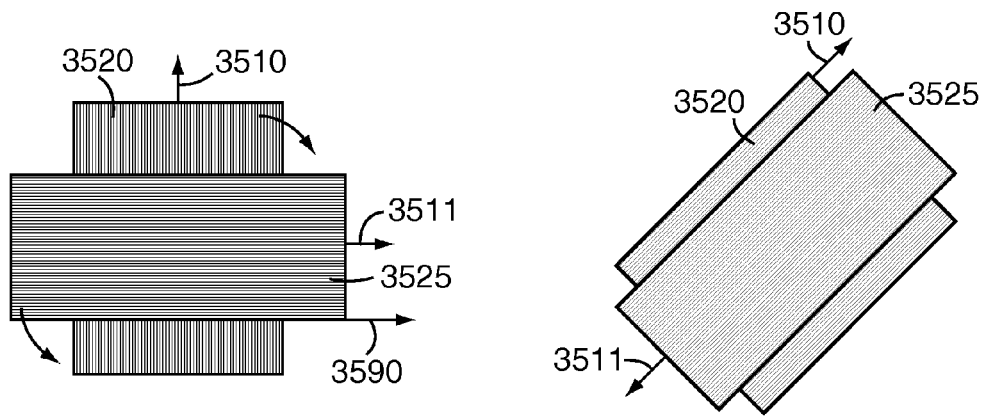
*Figure 35A*
*Figure 35B*
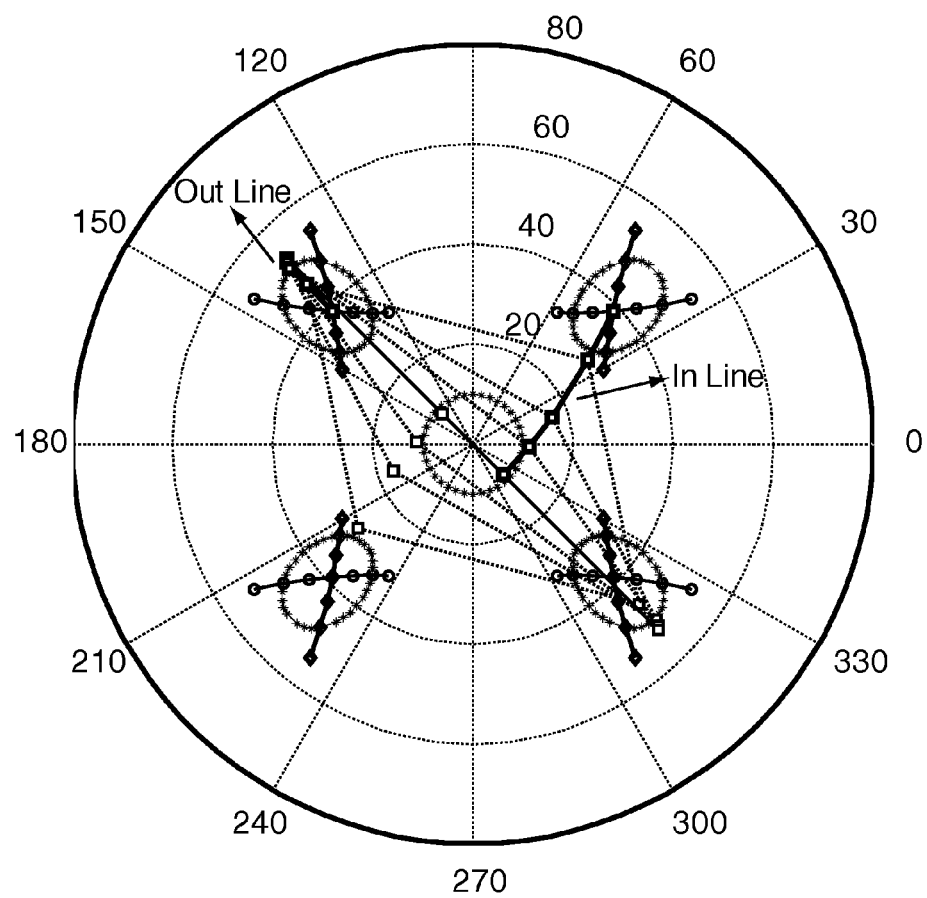
*Figure 36*

SYSTEMS AND METHODS FOR CONTROLLING BACKLIGHT OUTPUT CHARACTERISTICS

CROSS REFERENCE TO RELATED APPLICATIONS

This application is a national stage filing under 35 U.S.C. §371 of PCT/US2008/067696, filed Jun. 20, 2008, which claims priority to U.S. Provisional Application No. 60/936,845, filed on Jun. 22, 2007, the disclosure of which is incorporated by reference in its/their entirety herein.

TECHNICAL FIELD

The present invention is related to systems and methods for controlling the output characteristics of backlights that use brightness enhancement recycling films.

BACKGROUND

Flat panel displays are used in a variety of applications ranging from relatively large devices including computer monitors and televisions, to small, handheld devices such as cell telephones, portable DVD players, wristwatches, and gaming devices. Many flat panel displays use optically active materials, such as liquid crystals, and a light source for backlighting the optically active materials. Films disposed between the liquid crystals and a backlight have been used to enhance the brightness of the displays. For example, brightness enhancement films may be used to increase the light exiting at a desired viewing angle with respect to the surface of the display. Light that emerges substantially parallel to the desired viewing angle is referred to as "on-axis" light. In many applications, the desired angle of the exiting light is perpendicular to the display surface. Increasing the amount of on-axis light reduces the amount of energy required to generate a desired amount of on-axis luminance. This is particularly important for optical displays that use battery powered light sources.

In general, the increase in on-axis brightness produced by a brightness enhancement film is known as the "gain" of the film. For example, if the desired viewing angle is perpendicular to the surface of the display, the on-axis gain of a film refers to the ratio of the intensity of light as measured substantially perpendicular to the surface of the display with and without the film.

Brightness enhancing films having one substantially flat surface and another surface having prismatic structures are frequently used to direct light that would otherwise not be viewed along the viewing axis. A typical flat panel display device may use several different types of films to provide an overall bright, high contrast display with substantially uniform output along the preferred viewing directions.

There is a need for enhanced backlights to provide lighting for optical displays, particularly for low power applications. The present invention fulfills these and other needs, and offers other advantages over the prior art.

SUMMARY

Embodiments of the invention involve backlights and methods for making backlights. One embodiment is directed to a backlight having a light source and one or more light prism recycling films. The light source is configured to generate light which exits the light source having an angular exit distribution. The light recycling films have prism peaks oriented away from the light source. The recycling films have range of optimal incident angles that allows non-recycled light to exit from a plane of the recycling films within a desired range of output angles. One or more components of the light source, one or more characteristics of recycling films, or both, are configured to preferentially shape one or both of the exit distribution of the light source and the optimal incident angle range to control overlap between the exit distribution and the optimal incident angle range.

According to some aspects, the one or more components of the light source are configured to preferentially shape the exit distribution of the light source to provide an amount of recycled light relative to an amount of non-recycled light.

In some configurations, the one or more components of the light source may be configured to preferentially shape the exit distribution of the light source to increase the overlap between the exit distribution of the light source and the optimal incident angle range of the recycling films. In some configurations, the one or more characteristics of the prism films are configured to preferentially shape the optimal incident angle range of the films to increase the overlap between the exit distribution and the preferred incident angle range. In yet other embodiments, the light source components are configured to shift the exit distribution of the light source toward the optimal incident angle range of the films and the characteristics of the recycling films are configured to shift the optimal incident angle range toward the exit distribution of the light source.

For example, in various configurations, the light source components that are used to preferentially shape the exit distribution toward the optimal incident angle range may comprise one or more of a gain diffuser having a microstructured surface oriented away from the recycling films, a light guide with or without microstructured features, a specular reflector, a microstructured specular reflector, a specular reflector comprising a prism film, a specular reflector comprising a thin film polymeric reflective layer laminated to a substrate and a diffuser having certain haze and transmissivity characteristics.

In various configurations, the characteristics of the recycling films that shape the optimal incident angle range toward the exit distribution include the refractive index of the recycling films, the angle between prism axes of the recycling films, the angle between at least one recycling film with respect to the longitudinal axis of the light source, the prism apex angle of the recycling films, and the symmetry properties of the recycling film prisms.

Another embodiment involves a method of directing light through a backlight that includes a light source and one or more recycling films. Light is generated by the light and exits the light source with an angular exit distribution. The light is directed through the backlight via the one or more recycling films. The recycling films are associated with a range of optimal incident angles that allow non-recycled light to pass through the recycling films at a desired viewing angle. Directing the light involves one or both of controlling the exit distribution of the light source toward the optimal incident angle range of the recycling films and controlling the optimal incident angle range of the recycling films toward the exit distribution of the light source. A first portion of the light that falls within the optimal incident angle range passes through the prism films without recycling. A second portion of the light is recycled.

In various configurations, the exit distribution of the light source is controlled using one or more of a gain diffuser having a microstructured surface oriented away from the recycling films, a specular reflector, a light guide having a microstructured surface, and diffuser haze and transmissivity parameters.

In other configurations, the optimal incident angle range of the recycling films is controlled using one or more of a refractive index of the recycling films, an apex angle of the recycling films, an angle between prism axes of the recycling films, an angle between at least one of the recycling films and a longitudinal axis of the light source.

Directing the light may involve controlling the exit distribution only, the optimal incident angle range only, or both the exit distribution and the optimal incident angle range.

Yet another embodiment of the invention is directed to a method of making a backlight that includes a light source and one or more light recycling prism films. The method of making the backlight includes determining characteristics of one or more backlight components, including one or both of determining light exit distribution characteristic of at least one light source and determining optimal incident angle range of at least one recycling film configuration. The optimal incident angle range allows light to pass through the recycling films without recycling. One or both of a light source and a recycling film configuration for the backlight are selected based on the characteristics of the backlight components. The selected backlight components provide a desired amount of overlap between the exit distribution and the optimal incident angle range. The light source and recycling films are arranged so that prism peaks of the recycling films are oriented away from the light source.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

DESCRIPTION OF THE DRAWINGS

FIG. 9 illustrates a model of the optimal incident angle range for two recycling films, where the prism axis of the first film is oriented at about 0 degrees with respect to the longitudinal axis of the lightguide and the prism axis of the second film is oriented at about 90 degrees with respect to the longitudinal axis of the lightguide;

FIG. 10A shows the conoscopic plot of the optimal incident angle range of the of the 0/90 recycling films superimposed on the angular exit distribution of the light source of FIG. 7A;

FIG. 10B shows the conoscopic plot of the optimal incident angle range of the of the 0/90 recycling films superimposed on the angular exit distribution of the light source of FIG. 7B;

FIG. 15D provides the output plot for the structured diffuser backlight configuration of FIG. 15A;

FIG. 15E provides the output plot for the structured diffuser backlight configuration of FIG. 15B;

FIGS. 30A-E show the light output from the backlight having crossed recycling films with a refractive index of 1.65 and incorporating various diffusers;

FIG. 35A illustrates a recycling film configuration where the angle between the prism films is 90 degrees;

FIG. 35B illustrates a recycling film configuration where the angle between the prism films is 180 degrees;

FIG. 36 illustrates the effect of changing the angle between the prism films on the optimal incident angle range;

Figure 1:
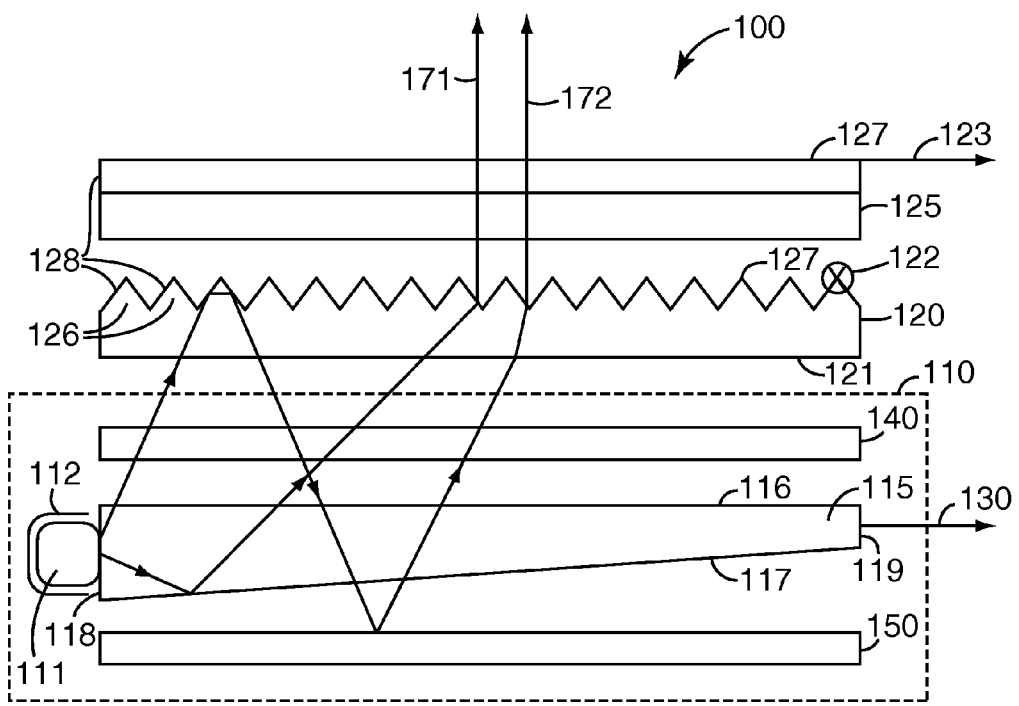
FIG. 1 is a diagram illustrating a backlight that includes a light source and one or more recycling prism films in accordance with embodiments of the invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

Systems, devices or methods according to the present invention may include one or more of the features, structures, methods, or combinations thereof described herein. For example, a device or system may be implemented to include one or more of the advantageous features and/or processes described below. It is intended that such a device or system need not include all of the features described herein, but may be implemented to include selected features that provide for useful structures and/or functionality. Methods may include one or more of the described steps and are not limited to any particular order of implementation.

Flat panel displays are used in a variety of applications, including computer monitors, televisions, laptop computers, and handheld devices such as cellular telephones, watches and gaming devices. Displays for these devices typically use a backlight arranged behind a liquid crystal panel. For more efficient operation, it is desirable for the light from the backlight to emerge though the liquid crystal panel "on-axis," or substantially parallel to the desired viewing angle. Light that emerges from the panel substantially off-axis with respect to the desired viewing angle is wasted. Particularly for battery powered devices, this wasted energy is a significant disadvantage.

Many backlights use an edge-lit lightguide light source along with one or more prism films. The prism films collimate the light and thus reduce light that emerges from the display off-axis with respect to the viewing angle. One type of prism film used for brightness enhancement is a turning film. Turning films are arranged with prism peaks oriented toward the lightguide. The light rays exit the lightguide and encounter the prism structures. The light is refracted by a first surface of the prism structures and is reflected by a second surface of the prism structures so that it is directed on-axis with the viewing angle.

Another type of prism film "recycles" a portion of the light to increase the amount of on-axis exiting from the display. A recycling prism film includes one or more prism film layers that have prism peaks oriented away from the lightguide. The prism peaks may be rounded or truncated to achieve particular optical characteristics. As the light from the lightguide encounters the prisms, a portion of the light is refracted in the on-axis direction while another portion of the light is reflected by total internal reflection back toward the light. The reflected light is recycled until it eventually emerges from the display.

The use of light recycling to increase on-axis light provides a number of advantages, including defect hiding and improved uniformity of light over the area of the backlight providing a softer and more pleasing appearance to the viewer. While it is desirable to recycle some portion of the light from the light source to maintain these characteristics, it is also advantageous to improve backlight brightness by increasing the amount of "first-pass light" that passes through the prism films without recycling. In order for light to pass through the prism film on-axis with the desired viewing angle and without recycling, the light must be incident on the film within a certain range of angle, denoted herein as the optimal incident angle range.

Embodiments of the invention are directed to various approaches for enhancing the brightness of backlights that use optical recycling films while maintaining the advantages of light recycling. Some examples described herein are directed to approaches that alter the ratio between first-pass light and recycled light through a recycling prism film. Altering the first-pass to recycled light ratio is achievable by changing the amount of correspondence between the angular exit distribution of light exiting the light source of the backlight and/or the optimal incident angle range of the recycling films. For example, controlling the correspondence or overlap between the exit distribution and the optimal incident angle range may involve preferentially shaping the exit distribution of the light source and/or the optimal incident angle range of the films to enhance the gain substantially normal to tailor the gain distribution to accommodate the desired viewing angles.

FIG. 1 illustrates a backlight 100 that includes a light source 110 and one or more recycling prism films 120, 125. The light source 110 includes a lamp 111, for example, a florescent tube or light emitting diode. Although only one lamp 111 is illustrated in FIG. 1, the backlight 100 may include multiple lamps. In the example of FIG. 1, the lamp 111 extends along one edge of a lightguide 115. An optional reflector 112 may be used to direct light from the lamp 111 into the lightguide 115.

The lightguide 115 is generally planar in shape, with top 116 and bottom 117 surfaces, a proximal end 118 nearest the lamp 111, and a distal end 119 farthest from the lamp 111. The lightguide 115 may be wedge-shaped, having an angle between the top and bottom surfaces 116, 117. The wedge angle may be up to about 1 degree, or may be about 0 degrees, for example.

The lightguide 115 accepts light from the lamp 111 and allows the light to propagate by total internal reflection along the longitudinal axis 130 of the lightguide 115. The light within the lightguide 115 propagates along the lightguide 115 until the angle of incidence of the light on an exiting face of the lightguide 115 is less than a critical angle. So long as the angle of incidence of the light within the lightguide is greater than the critical angle, the light is totally internally reflected. When the angle of incidence becomes less than the critical angle, the light is transmitted through the exiting face 116, escaping the lightguide 115. For wedge shaped lightguides, the incidence angle of the light is reduced by an amount proportional to the wedge angle for each reflection from the exiting face 116. The light may exit the lightguide 115 over a substantial majority of the lightguide's top surface 116.

The light source 110 may optionally include a diffuser 140 positioned between the lightguide 115 and the recycling films 120, 125. The diffuser 140 obscures the lightguide extraction spot pattern from the viewer and generates a more even illumination. The light source 110 may also include a reflector 150 that reflects light escaping from the bottom surface 117 of the lightguide 115 toward the recycling films 120, 125.

The backlight 100 includes one or more recycling prism films 120, 125 having prisms 128 arranged with prism bases 126 oriented toward the light source 110 and prism peaks 127 oriented away from the light source 110. As depicted in FIG. 1, the backlight 100 may include two recycling films 120, 125, having a number of triangular, linear prisms 128, where prism axes 122, 123 for each film 120, 125 may respectively be defined in directions along the peaks 127 of the linear prisms. FIG. 1 illustrates two recycling films 120, 125 having prism axes 122, 123 oriented substantially perpendicularly, although other orientations are possible.

Light from the light source 110 is incident on the planar surface 121 of the recycling film 120 oriented nearest the light source 110. A first portion of this light is returned by the recycling films 120, 125 toward the light source 110. The light that is returned is reflected by the diffuser 140, reflector 150, or other structure of the light source 110 to the recycling films 120, 125. The light may be returned by the recycling films 120, 125 toward the light source 110 multiple times until the light reaches the required angle of incidence to emerge from the recycling films 120, 125. Recycled light is illustrated by light ray 172.

A second portion of the light exits the light source 110 and strikes the recycling films 120, 125 at an angle of incidence that is within the optimal incident angle range of the recycling films 120, 124. The second portion of light, referred to as first pass light emerges from the films without recycling. In FIG. 1, light ray 171 illustrates first-pass light.

Embodiments of the invention are directed to controlling the degree of correspondence, e.g., overlap in angular range, between the angular exit distribution of light exiting the light source of the backlight and the optimal incident angle range of the recycling films that produces first-pass light substantially on-axis with respect to a desired viewing angle. A backlight designer 1) may have control over the optical characteristics of the light source 110 only, 2) may have control over the optical characteristics of the recycling films 120, 125 only, or 3) may have control over both the light source 110 and the recycling films 120, 125. Characteristics of the light source, the recycling films or both may be selected to control the amount of overlap in the exit distribution and the optimal incident angle range.

Some embodiments of the invention are directed to the first scenario and focus on modifying characteristics of the light source to shape the angular exit distribution of the light source to control the overlap between the light source's exit distribution and the optimal incident angle range of the recycling films. Some embodiments are directed to the second scenario and focus on modifying characteristics of the recycling films to shape the optimal incident angle range of the films to control the exit distribution/input range overlap. Further embodiments illustrate the situation wherein the backlight designer has control over at least some characteristics of both the light source and the recycling films. These embodiments focus on shaping the exit distribution of the light source in conjunction with shaping the optimal incident angle range of the recycling films.

Figure 2:
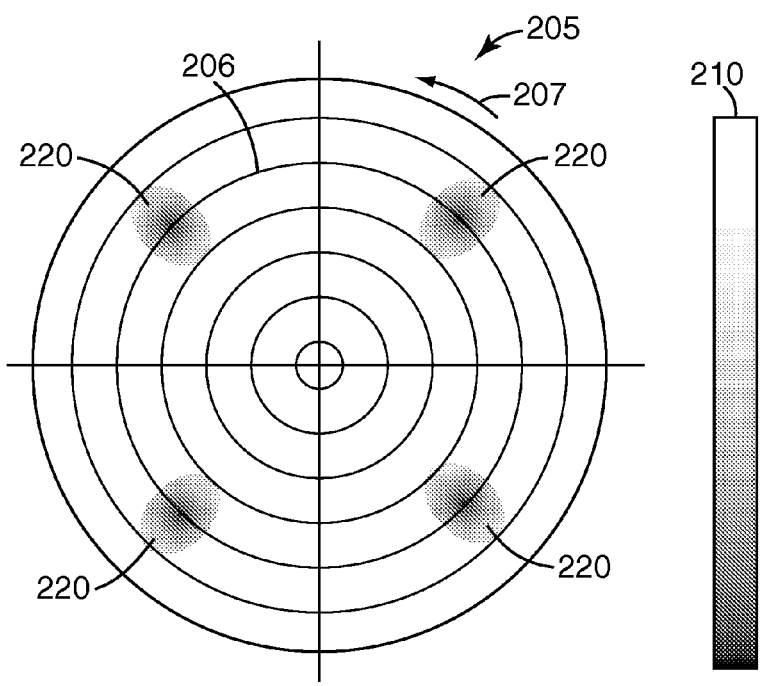
FIG. 2 illustrates conoscopic plot of an exemplary optimal first-pass incident angle range for the recycling film portion of a backlight.

Various processes for shaping the exit distribution of the light source and/or the optimal incident angle range of the recycling films are illustrated with reference to FIGS. 2-5. FIG. 2 illustrates and idealized conoscopic plot 205 of an exemplary optimal incident angle range 220 for the recycling film portion of a backlight. The idealized conoscopic plot 205 illustrates the optimal incident angle range 220 with intensity indicated by the gray scale 210 with respect to the inclination angle, indicated by the concentric circles 206, and the azimuth angle, indicated along the circumference 207 of the conoscopic plot 205. Light incident on the recycling film that falls within the optimal incident angle range 220 allows light to exit the film substantially on-axis with a desired viewing angle.

Figure 3:
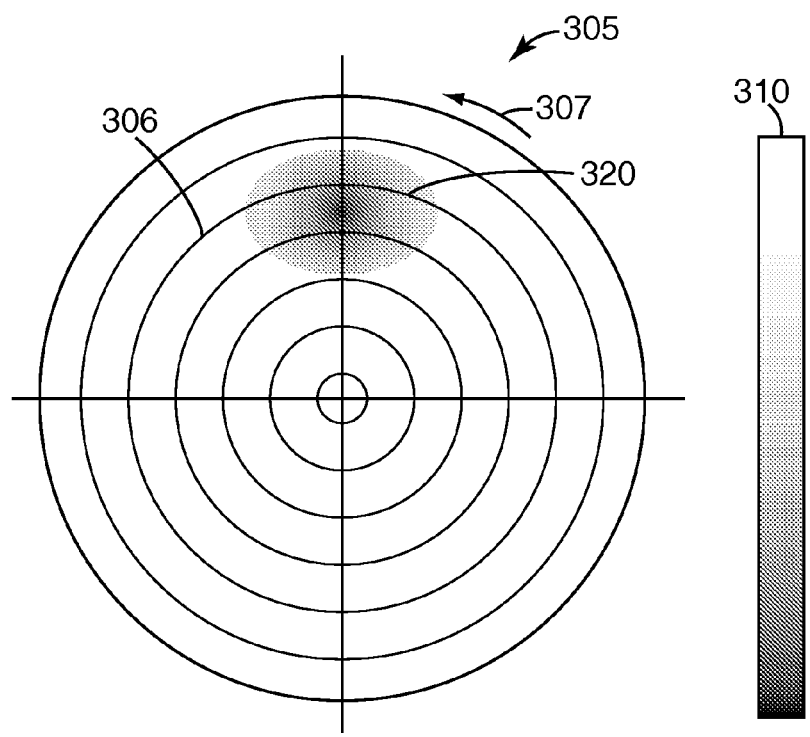
FIG. 3 illustrates a conoscopic plot of an exemplary angular exit distribution for light emerging from the light source portion of a backlight.

FIG. 3 illustrates a conoscopic plot 305 of an exemplary angular exit distribution 320 for light emerging from the light source portion of a backlight. As with the optimal incident angle range 220 illustrated in FIG. 2, the conoscopic plot illustrates the exit distribution 320 of the light source with respect to intensity 310, inclination angle 306, and azimuth angle 307.

Figure 4:
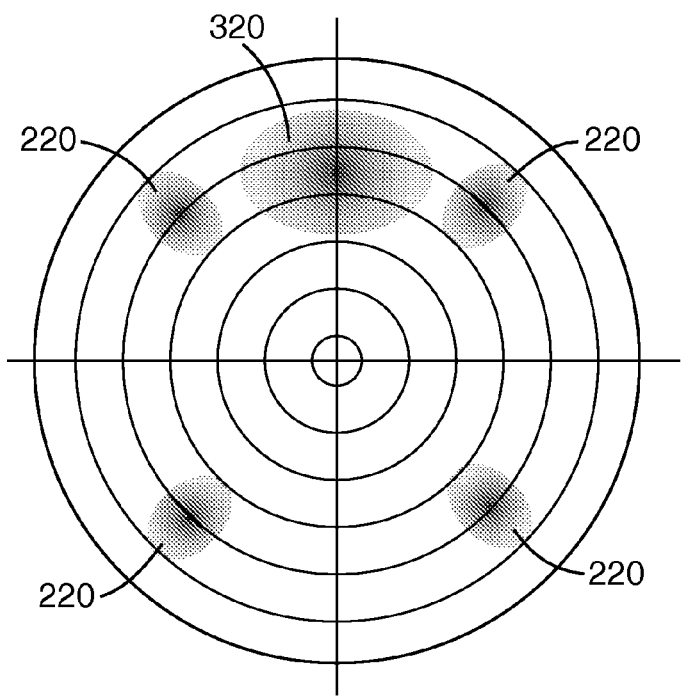
FIG. 4 illustrates the optimal first-pass incident angle range of FIG. 2 superimposed on the exit distribution of FIG. 3.

FIG. 4 illustrates the optimal incident angle range 220 of FIG. 2 superimposed over the angular exit distribution 320 of FIG. 3. Embodiments of the invention involve controlling the amount of correspondence between the optimal incident angle range 220 of the recycling films and the exit distribution 320 of the light source.

Figure 5A:
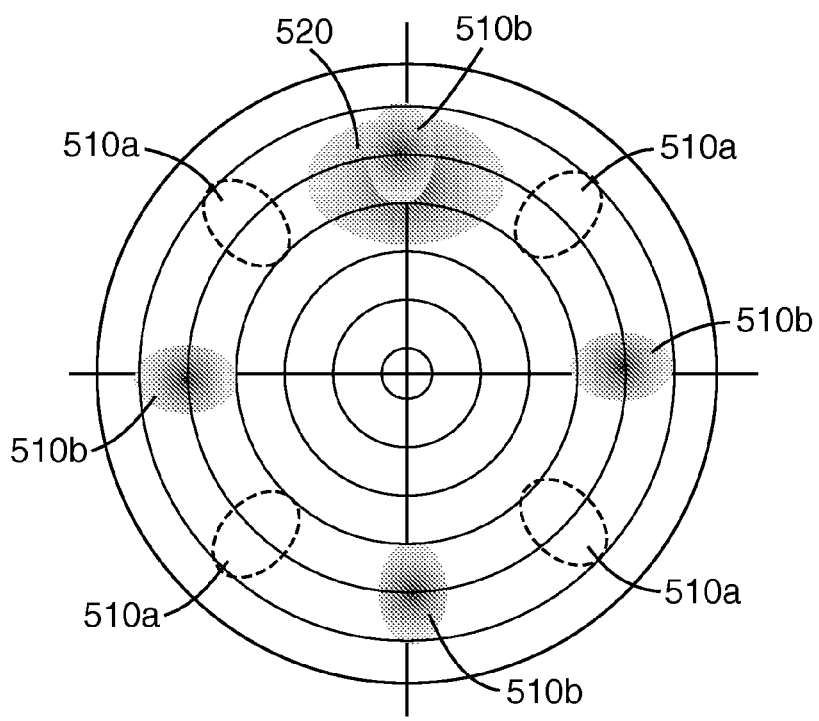
FIG. 5A illustrates a process for controlling the amount of overlap between the optimal first-pass incident angle range and the angular exit distribution by shifting the optimal incident angle range toward the exit distribution in accordance with embodiments of the invention.

As illustrated in FIG. 5A, controlling the amount of correspondence may be achieved by adjusting one or more characteristics of the films to alter the optimal incident angle range of the films from a first position 510a to second position 510b. The optimal incident angle range 510a-510b may be altered to increase the amount or degree of correspondence with the exit distribution 520 of the light source, as illustrated in FIG. 5A. In some cases, the optimal incident angle range 510a-510b may be modulated to reduce correspondence between the optimal incident angle range and the exit distribution 520, to increase the amount of recycled light or to change the ratio of first-pass light to non-recycled light.

Figure 5B:
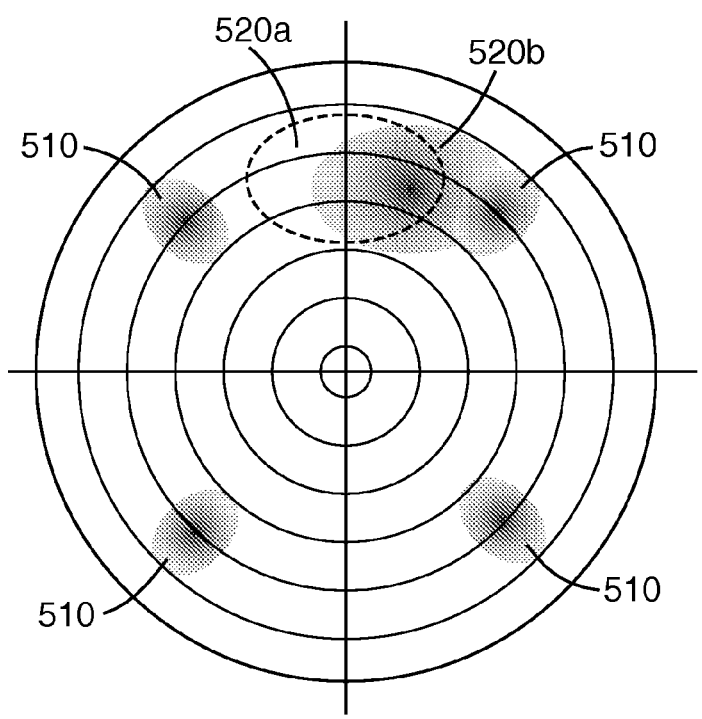
FIG. 5B illustrates a process for controlling the amount of overlap between the optimal incident angle range and the angular exit distribution by shifting the exit distribution of the light source toward the optimal incident angle range of the films in accordance with embodiments of the invention.

In some embodiments, controlling the amount of correspondence between the light source exit distribution and the optimal incident angle range of the films may be achieved by adjusting the characteristics of one or more components of the light source. As illustrated in FIG. 5B, one or more characteristics of the light source may be adjusted to modulate an exit distribution of the light source from a first position 520a to second position 520b. The exit distribution of the light source 520a-520b may be altered to increase the amount or degree of correspondence with the optimal incident angle range 510 of the light source. In some scenarios, the exit distribution may be altered to reduce the correspondence between the optimal incident angle range 510 of the films and the light source exit distribution 520.

Figure 5C:
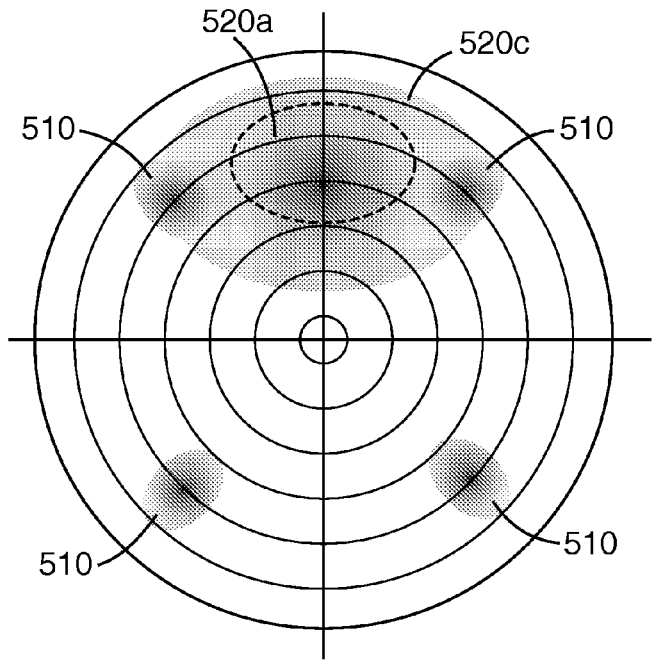
FIG. 5C illustrates the process of expanding the angular area of the exit distribution to increase the amount of overlap between the exit distribution and the optimal incident angle range in accordance with embodiments of the invention.

In some embodiments, both the optimal range of the films and the exit distribution of the light source may selectably configured to control the amount of correspondence between the exit distribution and the optimal range. For example, one or both of the exit distribution and the optimal range may be expanded, reduced, or shifted. FIG. 5C illustrates the concept of expanding the area of the exit distribution from a first exit distribution shape 520a to a second exit distribution shape 520c, increasing the amount of overlap between the exit distribution 520c and the optimal range 510.

Figure 6:
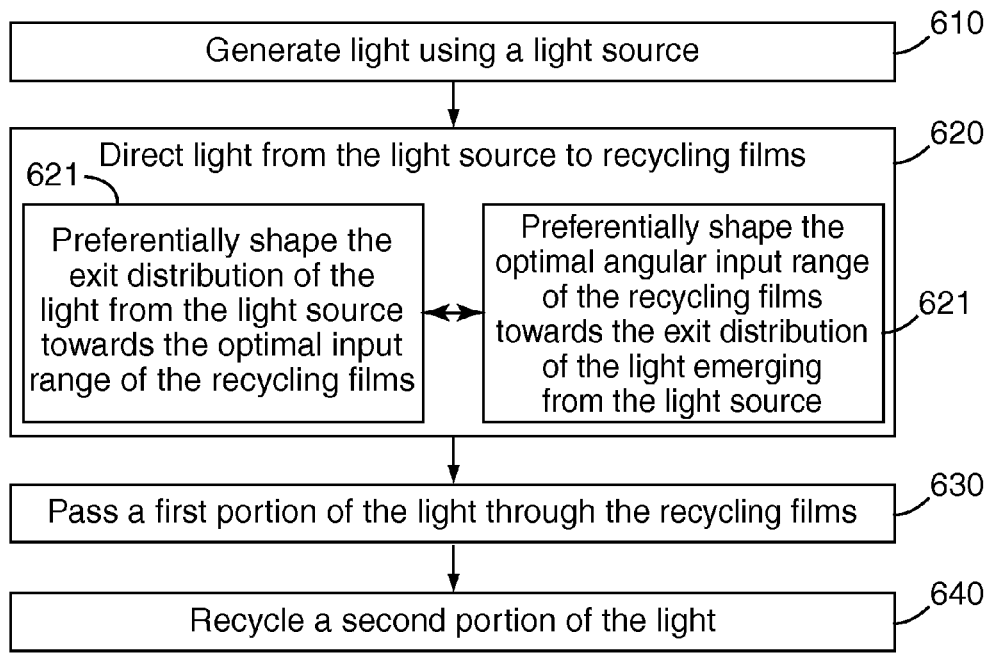
FIG. 6 is a flow diagram illustrating a method for controlling the ratio of first-pass to non-recycled light for a backlight incorporating a light source and recycling films in accordance with embodiments of the invention.

FIG. 6 is a flow diagram illustrating a method of operating a backlight comprising a light source and one or more light recycling prism films in accordance with embodiments of the invention. As previously discussed, an overlap between the exit distribution of the light emerging from the light source and the optimal incident angle range of the recycling film allows light to pass through the films without recycling.

The method for operating the backlight involves generating 610 light using a light source. The light is directed 620 the light toward one or more recycling films. Directing the light includes one or both of preferentially shaping 621 the exit distribution of the light and preferentially shaping 622 the angular input range of the recycling films. The shape of the exit distribution is dependent on the characteristics of one or more components or characteristics of the light source. The shape of the optimal incident angle range depends on the characteristics of the recycling films. The characteristics of the light source components and/or the characteristics of the recycling films may be selected to control the overlap between the exit distribution and the optimal incident angle range.

A first portion of light having an exit distribution that overlaps the optimal incident angle range passes through 630 the recycling films. A second portion of the light is recycled 640.

Figure 7A:
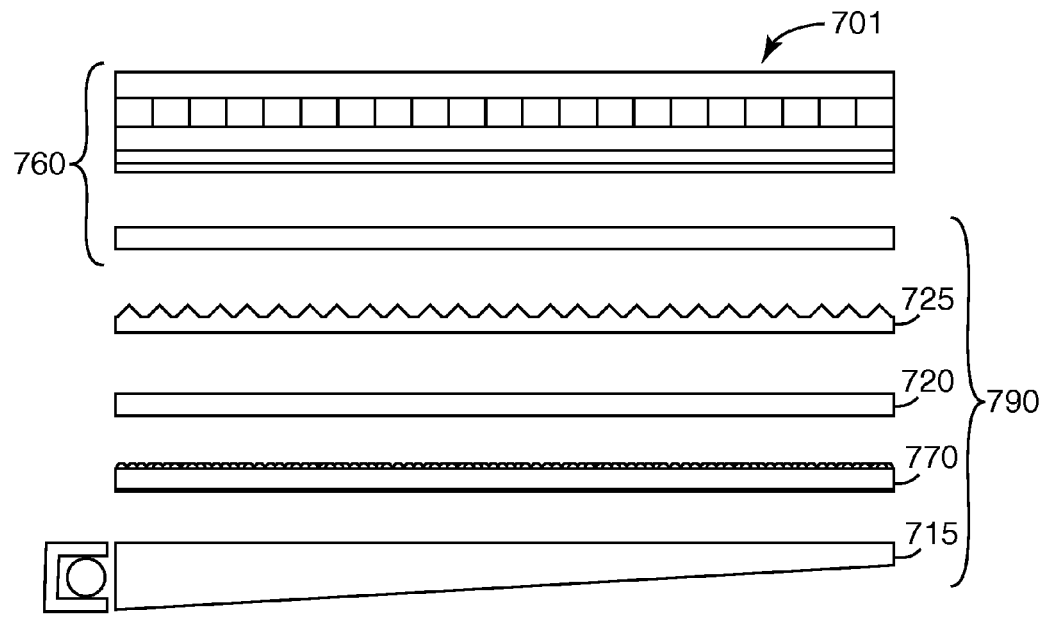
FIG. 7A is a diagram illustrating a gain diffuser having a specular surface oriented toward the oriented toward the lightguide and a structured surface oriented toward the recycling films which may be used to control the characteristics of the backlight in accordance with embodiments of the invention.
Figure 7B:
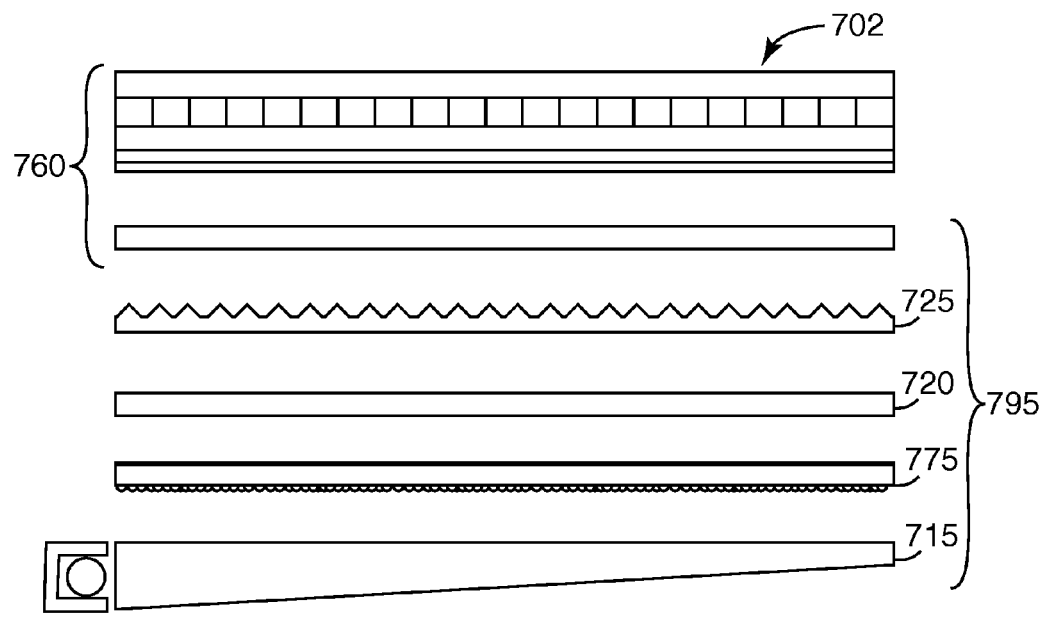
FIG. 7B, includes a gain diffuser having a structured surface oriented toward the lightguide and a specular surface oriented toward the recycling films which may be used to control the characteristics of the backlight in accordance with embodiments of the invention.

In some embodiments, the light source includes a gain diffuser (140 in FIG. 1) disposed between the lightguide and the recycling films. The gain diffuser characteristics may be selected to preferentially shape the exit distribution of the light source. FIGS. 7A and 7B illustrate two configurations of liquid crystal displays (LCDs) 701, 702 having backlights 790, 795 that incorporate gain diffusers 770, 775. The LCDs 701, 702 include a liquid crystal panel 760 and a backlight 790, 795. The backlight 790, 795 comprises a lightguide 715 and two recycling films 720, 725 which, in this example, have prism axes oriented substantially orthogonally. A gain diffuser 770, 775 is disposed between the backlight 790, 795 and the crossed recycling films 720, 725.

The first backlight configuration 790, illustrated in FIG. 6 includes a gain diffuser 770 having a specular surface oriented toward the lightguide 715 and a structured surface oriented toward the recycling films 720, 725. The second backlight configuration 795, illustrated in FIG. 7, includes a gain diffuser 775 having a structured surface oriented toward the lightguide 715 and a specular surface oriented toward the recycling films 720, 725. The characteristics of the gain diffusers may be selected to achieve desired backlight characteristics by preferentially shifting the exit distribution of the light source toward the input range of the films in accordance with embodiments of this invention.

Figure 8A:
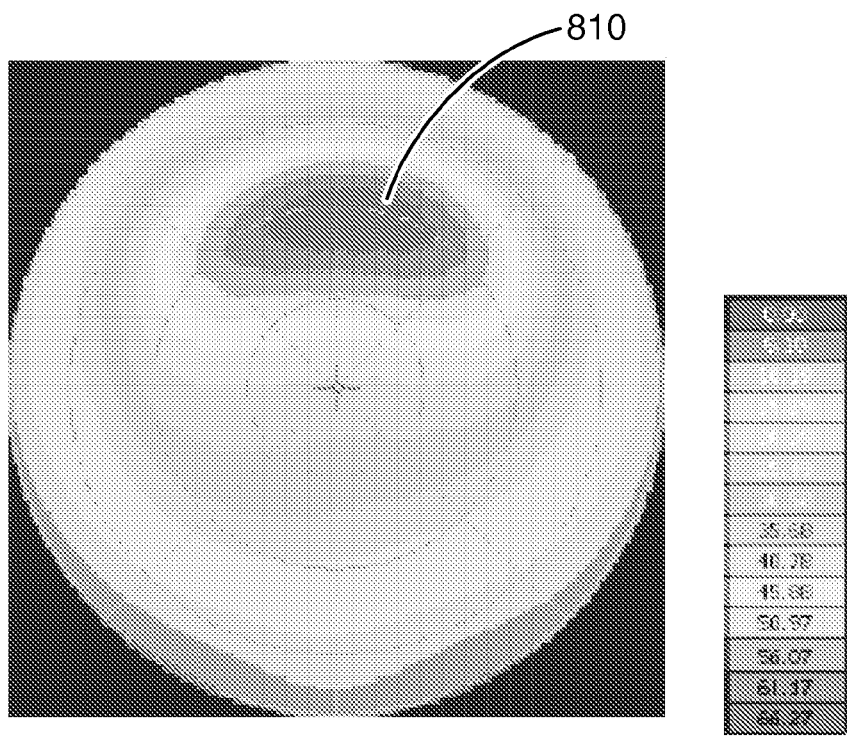
FIG. 8A is a conoscopic plot of the angular exit distribution of the light source of FIG. 7A.
Figure 8B:
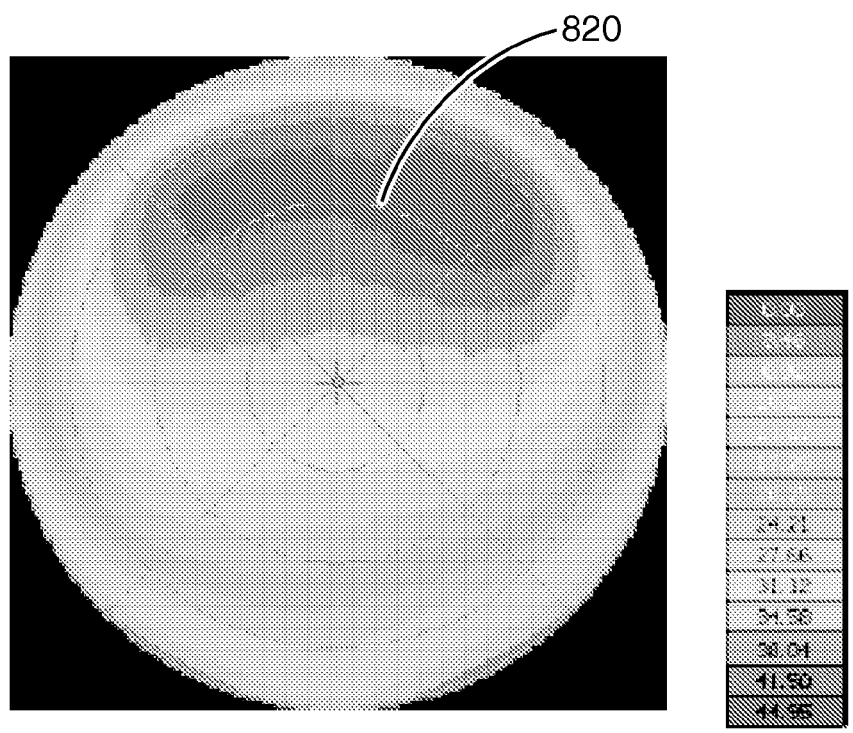
FIG. 8B is a conoscopic plot of the angular exit distribution of the light source of FIG. 7B.

In some embodiments, orienting the structure surface of the gain diffuser toward the lightguide shifts the exit distribution of the light source toward the angular input range of the recycling films. FIG. 7A depicts a light source 701 having a gain diffuser 770 with a structured surface oriented toward the recycling films, denoted the structured surface up (SSU) gain diffuser. FIG. 7B depicts a light source 702 having a gain diffuser 775 with a structured surface oriented toward the light guide, denoted the structured surface down (SSD) gain diffuser. The gain diffusers 770, 775 of FIGS. 7A and 7B have similar characteristics other than their orientation relative to the light guide 715 and the films 720, 725. FIGS. 8A and 8B illustrate the conoscopic plots of the exit distribution of the SSU gain diffuser and the SSD gain diffuser, respectively.

Comparison of FIGS. 8A and 8B show that the exit distribution of SSU gain diffuser has peak intensity that covers a smaller area 810 (smaller angular range) when compared with exit distribution of the SSD gain diffuser. The peak intensity of the SSD gain diffuser exit distribution covers a larger area 820 (larger angular range). In FIG. 8A, the area of highest intensity of the exit distribution for the SSU gain diffuser falls within an inclination range of 30 to 50 degrees and within an azimuth range of 40 to 325 degrees. The area of highest intensity of the exit distribution for the SSD gain diffuser falls within an inclination range of 25 to 65 degrees and within an azimuth range between 60 to 300 degrees.

FIG. 9 illustrates a computer generated model of the optimal incident angle range for two recycling films, where the prism axis of the first film (720 in FIGS. 7A and 7B) is oriented at about 0 degrees with respect to the longitudinal axis of the lightguide 715 and the prism axis of the second film (725 in FIGS. 7A and 7B) is oriented at about 90 degrees with respect to the longitudinal axis of the lightguide 715. This particular configuration of crossed recycling films is referred to herein as 0/90 films to connote the orientation of the first and second films at 0 degrees and 90 degrees, respectively, with respect to the longitudinal axis of the light guide. In this example, the computer model assumes a prism refractive index of 1.66, although other refractive indices may apply for different recycling film materials. Light incident on the bottom recycling film (720 in FIGS. 7A and 7B) within the optimal incident angle range indicated in FIG. 9 emerges from the films 720, 725 toward the liquid crystal panel 760 substantially normal to the plane of the films 720, 725, which in this example is the desired viewing angle.

FIG. 10A shows the conoscopic plot of the optimal incident angle range of the of the 0/90 recycling films (illustrated in FIG. 9), superimposed on the angular exit distribution of a light source having the SSU gain diffuser with the exit distribution depicted in the conoscopic plot of FIG. 8A. FIG. 10B shows the conoscopic plot of the optimal incident angle range of the of the 0/90 recycling films (illustrated in FIG. 9) superimposed on the angular exit distribution of a light source having the SSD gain diffuser with the exit distribution depicted in the conoscopic plot of FIG. 8B. Comparison of FIGS. 10A and 10B shows that the angular exit distribution of the SSD gain diffuser exhibits substantially more overlap with the optimal incident angle range of the 0/90 films when compared to the exit distribution of the SSU gain diffuser. The broader angular exit distribution of the SSD gain diffuser provides increased overlap with the optimal incident angle range of the films. The use of the SSD gain diffuser in conjunction with these 0/90 films allows a greater percentage of first pass light to emerge from the recycling films. Thus, the SSD gain diffuser shapes the exit distribution of the light source for more efficient operation because more light enters the 0/90 recycling films at an angle that increases the first-pass light output from the backlight close to the desired viewing angle.

Figure 11A:
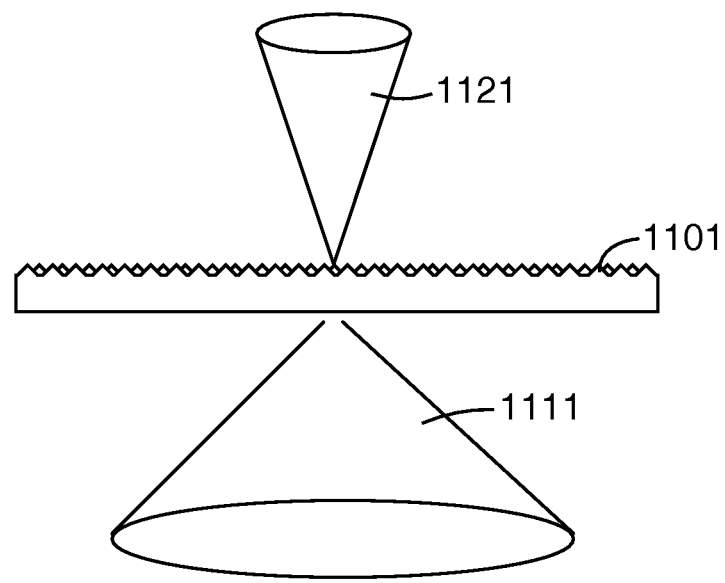
FIGS. 11A and 11B illustrate the input and output angles for an SSU and SSD gain diffuser, respectively, on accordance with embodiments of the invention.
Figure 11B:
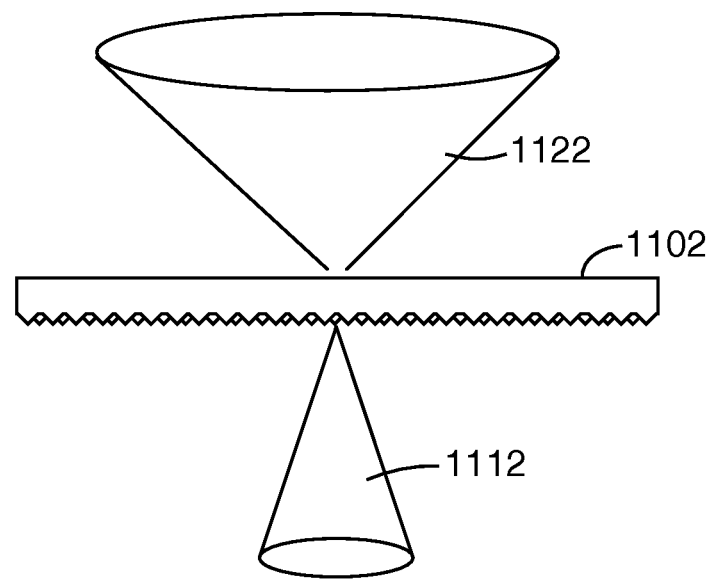
Figure 12A:
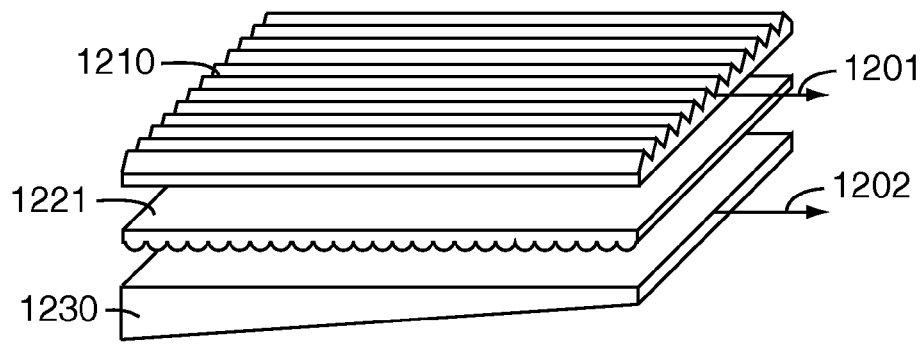
FIGS. 12A and 12B illustrate backlight configurations including a single recycling film having a prism axis oriented substantially parallel to the longitudinal axis of the lightguide and having an structured gain diffuser in accordance with embodiments of the invention.
Figure 12B:
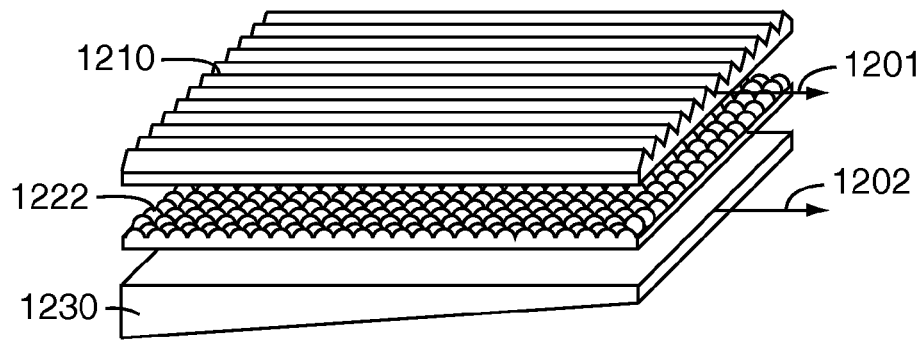
Figure 12C:
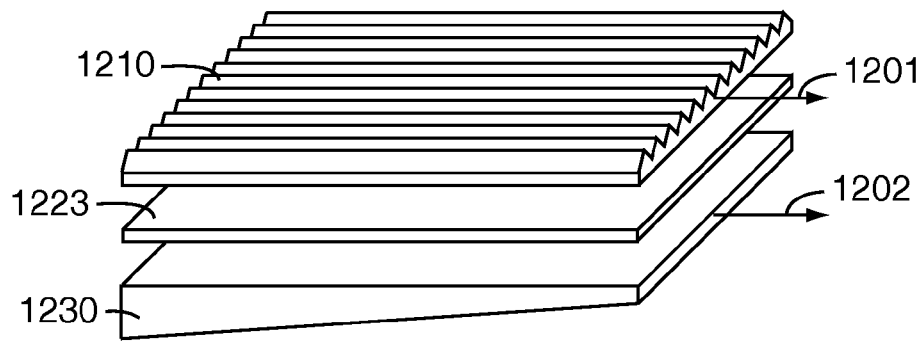
FIG. 12C illustrates a backlight incorporating an unstructured diffuser and a single recycling film in accordance with embodiments of the invention.
Figure 12D:
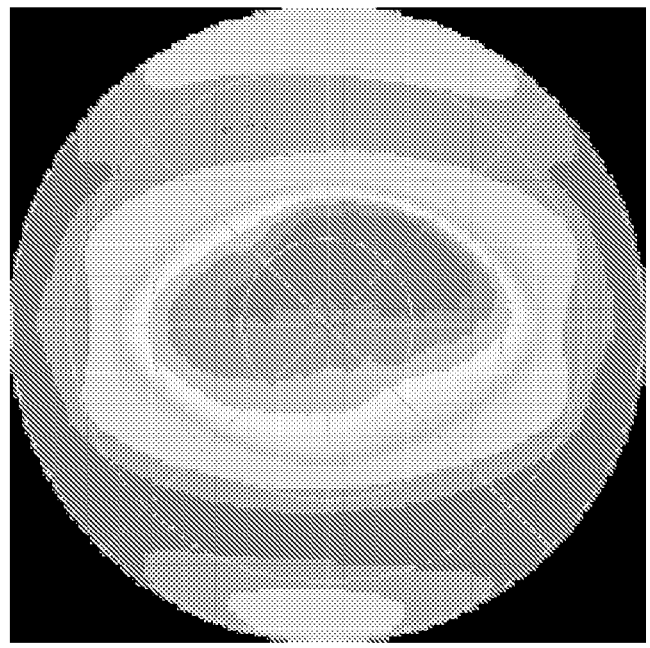
FIG. 12D provides the output plot for the structured diffuser backlight configuration of FIG. 12A.
Figure 12E:
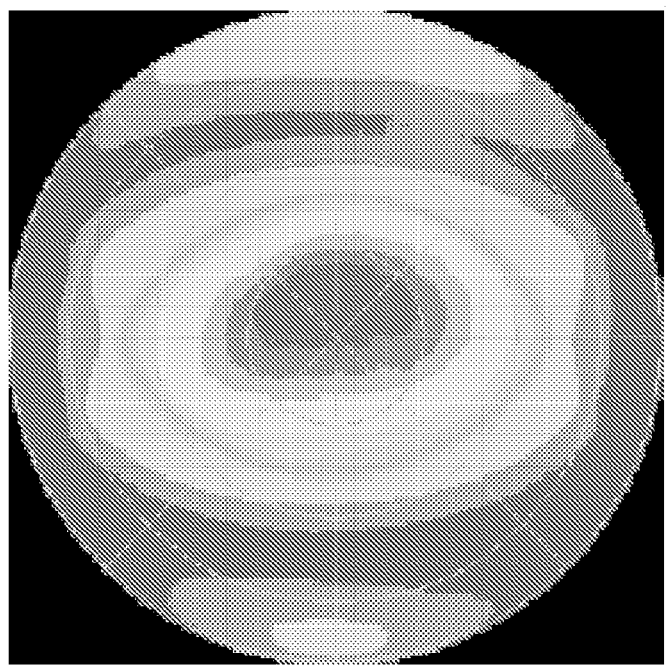
FIG. 12E provides the output plot for the structured diffuser backlight configuration of FIG. 12B.

FIGS. 10A and 10B illustrate the concept of shaping the angular exit distribution of the light source using an SSD gain diffuser to enhance overlap between the angular exit distribution and the optimal incident angle range of certain types of 0/90 recycling films. The overlap between the light source exit distribution and the optimal range of the recycling films is determined by the characteristics of various components of the light source and/or characteristics of the recycling films. A light source or light source component having an exit distribution that is optimal for one recycling film configuration may be non-optimal for another recycling film configuration. FIGS. 11A and 11B illustrate this concept for SSU and SSD gain diffusers.

FIG. 11A illustrates an SSU gain diffuser 1101 that is configured to accept light from a relatively broader cone of incident angles 1111 and to focus the light into a relatively narrower cone of exit angles 1121. Thus, this type of gain diffuser may be preferred if 1) the exit distribution of the lightguide is relatively broad and/or 2) the optimal incident range of the films is narrow and overlaps the exit distribution of the SSU gain diffuser.

FIG. 11B illustrates an SSD gain diffuser that accepts light from a relatively narrow cone of incident angles 1112. In this case, the exit distribution 1122 of the SSD gain diffuser is broader than the narrow cone of accepted incident angles 1112. This type of gain diffuser may be preferred if 1) the exit distribution of the lightguide is narrow and/or 2) the optimal incident range of the films is relatively broad.

The above examples illustrate selection of the characteristics of light source component, e.g., gain diffuser, that can be used to shape the light source exit distribution to match or achieve an increased overlap with, the optimal incident angle range of the films.

The optimal incident range for a particular recycling film implementation may also be affected by various characteristics and/or configurations of the recycling films, including but not limited to, the number of films used, the angle between the films and the longitudinal axis of the lightguide, the angle between one film and another film, the prism geometry of the recycling films, refractive index of the prisms and/or substrate of the recycling films, prism/substrate interface reflections, and substrate diffusion level. All of these factors influence the range of optimal incident angles for first-pass light through the films.

FIGS. 12A-C, 13A-C, 14A-C, 15A-C, 16A-C, and 17A-C provide 3-dimensional views of backlight configurations having light source and recycling film combinations in accordance with various embodiments. Conoscopic plots illustrating light intensity output for the backlight configurations illustrated in FIGS. 12A-B, 13A-B, 14A-B, 15A-B, 16A-B, and 17A-B are illustrated in FIGS. 12D-E, 13D-E, 14D-E, 15D-E, 16D-E, and 17D-E, respectively.

FIGS. 12-15 relate to backlights having a single recycling film 1210 oriented with a prism axis 1201 oriented at various angles with respect to the longitudinal axis 1202 of the light guide 1230. FIGS. 12A and 12B, respectively, illustrate backlight configurations including a single recycling film 1210 having a prism axis 1201 oriented substantially parallel to the longitudinal axis 1202 of the light guide 1230 and having an SSD gain diffuser 1221 (FIG. 12A) or an SSU gain diffuser 1222 (FIG. 12B). FIG. 12C illustrates a backlight incorporating an unstructured diffuser 1223 and a single recycling film 1210. FIG. 12D provides the output plot for the SSD backlight configuration of FIG. 12A and FIG. 12E illustrates the output plot for the SSU backlight configuration of FIG. 12B.

Figure 13A:
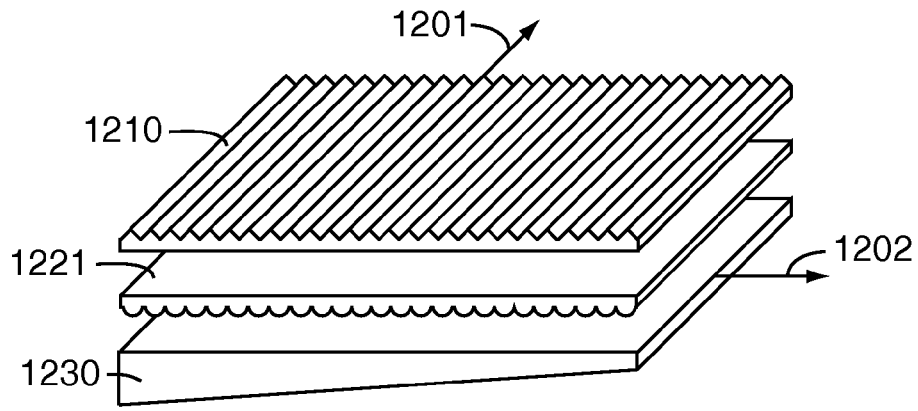
FIGS. 13A and 13B illustrate backlight configurations including a single recycling film having a prism axis oriented substantially perpendicular to the longitudinal axis of the lightguide and having a structured gain diffuser in accordance with embodiments of the invention.
Figure 13B:
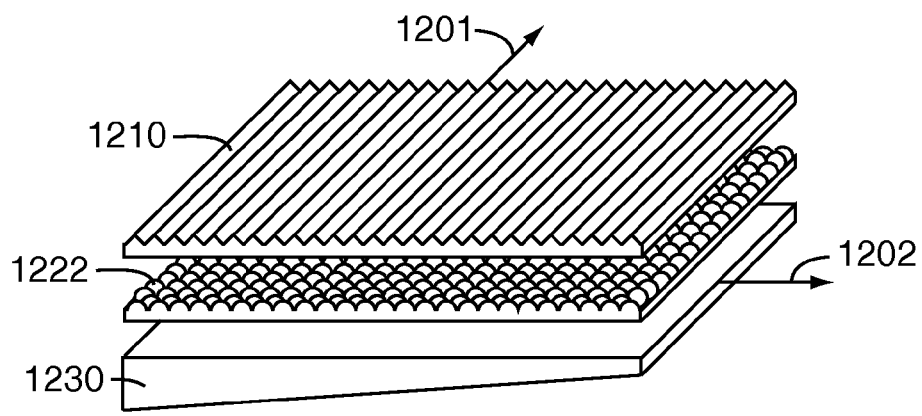
Figure 13C:
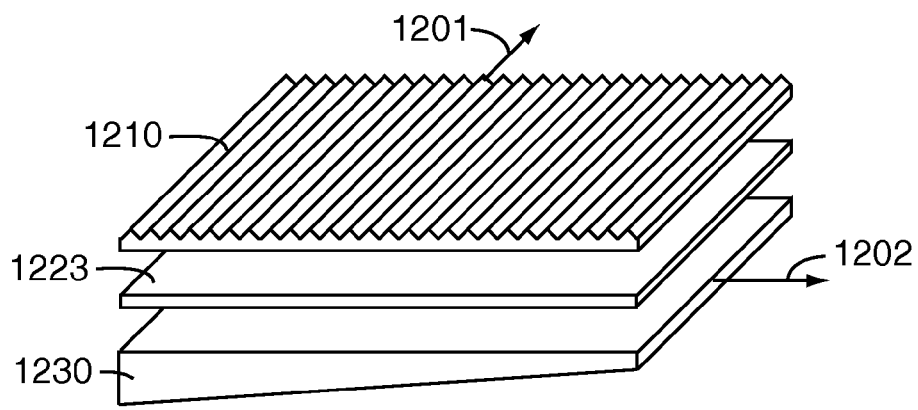
FIG. 13C illustrates a backlight incorporating an unstructured diffuser and a single recycling film in accordance with embodiments of the invention.
Figure 13D:
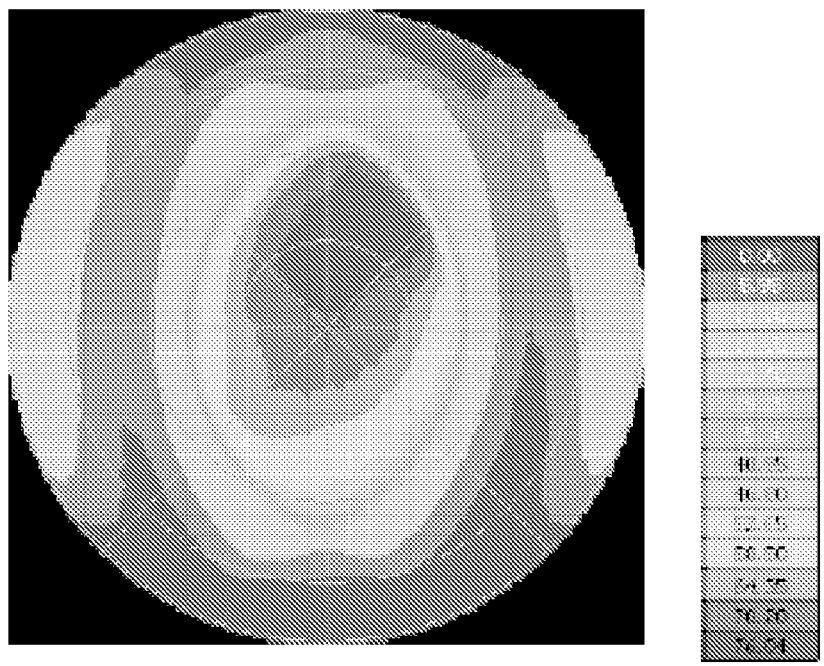
FIG. 13D provides the output plot for the structured diffuser backlight configuration of FIG. 13A.
Figure 13E:
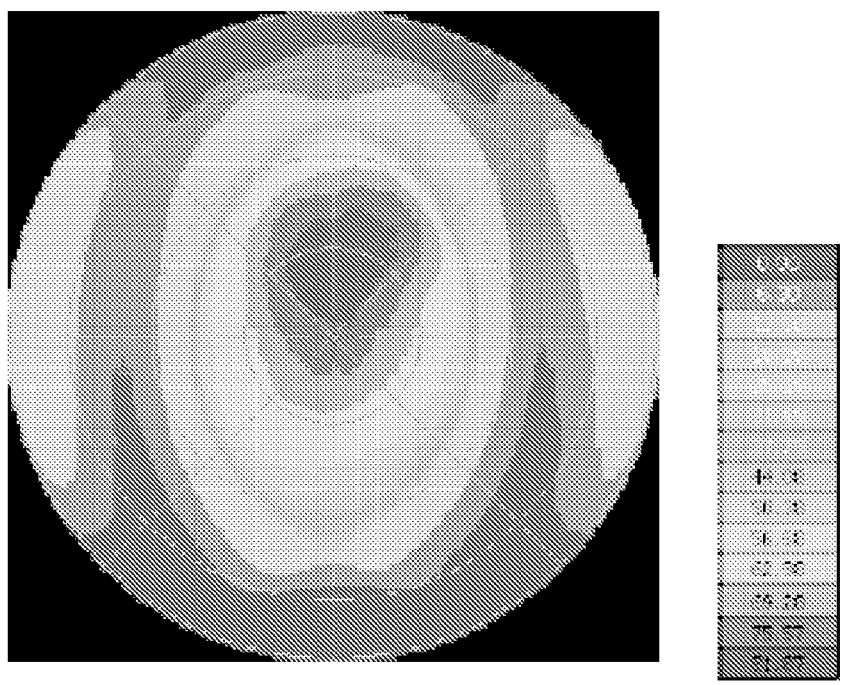
FIG. 13E provides the output plot for the structured gain diffuser backlight configuration of FIG. 13B.

FIGS. 13A and 13B, respectively, illustrate backlight configurations including a single recycling film 1210 having a prism axis 1201 oriented substantially perpendicular to the longitudinal axis 1202 of the light guide 1230 and having an SSD gain diffuser 1221 (FIG. 13A) or an SSU gain diffuser 1222 (FIG. 13B). FIG. 13C illustrates a backlight incorporating an unstructured diffuser 1223 and a single recycling film 1210. FIG. 13D provides the output plot for the SSD backlight configuration of FIG. 13A and FIG. 13E illustrates the output plot for the SSU backlight configuration of FIG. 13B.

Figure 14A:
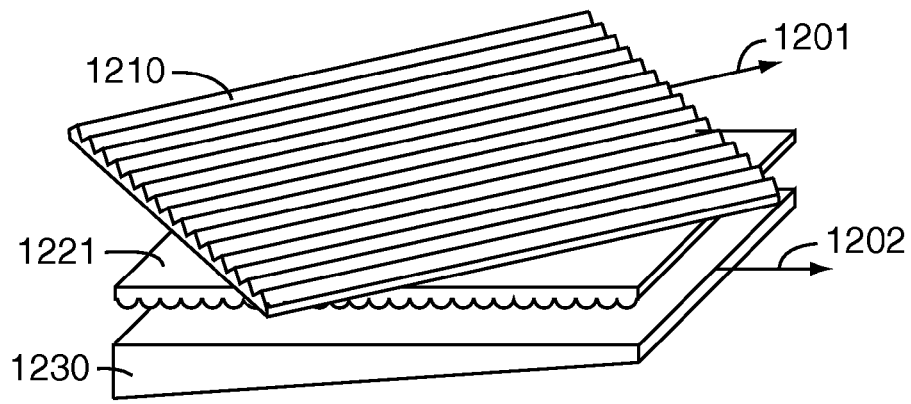
FIGS. 14A and 14B illustrate backlight configurations including a single recycling film having a prism axis oriented at about 45 degrees with respect to the longitudinal axis of the lightguide and having a structured gain diffuser in accordance with embodiments of the invention.
Figure 14B:
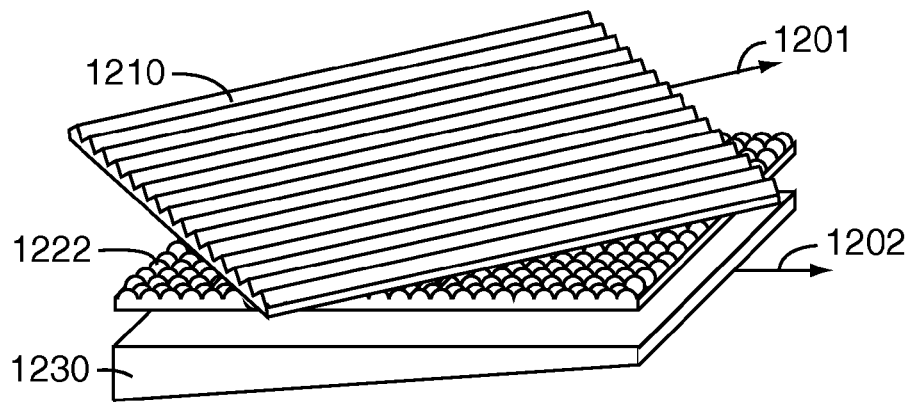
Figure 14C:
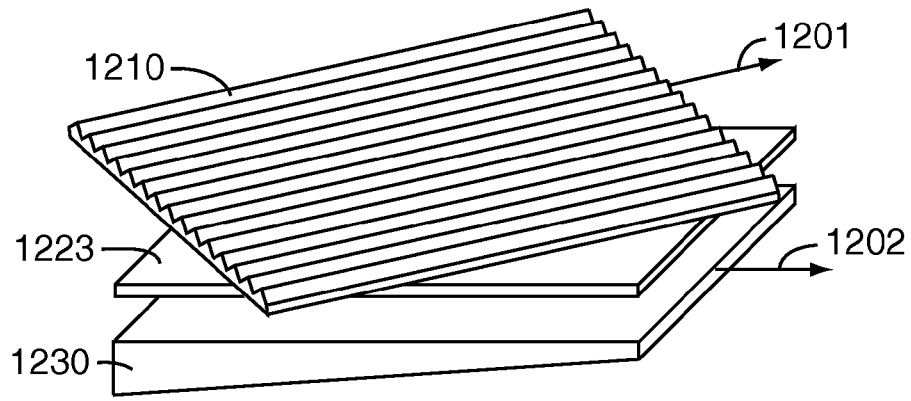
FIG. 14C illustrates a backlight incorporating an unstructured diffuser and a single recycling film in accordance with embodiments of the invention.
Figure 14D:
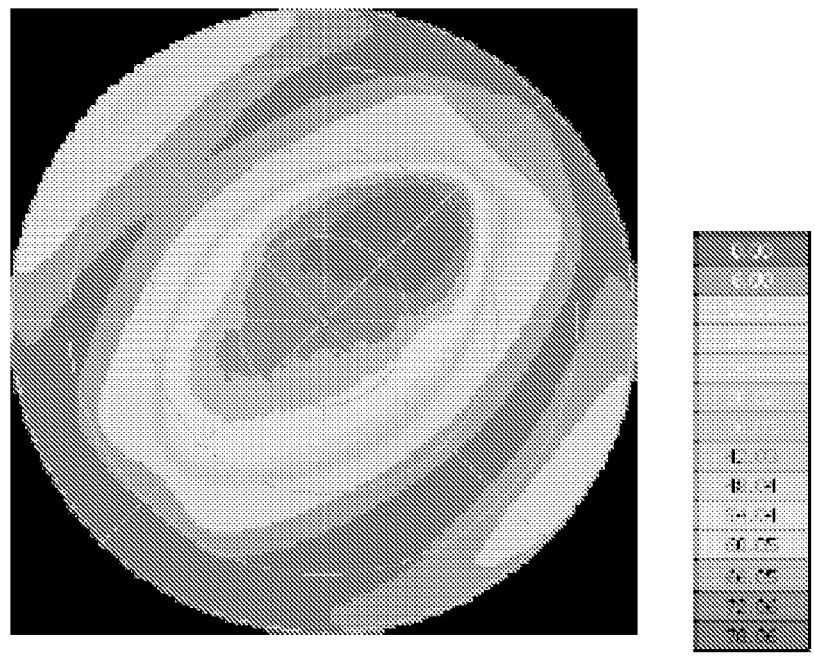
FIG. 14D provides the output plot for the structured diffuser backlight configuration of FIG. 14A.
Figure 14E:
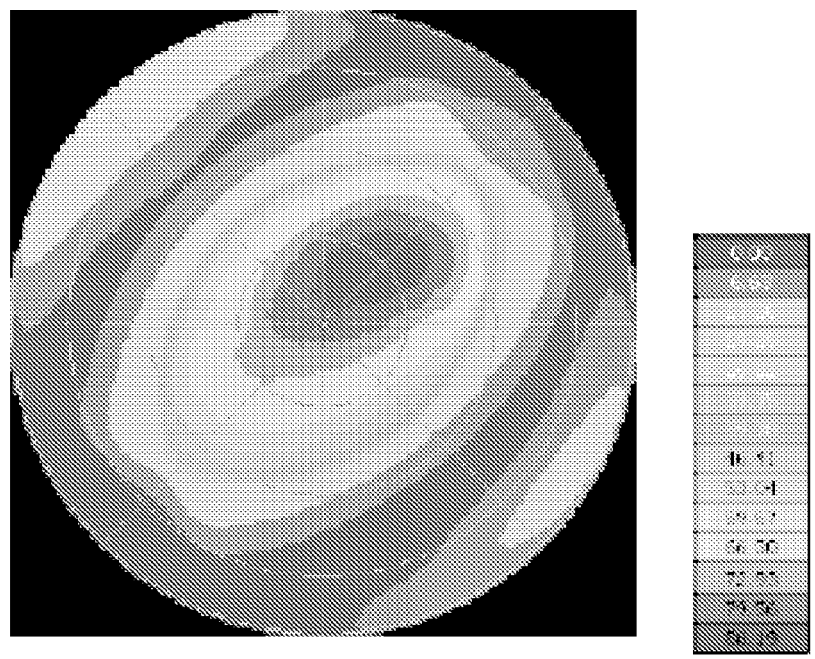
FIG. 14E provides the output plot for the structured diffuser backlight configuration of FIG. 14B.

FIGS. 14A and 14B, respectively, illustrate backlight configurations including a single recycling film 1210 having a prism axis 1201 oriented at about 45 degrees with respect to the longitudinal axis 1202 of the light guide 1230 and having an SSD gain diffuser 1221 (FIG. 14A) or an SSU gain diffuser 1222 (FIG. 14B). FIG. 14C illustrates a backlight incorporating an unstructured diffuser 1223 and a single recycling film 1210. FIG. 14D provides the output plot for the SSD backlight configuration of FIG. 14A and FIG. 14E illustrates the output plot for the SSU backlight configuration of FIG. 14B.

Figure 15A:
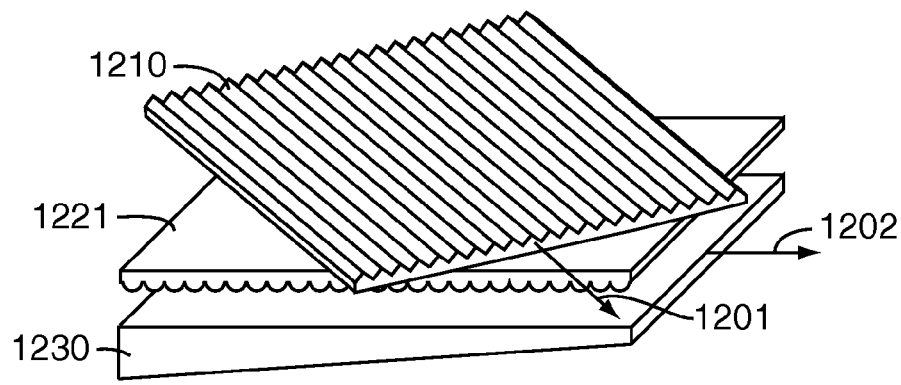
FIGS. 15A and 15B illustrate backlight configurations including a single recycling film having a prism axis oriented at about 135 degrees with respect to the longitudinal axis of the lightguide and having a structured gain diffuser in accordance with embodiments of the invention.
Figure 15B:
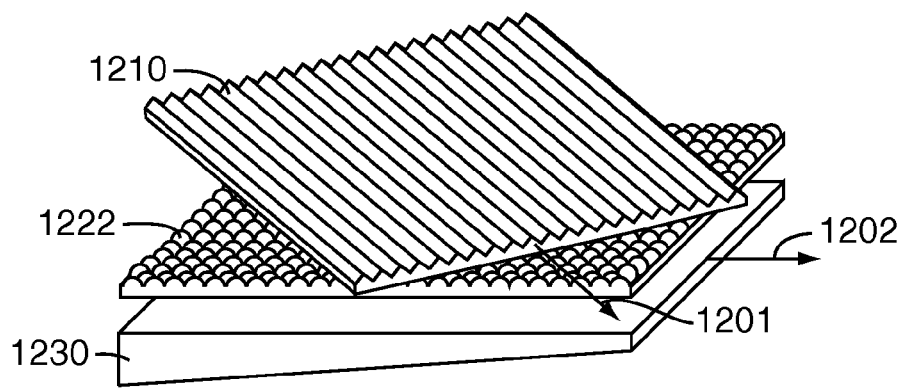
Figure 15C:
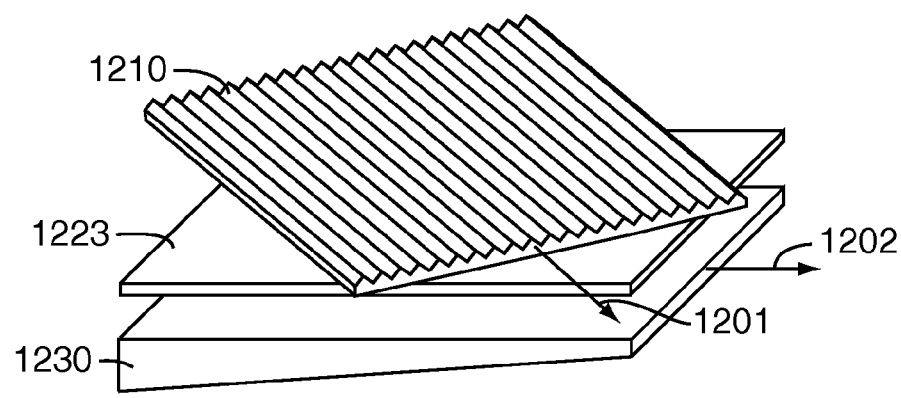
FIG. 15C illustrates a backlight incorporating an unstructured diffuser and a single recycling film in accordance with embodiments of the invention.

FIGS. 15A and 15B, respectively, illustrate backlight configurations including a single recycling film 1210 having a prism axis 1201 oriented at about 135 degrees with respect to the longitudinal axis 1202 of the lightguide 1230 and having an SSD gain diffuser 1221 (FIG. 15A) or an SSU gain diffuser 1222 (FIG. 15B). FIG. 15C illustrates a backlight incorporating an unstructured diffuser 1223 and a single recycling film 1210. FIG. 15D provides the output plot for the SSD backlight configuration of FIG. 15A and FIG. 15E illustrates the output plot for the SSU backlight configuration of FIG. 15B.

FIGS. 16-17 illustrate backlights having a two recycling films 1210, 1215 oriented with prism axes 1201, 1203 oriented substantially perpendicular to each other. The recycling films 1210, 1215 illustrated in FIGS. 16A and 16B, having prism axes 1201, 1203 oriented at angles of 0 and 90 degrees with respect to the longitudinal axis 1203 of the lightguide 1230 are denoted 0/90 recycling films. FIGS. 16A and 16B illustrate a backlight incorporating an SSD gain diffuser 1221 (FIG. 16A) or an SSU gain diffuser 1222 and 0/90 recycling films 1210, 1215. FIG. 16C illustrates a backlight incorporating an unstructured diffuser 1223 and 0/90 recycling films 1210, 1215.

Figure 17A:
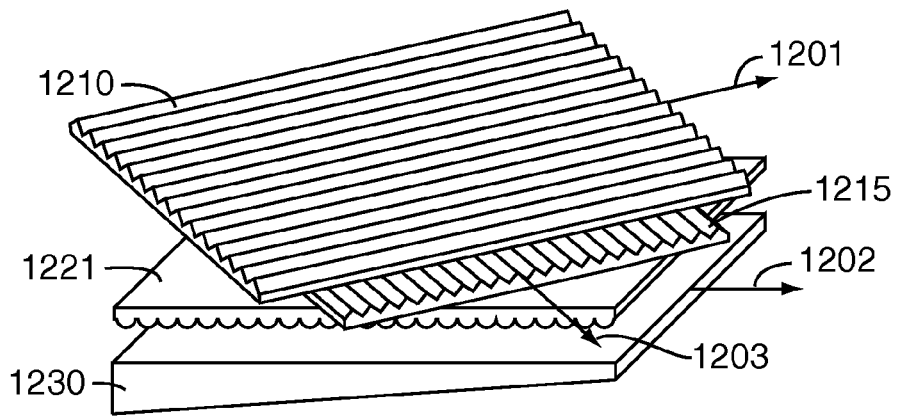
FIGS. 17A and 17B are diagrams of backlights including structured diffusers and recycling films oriented at angles of 45 degrees and 135 degrees with respect to the longitudinal axis of the lightguide in accordance with embodiments of the invention.
Figure 17B:
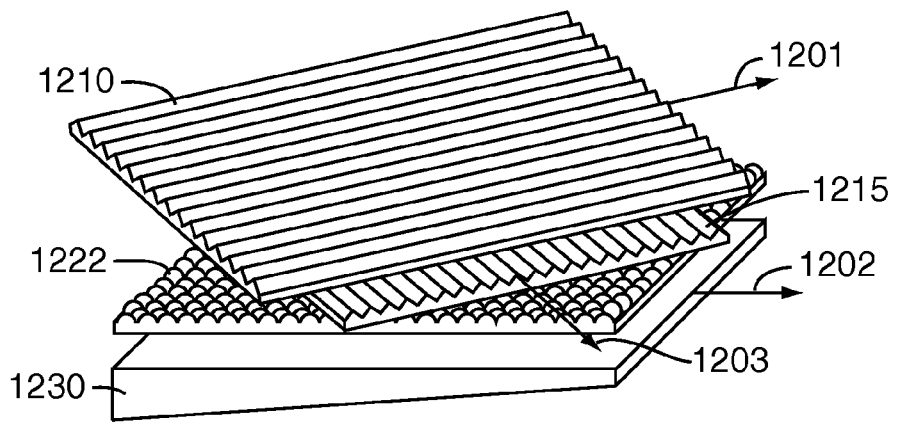
Figure 17C:
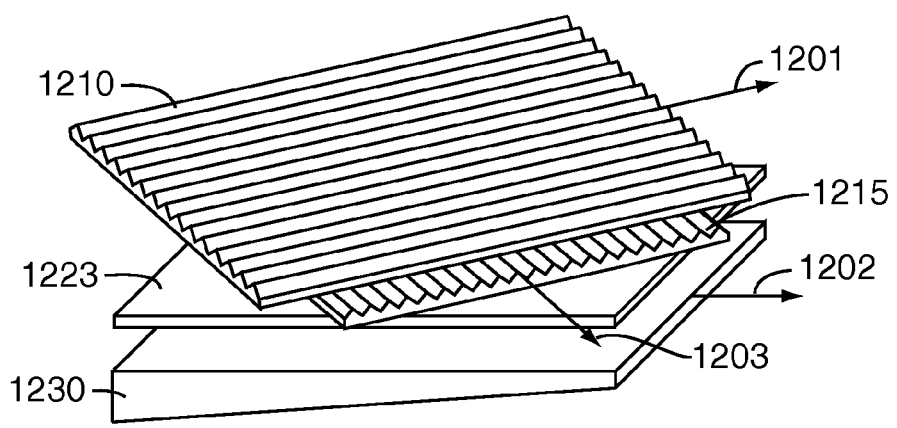
FIG. 17C illustrates a backlight incorporating an unstructured diffuser and a two crossed recycling films.

The recycling films 1210, 1215 illustrated in the backlight of FIGS. 17A and 17B have prism axes 1201, 1203 that are oriented at angles of 45 degrees and 135 degrees with respect to the longitudinal axis 1202 of the lightguide 1230. Recycling films having a 45 degree and 135 degree orientation with respect to the lightguide are denoted 45/135 recycling films. FIG. 17A illustrates a backlight having 45/135 recycling films 1210, 1215 and an SSD gain diffuser 1221. FIG. 17B illustrates a backlight having 45/135 recycling films 1210, 1215 and an SSU gain diffuser 1222. FIG. 17C illustrates a backlight incorporating an unstructured gain diffuser 1223 and 45/135 recycling films 1210, 1215.

The conoscopic plots of FIGS. 12D, 13D, 14D, and 15D illustrate the light intensity output of the single recycling film/SSD backlight configurations illustrated in FIGS. 12A, 13A, 14A, and 15A, respectively. The conoscopic plots of FIGS. 12E, 13E, 14E, and, 15E illustrate the light intensity output of the single recycling film/SSU backlight configurations illustrated in FIGS. 12B, 13B, 14B, and 15B, respectively. Comparison of the conoscopic output plots corresponding to the SSU gain diffuser configurations to the conoscopic output plots corresponding to the SSD gain diffuser configurations show that for these single recycling film configurations, the exit distribution produced by the SSU gain diffuser provides increased on-axis light output (substantially perpendicular to the surface of the backlight) when compared to the SSD gain diffuser.

Figure 17D:
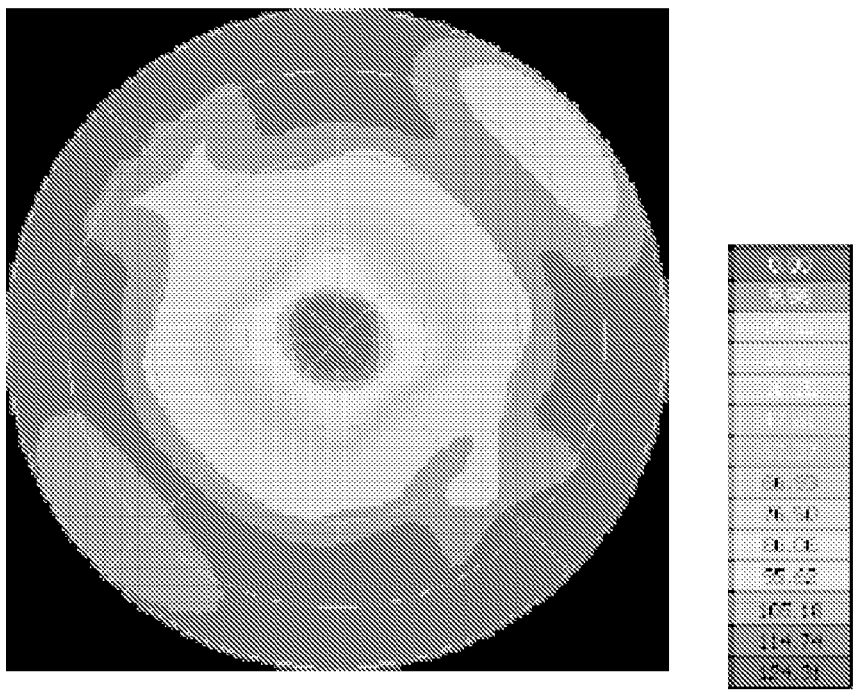
FIG. 17D provides the output plot for the structured diffuser backlight configuration of FIG. 17A.
Figure 17E:
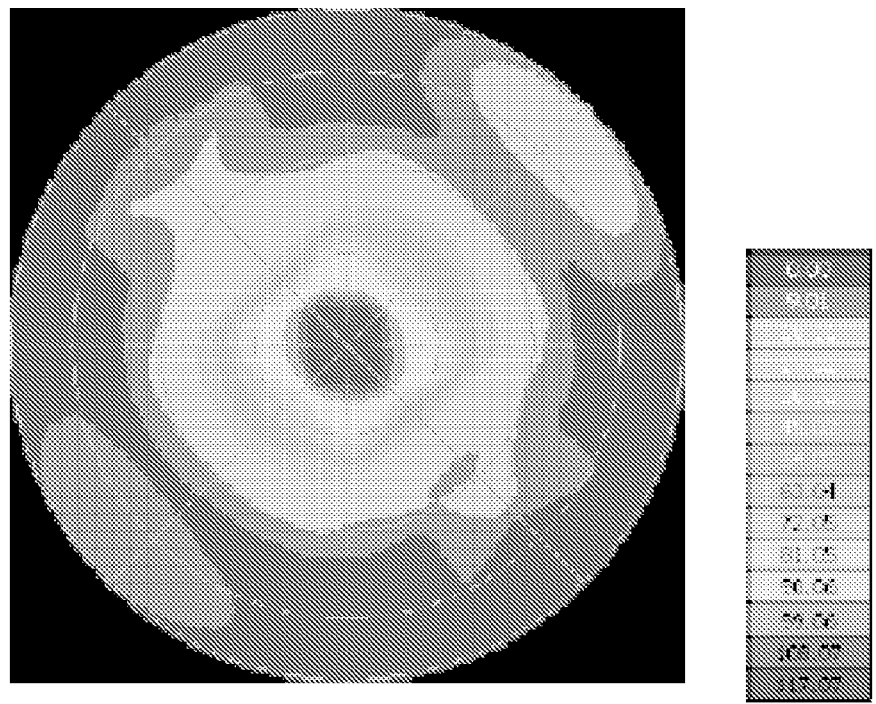
FIG. 17E provides the output plot for the structured diffuser backlight configuration of FIG. 17B.

Conversely, in configurations using crossed 0/90 films, the use of an SSD gain diffuser may provide enhanced output over SSU gain diffuser configurations. The enhanced light output from a backlight having 0/90 crossed recycling films and an SSD gain diffuser is evident from a comparison of the output plot shown in FIG. 16D (corresponding to the SSD backlight configuration of FIG. 16A) to the output plot shown in FIG. 16E (corresponding to the SSU backlight configuration of FIG. 16B). Similarly, the exit distribution of the light source incorporating 45/135 recycling films and the SSD gain diffuser produces higher output when compared to the output of a light source using 45/135 recycling films and an SSU gain diffuser. FIG. 17D shows the conoscopic output of the light source with 45/135 recycling films and an SSD gain diffuser illustrated in FIG. 17A. FIG. 17E shows the conoscopic output of the light source with 45/135 recycling films and an SSU gain diffuser. Comparison of FIGS. 17D and 17E illustrates the higher gain of the backlight having the SSD gain diffuser.

Figure 16A:
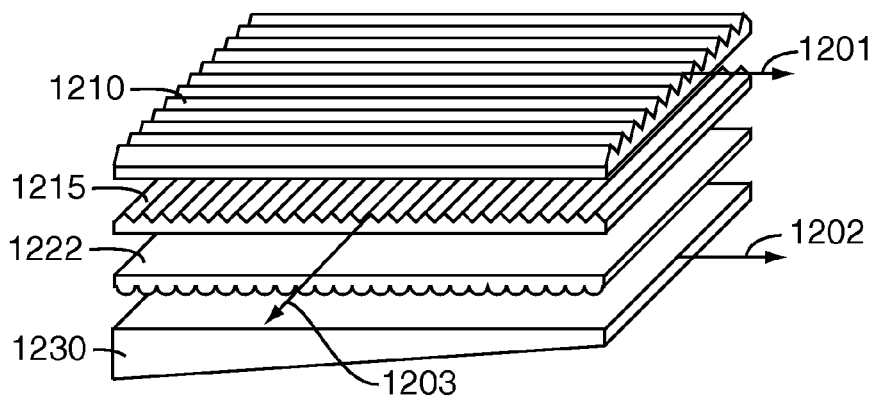
FIGS. 16A and 16B illustrate backlights having a structured diffuser and two recycling films oriented at angles of 0 and 90 degrees with respect to the longitudinal angle of the lightguide.
Figure 16B:
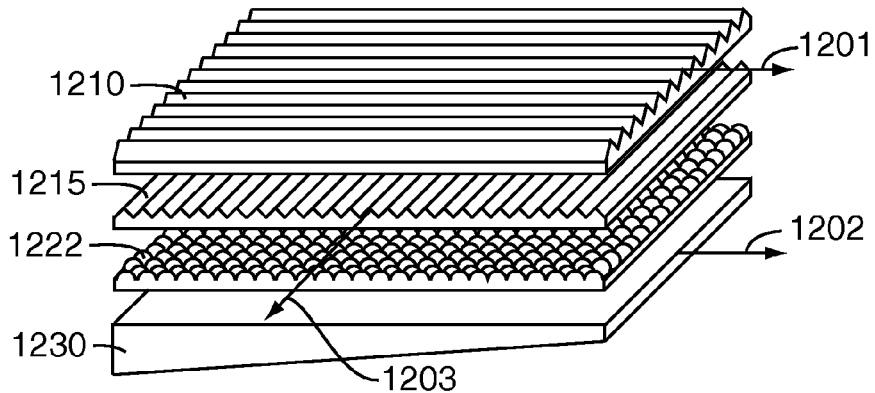
Figure 16C:
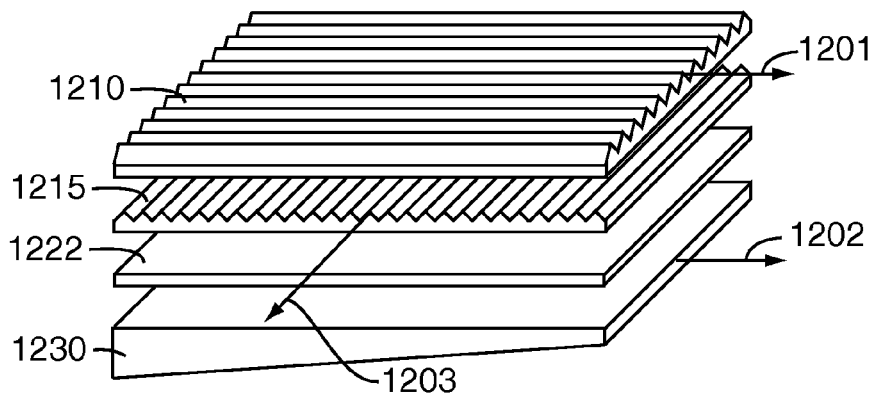
FIG. 16C illustrates a backlight incorporating an unstructured diffuser and a two crossed recycling films.
Figure 16D:
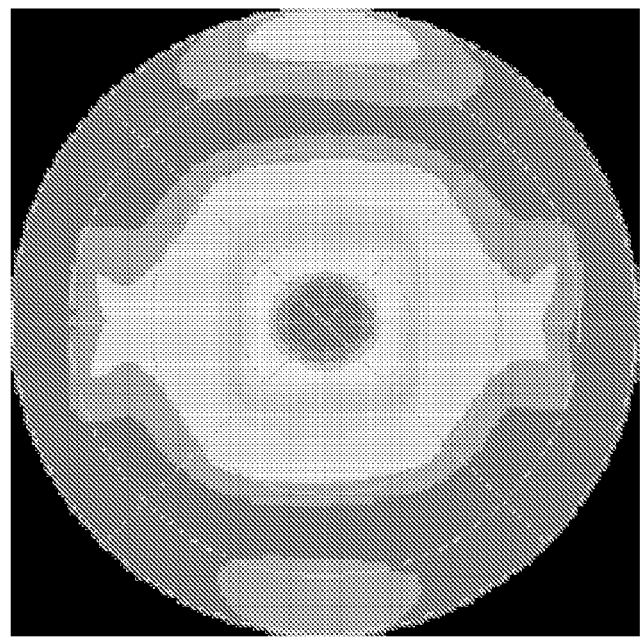
FIG. 16D provides the output plot for the structured diffuser backlight configuration of FIG. 16A.
Figure 16E:
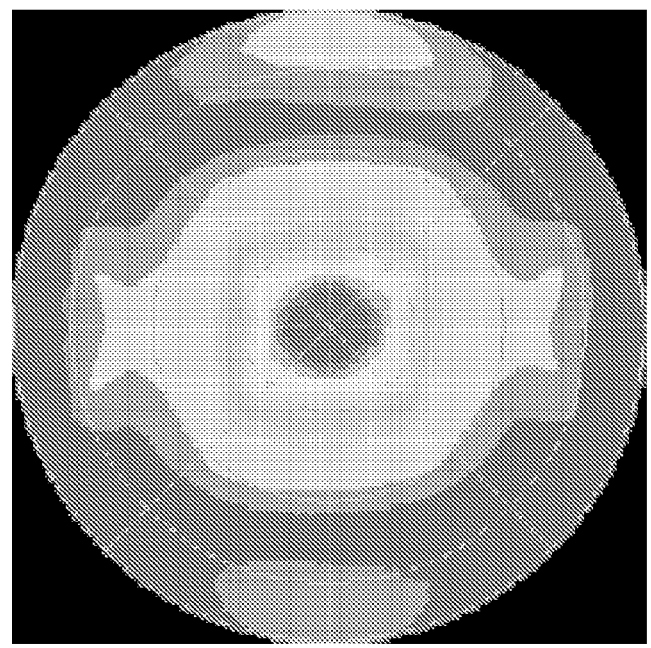
FIG. 16E provides the output plot for the structured diffuser backlight configuration of FIG. 16B.
Figure 16F:
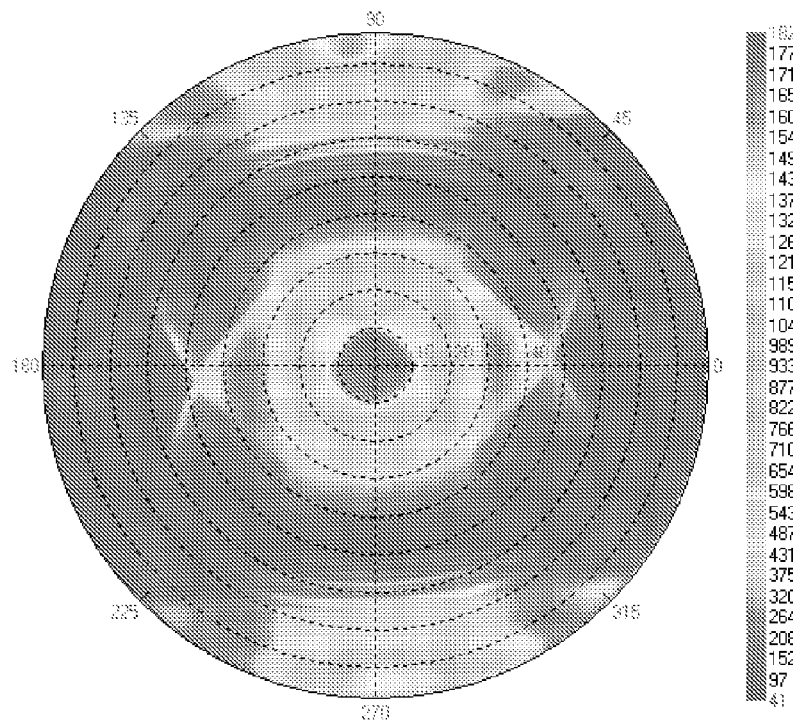
FIGS. 16F and 16G, respectively, provide conoscopic output plots for the backlight with 0/90 recycling films without and with an unstructured gain diffuser.
Figure 16G:
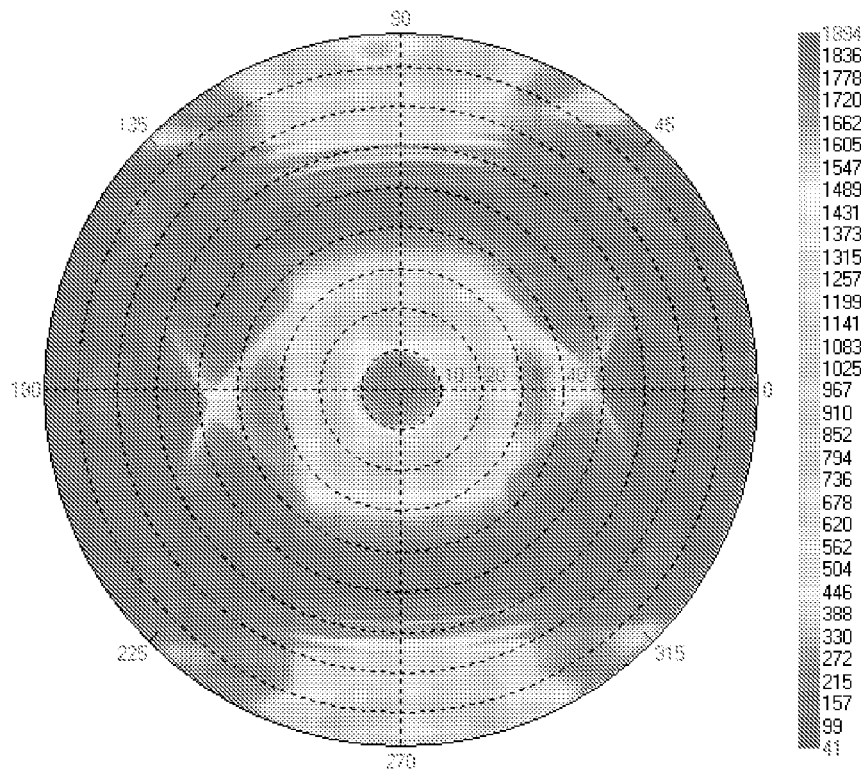
Figure 17F:
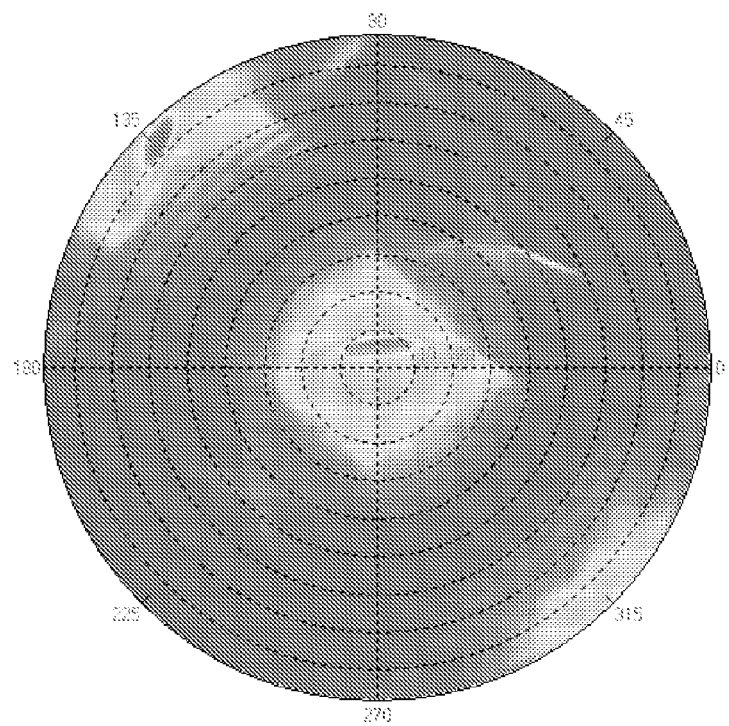
FIGS. 17F and 17G, respectively, provide conoscopic output plots for the backlight with 45/135 recycling films without and with an unstructured gain diffuser.
Figure 17G:
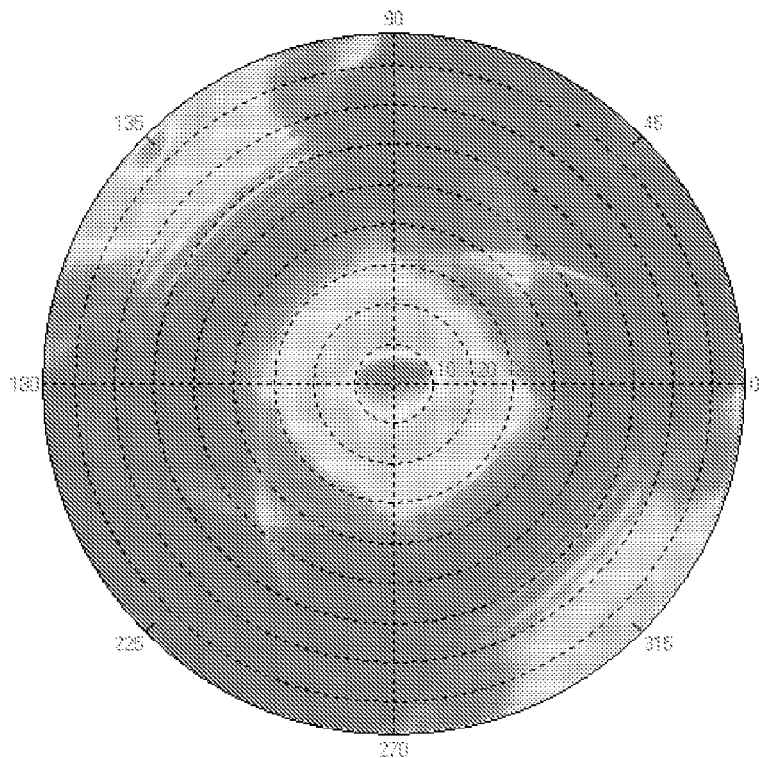

FIGS. 16F and 16G, respectively, provide conoscopic output plots for the backlight with 0/90 recycling films without and with an unstructured gain diffuser. FIGS. 17F and 17G, respectively, provide conoscopic output plots for the backlight with 45/135 recycling films without and with an unstructured gain diffuser. Comparison of the conoscopic plots of FIGS. 16F and 16G to the plots of FIGS. 17F and 17G show that the 45/135 crossed recycling film configuration is superior to the 0/90 configuration for lightguides without a diffuser or with an unstructured diffuser.

The above examples illustrate that consideration of the light source exit distribution and the optimal incident angle range of the films for first-pass light may be used to design backlight systems that have desired light output characteristics. For example, the ability to control the amount of correspondence between the exit distribution of the light source and optimal incident angle range of the recycling films allows the design of backlight systems optimized for on-axis gain, a characteristic that may be controlled substantially by the amount of first-pass light through the films. Alternatively or additionally, the backlight design may be optimized for backlight characteristics that are dependent primarily on the amount of recycled light In some backlight applications, light leaks out from the bottom surface of the lightguide, which is then reflected back by a bottom reflector. In some embodiments, the component of the light source used to shape the exit distribution of the light comprises the bottom reflector (150 in FIG. 1). For example, a substantially flat reflector, a structured reflector or a prismatic reflector may be used to direct the light leaked from the bottom surface of lightguide toward the optimal incident angle range of the recycling films. Through the use of this reflector, light may be reflected to overlap the optimal incident angle range of recycling films, and the amount of leakage light is also decreased. The following configurations illustrate backlight design to improve the optical efficiency and the contrast ratio of LCDs that may be achieved through control of the characteristics of the back reflector.

Figure 18:
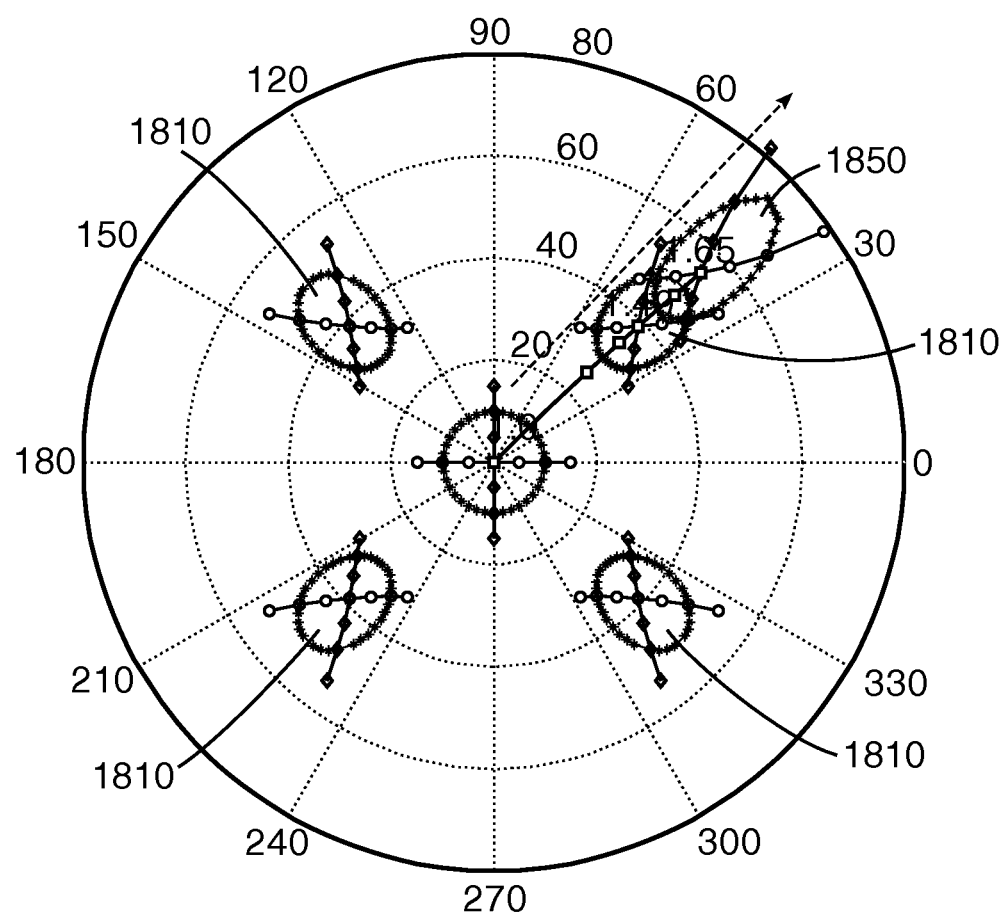
FIG. 18 is a plot that illustrates the optimal first-pass incident angle range for 0/90 recycling films having a prism apex angle of 90 degrees and a refractive index of 1.56.

The conoscopic plot of FIG. 18 illustrates the optimal first-pass incident angle range for 0/90 recycling films having a prism apex angle of about 90 degrees. As the refractive index of the films changes, the optimal incident angle range, which appears as regions 1810 symmetrically occurring in four quadrants of the conoscopic plot, shift toward higher inclination angles. For example, for crossed 0/90 films having a refractive index of 1.56, the optimal incident angle regions 1810 are centered at an inclination angle of 44.95 degrees and an azimuth angle of 43.15 degrees. As the index of refraction increases to 1.65, the center of the optimal incident angle range 1850, shown in only one quadrant of FIG. 18, changes to 54.83 degrees inclination and 42.68 degrees azimuth.

The light source may be designed to produce an angular exit distribution that is compatible with films having a particular index of refraction. Alternatively, when designing a backlight system, the index of refraction of the films may be selected to achieve compatibility with a particular light source exit distribution.

In some embodiments, the exit distribution of the light source is controlled by characteristics of a structured reflector having tilted reflective structures. The tilted reflective surfaces can be used to shape the exit distribution of the light source to achieve compatible operation with the recycling films to produce backlight output having desired characteristics of gain and/or uniformity.

Figure 19A:
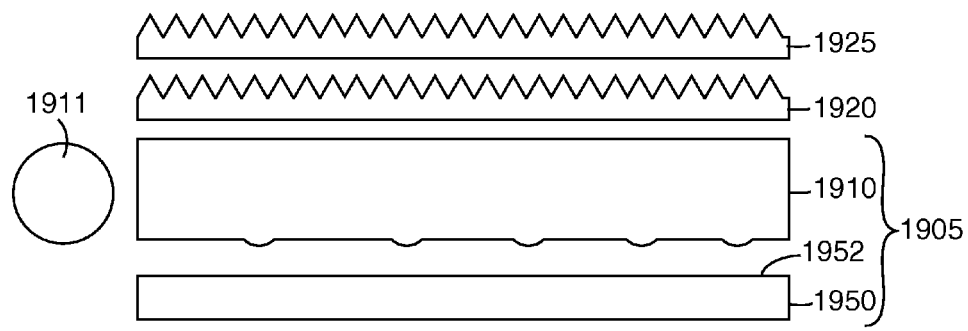
FIG. 19A illustrates a reflector having substantially smooth reflective surface oriented toward the lightguide that may be used to shape the exit distribution of the light source in accordance with embodiments of the invention.
Figure 19B:
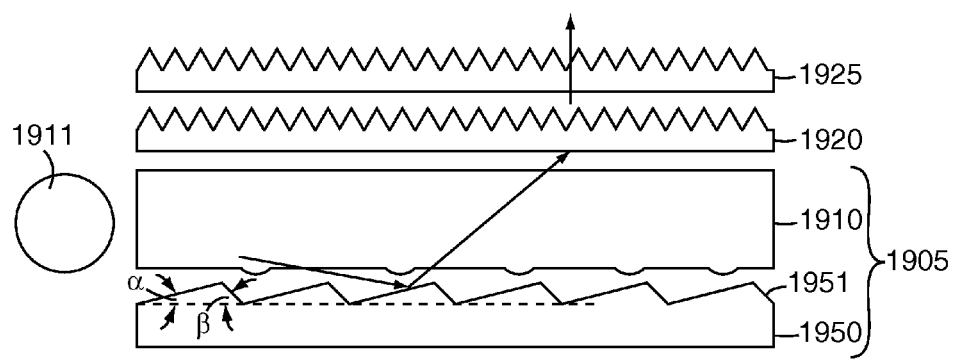
FIG. 19B illustrates a reflector having a structured surface oriented toward the lightguide that may be used to shape the exit distribution of the light source in accordance with embodiments of the invention.

A cross sectional view of a backlight using a reflector matched to crossed recycling films in accordance with these embodiments is illustrated in FIGS. 19A and 19B. As illustrated in FIGS. 19A and 19B, the backlight includes a lightguide 1910, lamp 1911, and prism films 1920, 1925. Characteristics of the light source reflector 1950 may be used to influence exit characteristics of the light source to control the amount of overlap between the exit distribution and the optimal incident angle range of the recycling films. FIG. 19A illustrates a reflector 1950 having substantially smooth reflective surface 1952 oriented toward the lightguide 1910. FIG. 19B illustrates a reflector 1950 having a structured surface 1951 oriented toward the lightguide 1910.

Various embodiments of the invention are directed to certain combinations of enhanced specular reflectors (ESR) and recycling films used to maximize the on-axis brightness of a backlight. ESR film, available from 3M Company, St. Paul, Minn., is a stack of a first set of layers interleaved with a second set of layers. The refractive index of the first set of layers is different from the refractive index of the second set of layers. Where the layer thickness is selected to be around one quarter wavelength, light is reflected from the ESR film. By including a range of layer thicknesses in the stack, the ESR is highly reflective over a range of wavelengths. ESR used for backlight applications may have reflectivity greater than about 95% across the visible display wavelengths.

Alternately, a standard specular reflector such as a metal-coated polymer film could be used. In general, ESR can be used to enhance the intensity of light output from a backlight by improving recycling efficiency of the backlight cavity, due to the high reflectivity of ESR. However, ESR tends to narrow the angular exit distribution of the output from a light source that uses a wedge-type lightguide. Depending on design, this can also be true for other types of edge-lit display backlights (displays where a substantial amount of light enters from the side of the display), including LCD monitors having slab lightguides. However, with appropriate selection of the recycling films characteristics, the intense and narrow backlight output produced by ESR can be preferentially directed towards the viewer.

For example, the use of a light source incorporating ESR when combined with high refractive index recycling films, where the refractive index, n, is greater than about 1.60, may be used to provide a backlight with enhanced gain. Any application that benefits from a narrow set of intense backlight output angles could utilize an appropriately designed combination of ESR or other high specular reflectors with recycling films optimized for a certain set of input angles. Characteristics of the recycling films, e.g., refractive index and/or prism shape, may be selected for compatibility with the exit distribution of the ESR light source.

Using this approach, the off-axis peak intensity of a light source using an ESR reflector is compatible with the optimal first-pass incident angle range of high-index (n>1.60) recycling films, making the combination of these films with ESR in a wedge lightguide system one of the preferred embodiments. High-index prismatic films of the reflector may be made from a combination of high-index organic monomers loaded with ZrO2 nanoparticles and cured under UV illumination, with a final cured index of ~1.66-1.68.

Through the use of these high refractive index films in conjunction with an ESR reflector, the on-axis gain of the system can be enhanced because of the shift toward first-pass events over light recycling. The achievement of desired output angle and higher system brightness, relative to standard refractive index recycling films, can be useful in display systems both with and without reflective polarizers. The low absorption and high index of the high-index resins used leads to higher brightness enhancement in the total system. This advantage is even more pronounced when ESR is included as a back-reflector, making this combination of ESR with high-index prism films desirable not only for on-axis light direction but also for total system brightness.

Previous designs have not included the application of high-index prism films in turning off-axis backlight output back to on-axis; particularly in wedge backlights containing a specular back-reflector. Other embodiments may include recycling films with custom-designed combinations of refractive index and prism shapes that would take a particular angular exit distribution of the light source and redirect the light to be substantially on axis with a desired viewing angle and may also be used to achieve a predetermined ratio between first-pass and recycled light. High refractive index films advantageously provide the ability to effectively utilize light with a relatively narrow exit distribution, as is produced by an ESR reflector.

One aspect of this embodiment is related to the discovery that ESR (or another specular reflector) tends to create more off-axis light intensity in certain light source systems, such as light sources incorporating wedge lightguides. The embodiments described herein demonstrate a particular strategy involving the use of high-index prism films to compensate for the exit characteristics of these light sources by shifting the optimal first-pass incident angle range of the films. In addition, it should be recognized that there are a number of other strategies for shifting the incident angle range of the films that are also included within the scope of this disclosure. These strategies may include, but are not limited to, changing recycling prism shapes or geometries; utilizing other structured films above the lightguide where the structures are not generally considered to be prisms, such as lens films, aperture films, photonic band-gap structures, or films having intrinsic slanted mirrors; adjusting the placement or position (i.e. the angle) of the specular reflector in the backlight; adding a structured surface to the front of the specular reflector; shaping the specular reflector itself to re-direct the backlight output angles (i.e. molding the specular reflector into a ridged structure); or changing the wedge light-guide shape or surface structure to interact with the specular reflector to create preferred output angles.

A separate aspect is the general utilization of ESR (or another high specular reflector) in backlight systems where a deterministic (restricted to a narrow range of angles) light output is preferred. Generally, the use of a specular reflector (ideally, but not limited to, enhanced multilayer reflectors such as ESR) is proposed as a solution for any LCD backlight system where it is desirable to have a deterministic, narrow range of output angles from the backlight. This improves on the prior art by using ESR as an angle-narrowing component in creating a deterministic backlight system, in addition to simply using the highly reflective properties of ESR in a recycling cavity as described in the prior art.

As stated above, one embodiment of this invention utilizes high-index prismatic films to effectively re-direct off-axis light toward an on-axis viewer. This off-axis light output is typical of edge-lit backlight systems in certain LCD displays, such as LCDs employed in notebook computers and handheld devices. It has been found that using a specular reflector such as ESR behind such an edge-lit light-guide greatly intensifies the off-axis backlight output peak relative to the on-axis backlight output. Thus, for these systems it is advantageous to use high-index prismatic films, as opposed to standard refractive index films because optimal first-pass incident angle range of the high-index films more closely matches the exit distribution of the light source. The concept of compensating for the exit distribution of light due to the presence of ESR can be extended to other angle-adjusting strategies, as described herein. A further aspect of this invention is the application of ESR (or another specular reflector) as an "angle-narrowing" component in a backlight system where a deterministic output is desired.

Figure 20A:
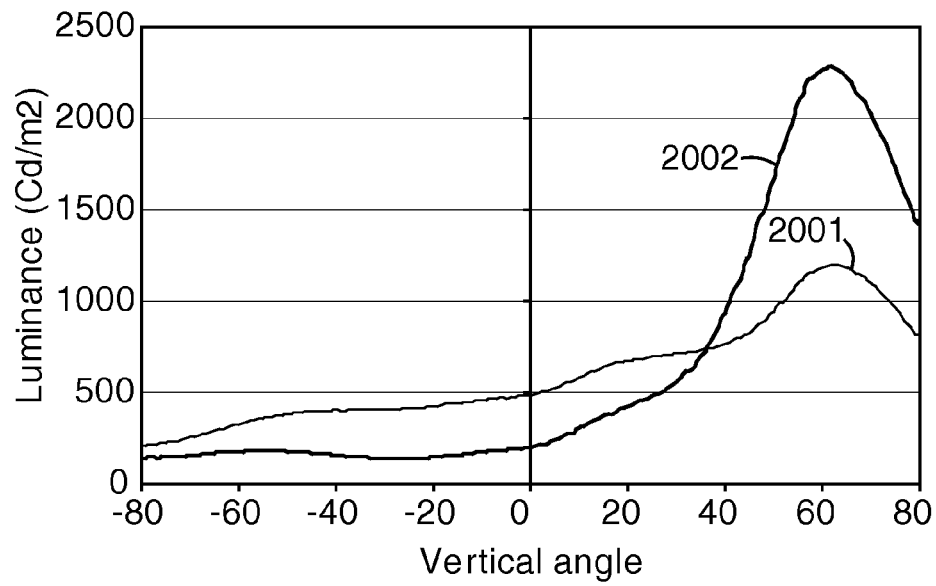
FIG. 20A illustrates a vertical cross-section of wedge backlight outputs luminance vs. angle through the bottom diffuser sheet for a backlight system without recycling films.

FIG. 20A provides a plot of a vertical cross section of wedge backlight output intensity vs. output angle through the bottom diffuser sheet for a backlight system without recycling films. Graphs 2001 and 2002 illustrate the intensity to angle relationship for a white reflector and ESR, respectively. Note that when ESR is used, the peak output of the backlight becomes much more intense and narrow, making the entire system more deterministic.

Figure 20B:
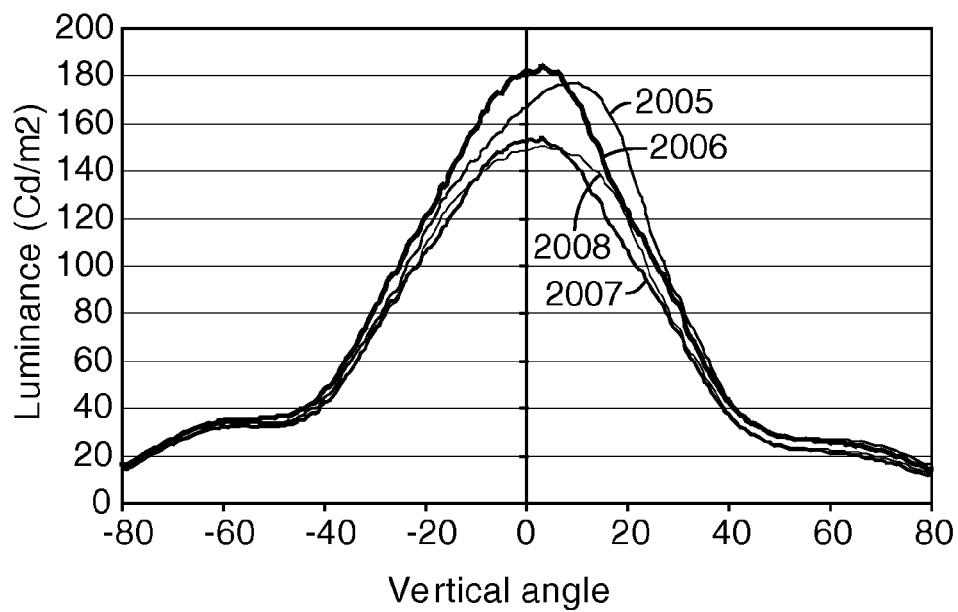
FIG. 20B illustrates luminance vs. output angle plots depicting the effects of various backlight configurations.

FIG. 20B illustrates luminance vs. output angle plots depicting the effects of various backlight configurations described above in a particular LCD display system (Dell D800 15.4" WXGA). These are vertical cross sections of the light output from the backlight. Graphs 2005 and 2008 relate to backlight systems incorporating recycling films having a refractive index of about 1.58, where the system corresponding to graph 2005 uses an ESR reflector and the system corresponding to graph 2008 uses a white reflector. Graphs 2006 and 2007 relate to backlights incorporating high-index prism films, with refractive index of about 1.66 as described in U.S. Patent Publication 2006/0210726 which is incorporated herein by reference. The system corresponding to graph 2006 uses an ESR reflector and the system corresponding to graph 2007 uses a white reflector. The lower two curves (2007, 2008) are the system outputs with a diffuse white reflector, while the more intense curves (2005, 2006) are from systems where the reflector was replaced with multilayer ESR. Note that when standard refractive index films are combined with ESR, the amount of off-axis light is very pronounced. The use of high index recycling films produces more light on-axis with desired viewing angle.

Returning now to FIG. 19B, the backlight system may include a specular reflector 1950 having structures on at least one surface. As previously discussed, light that leaks from the lightguide 1910 is reflected by the reflector 1950 toward the prism films. The reflected light contributes to the angular exit distribution of the light source which may be controlled to match an input distribution for a particular recycling film configuration. As an example, if increased on-axis gain is desired, the reflector may direct light toward the optimal first-pass incident angle range of the recycling films.

In some embodiments, a microstructured specular reflector 1950 may be used to reflect light to the recycling films 1920, 1925. The microstructures are selected to reflect the recycled light to the films 1920, 1925 such that the light is directed substantially on-axis with a desired viewing angle. The microstructures have first and second base angles and an apex angle. The approaches described herein may be used to control the gain, to control the defect-hiding and uniformity characteristics of the display and/or to tailor the gain distribution to accommodate different viewing directions or different ranges of viewing directions. For example, the light can be concentrated in a set of narrow viewing angles in one direction and a set of wide viewing angles in another direction, the maximum brightness can be normal to the display screen or optimized at some angle not normal to the display, etc.

The use of a microstructured specular back reflector to control the characteristics of the display provides degrees of freedom that allow the viewing direction with maximum gain and the angular size of the viewing region with optimized gain to be tailored to the display requirements. This approach provides an advantage over backlights with flat diffuse or specular back reflectors because flat reflectors do not allow for changing the direction of maximum gain.

The structured reflector 1950 has tilted structures with reflective surfaces 1951. The tilted structures have a left base angle that tilts the reflective surfaces toward the lamp 1911. The axis along the peaks of the structures is oriented at an angle, e.g., about 90 degrees, with respect to the longitudinal axis of the lightguide 1910. The left base angle of the reflector structures may be selected to shape the exit distribution of the light source 1905 to be compatible with a particular configuration of the recycling films 1920, 1925. Coating a high reflectivity material, such as Ag. Al, $BaSO_4$ or $TiO_2$, directly on a structured polyethylene terephthalate (PET) substrate is one method to manufacture this reflector 1950.

For example, a lightguide configuration may allow light to leak from the bottom surface of lightguide 1910 at an angle of about 85 degrees with respect to the normal direction of the bottom surface of lightguide 1910. As previously discussed, the center of the optimal incident range is about 45 degrees for the crossed recycling films having a prism apex angle of 90 degrees and refractive index of 1.56. Based on the reflection law, the left base angle of the reflector microstructures may be selected to be about 20 degrees for crossed recycling films having these characteristics.

Figure 19C:
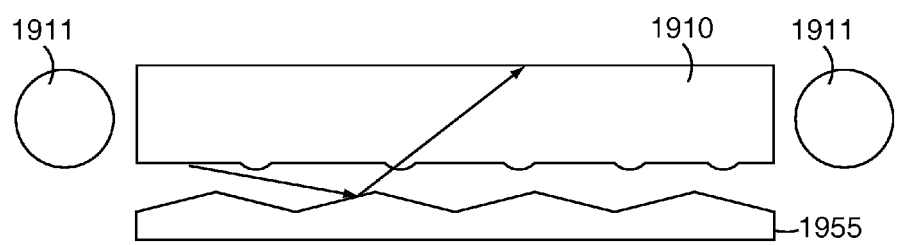
FIG. 19C is a diagram illustrating a reflector having symmetrical tilted reflective structures.

For the monitor applications, lamps 1911 are typically positioned on both sides of lightguide 1910, as illustrated in FIG. 19C. In these implementations, the reflector 1955 may use symmetrical tilted reflector structures having the equal right and left base angles.

Figure 20C:
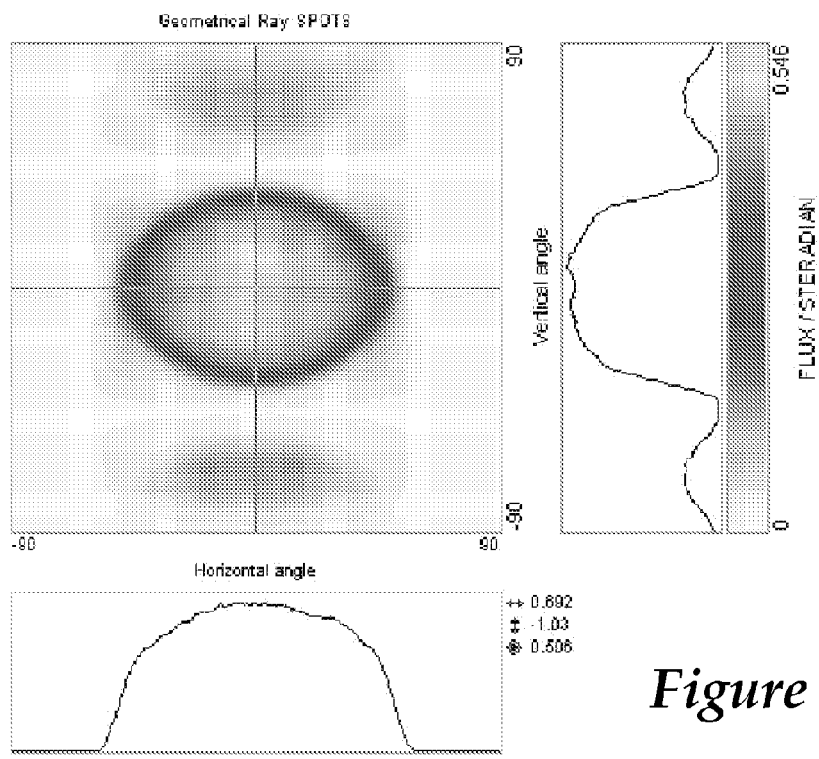
FIGS. 20C and 20D are plots of the backlight output flux normal to the display surface for a flat and microstructured reflector, respectively.
Figure 20D:
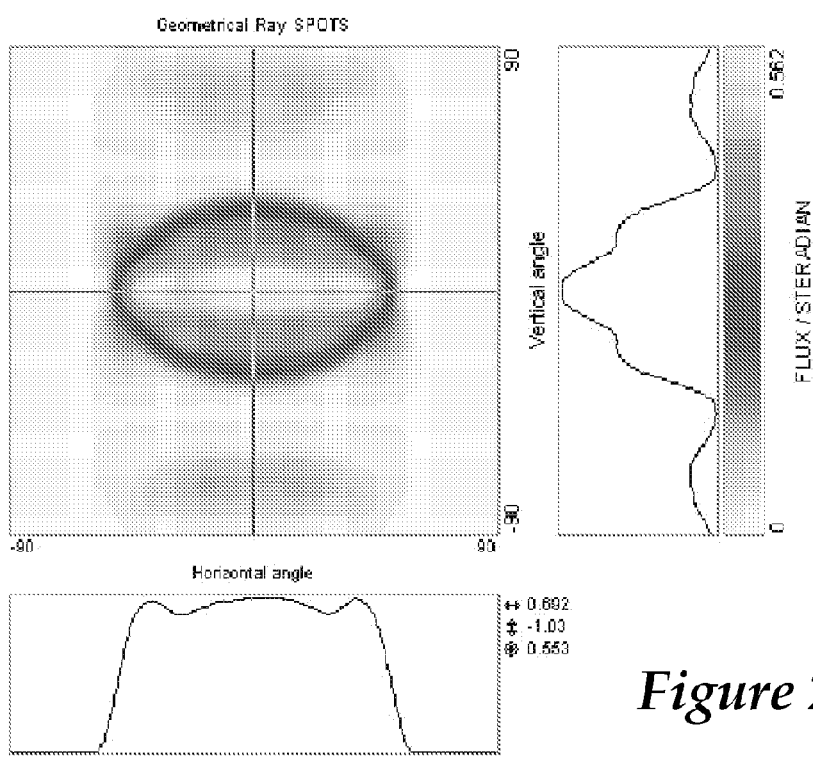

A comparison of the gain of a typical display using a flat white reflector and a microstructured specular back reflector where the microstructures have an apex angle of about 150 degrees is provided by FIGS. 20C and 20D. The display configuration has a lamp 1910, a reflector 1950, and a recycling film 1920 as illustrated in FIGS. 19A and B, respectively. FIG. 20C is the plot of the backlight output flux normal to the display surface for the flat reflector. FIG. 20D is the plot of the backlight output flux normal to the display surface for the microstructured reflector. As can be observed from these plots the use of the microstructured reflector provides a backlight output flux of 0.553 normal to the display surface as compared to a backlight output flux of 0.506 for the flat white reflector. This effect occurs because the light energy is squeezed into a smaller vertical angular viewing region by the microstructured back reflector. Using different microstructures in the back reflector in conjunction with single or crossed recycling prism films allows flux distribution to be optimized for various viewing angles and regions of viewing angles.

Figure 21:
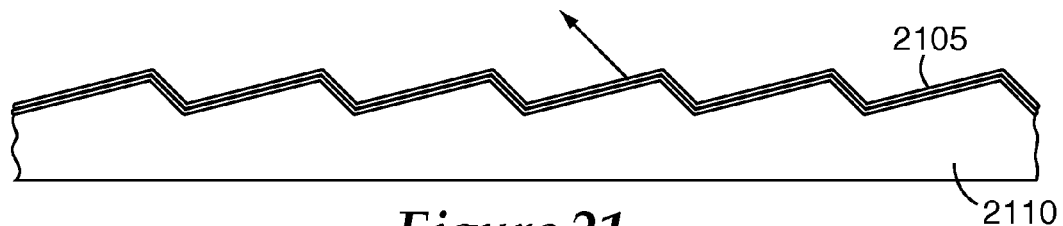
FIG. 21 is a diagram of a structured reflector having an enhanced specular reflector (ESR) film laminated on a structured substrate in accordance with embodiments of the invention.

A structured reflector 2100 in accordance with one embodiment is illustrated in FIG. 21. The structured reflector 2100 has an enhanced specular reflector (ESR) film 2105 laminated on a structured substrate 2110.

Figure 22:
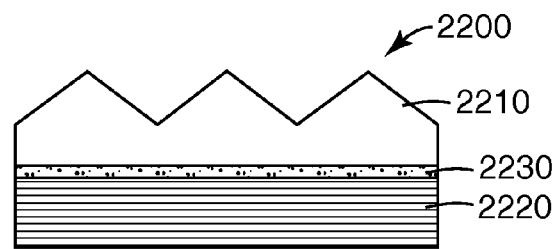
FIG. 22 is a diagram of a reflector including a prism film disposed on an ESR substrate in accordance with embodiments of the invention.

FIG. 22 illustrates another embodiment of a reflector 2200 that may be used to shape the angular exit distribution of a light source. In this embodiment, a prism film 2210 is disposed on an ESR substrate 2220. For example, the prism film 2210 may be laminated to an ESR substrate 2220 by optical clear adhesive 2230 to form a structured reflector for LCD backlight application. Characteristics of the prism film/ESR reflector, including, for example, reflector prism apex angle, index of refraction, and left and right reflector prism base angles, may be selected to facilitate directing light exiting from a light source into the optimal first-pass incident angle range of one or more recycling films. A backlight having a reflector of this configuration may be used to increase on-axis light exiting from a display and/or to improve the defect-hiding capacity and/or uniformity of the light over previous reflectors. Refraction and reflection of the light at the prism and air interface increases the light intensity toward the LCD panel. An additional advantage of this embodiment is increased durability of the reflector having a prism film disposed on an ESR reflector when compared to an ESR reflector alone.

An examination of radiance as a function of prism facet angle with respect the plane of the reflector reveals that for prism refractive index of 1.58, a prism facet angle of about 13.5 degrees returns a normally incident ray 30 degrees from normal. The incident ray 30 degrees from normal would be redirected by the recycling films back to normal.

Figure 23:
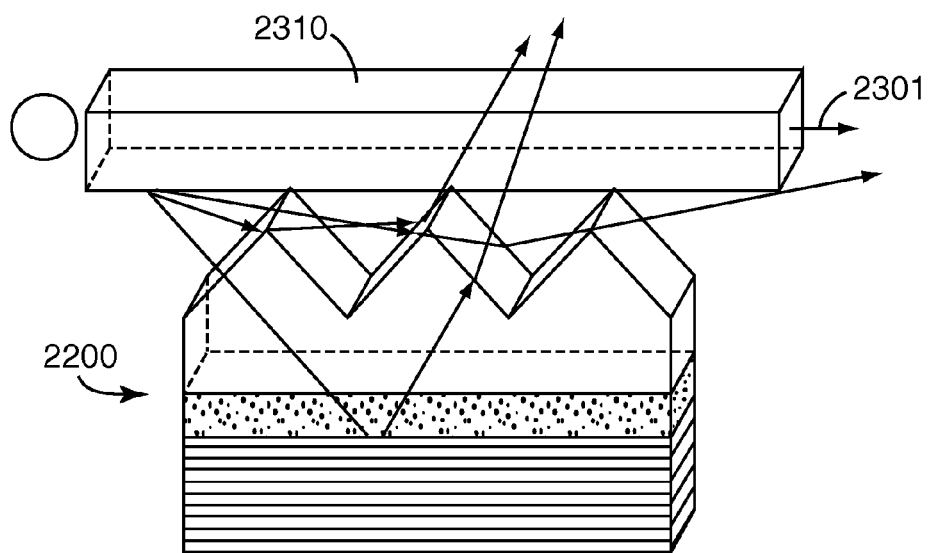
FIG. 23 illustrates the arrangement of the reflector illustrated in FIG. 22 in relation to a lightguide.

FIG. 23 illustrates the arrangement of the reflector 2200 illustrated in FIG. 22 in relation to the lightguide 2310. The prism axis of the reflector 2200 is oriented at an angle, e.g., about 90 degrees with respect to the longitudinal axis 2301 of the lightguide.

Figure 24:
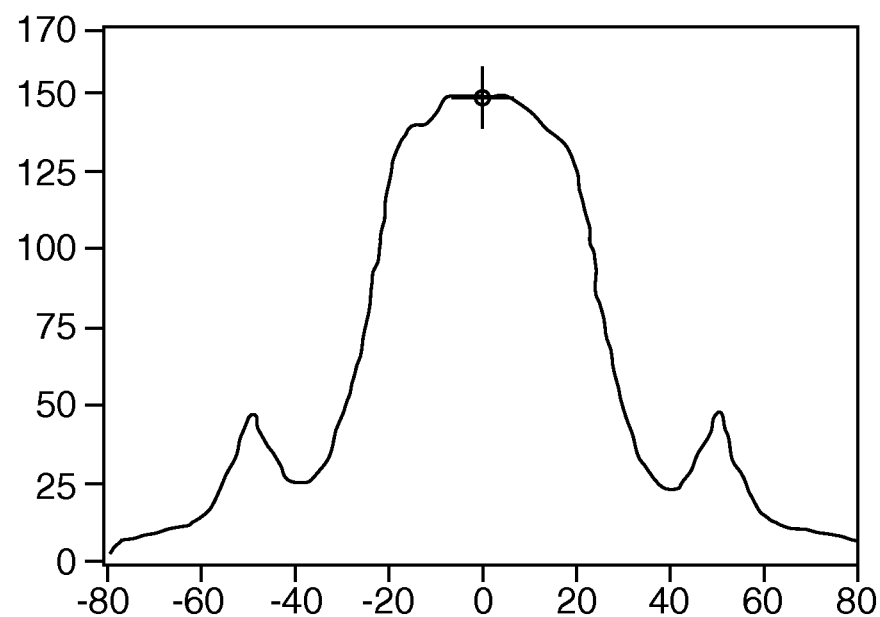
FIG. 24 shows an output plot for a backlight having a flat white reflector.
Figure 25:
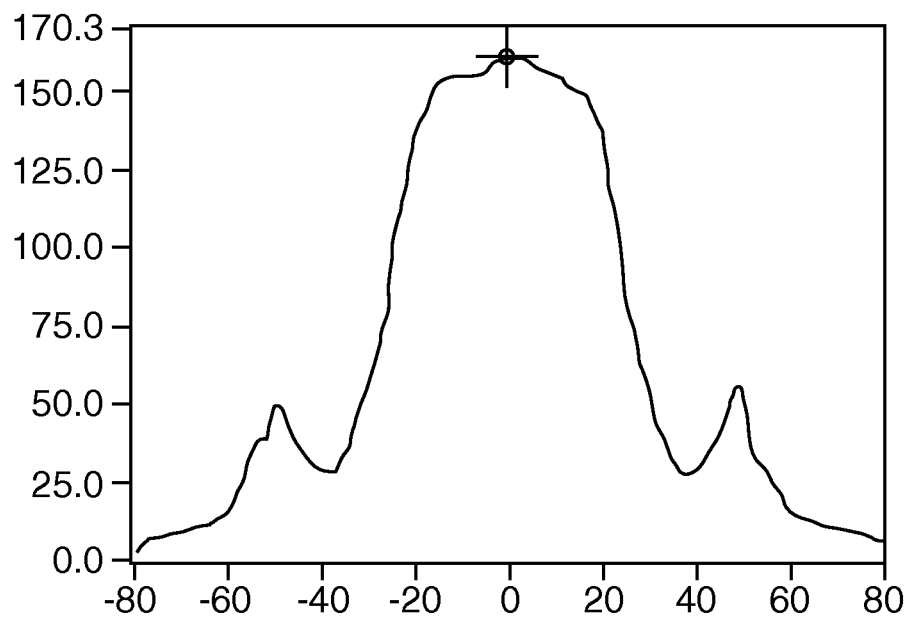
FIG. 25 shows an output plot for a backlight having an ESR reflector.
Figure 26:
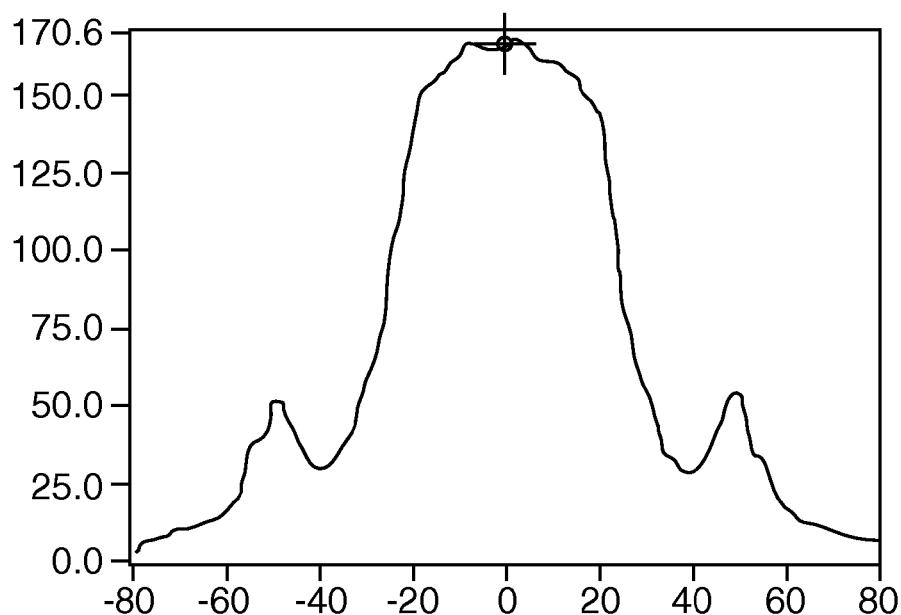
FIG. 26 shows an output plot for a backlight incorporating the reflector illustrated in FIG. 22.
Figure 27A:
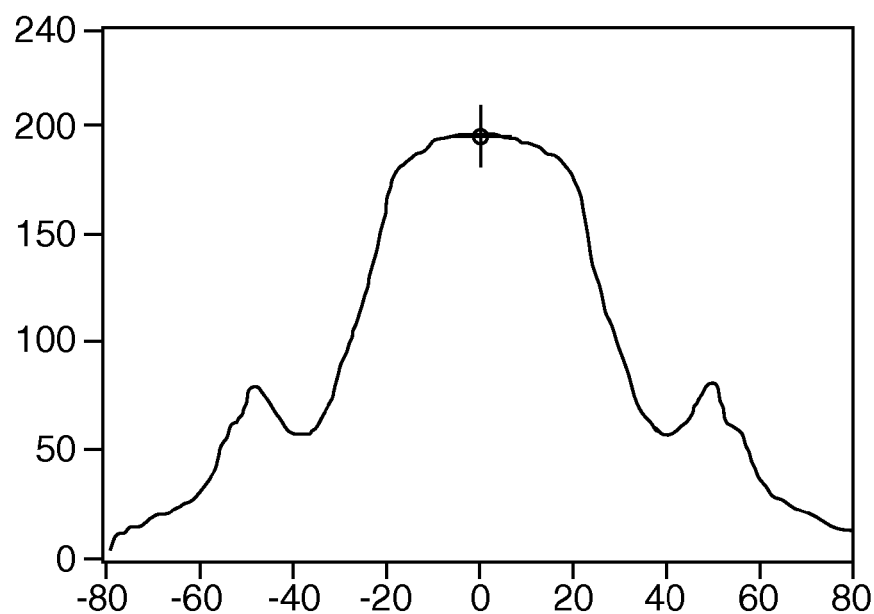
FIG. 27A shows an output plot for a backlight having a flat white reflector and using DBEFII polarizer sheet.
Figure 27B:
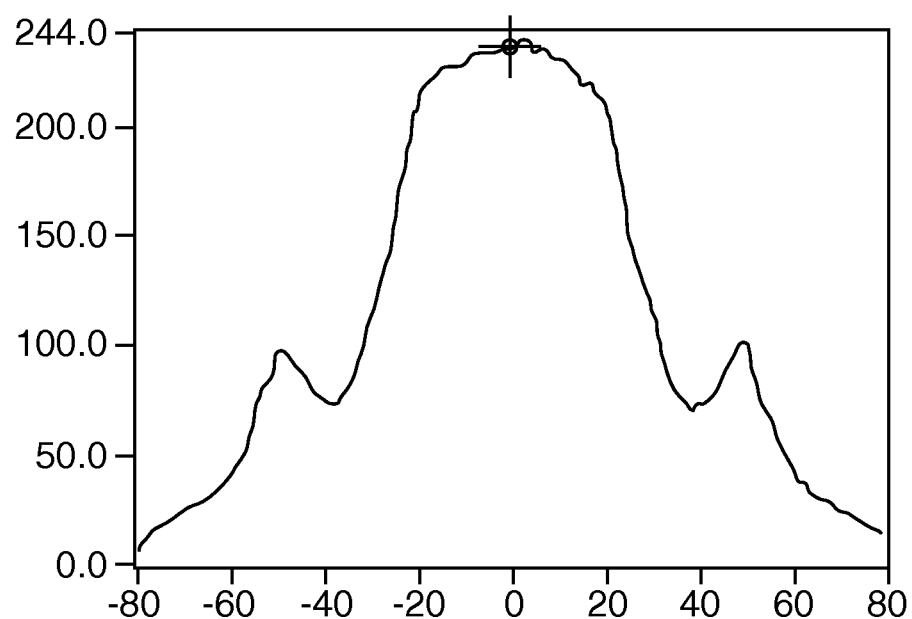
FIG. 27B shows an output plot for a backlight incorporating the reflector illustrated in FIG. 22 used with DBEFII.

FIGS. 24, 25, and 26 show conoscopic plots of backlight outputs for a white reflector (FIG. 24) and an ESR reflector (FIG. 25) for comparison with the prism film/ESR reflector embodiment (FIG. 26) having the configuration illustrated in FIG. 22. As is evident from FIGS. 24, 25, and 26, the prism film/ESR reflector provides on-axis light intensity gain over the white reflector and ESR reflector designs. Furthermore, when a reflective polarizer sheet, such as DBEFII, available from 3M Company, St. Paul, Minn., is used between the recycling films and the liquid crystal panel, the intensity gain is further increased. FIGS. 27A and 27B allow comparison between a backlight having a white reflector and using a DBEFII polarizer sheet (FIG. 27A) and a backlight having a prism film/ESR reflector used with DBEFII (FIG. 27B). As can be understood from a comparison of FIGS. 27A and 27B, the prism film/ESR reflector provides enhanced on-axis gain for the backlight.

In some systems, the back reflector having prismatic or microstructured features may be used along with a lightguide that also has microstructures on the top and/or bottom surfaces. In this configuration, the exit angle from the light guide may be affected by both the surfaces of the reflector and the microstructures of the lightguide. The features of the reflector and the lightguide may be designed to function compatibly to shape the exit distribution of light from the light source.

In some embodiments, characteristics of the light source diffuser (140 of FIG. 1) may be used to shape the angular exit distribution of the light source. For example, altering the haze level of the diffuser affects the angular exit distribution of the light source. Appropriate selection of the haze level for compatibility with the characteristics of the recycling film(s) may be used to control the amount of overlap between the angular exit distribution of the light source and the optimal first-pass incident angle range of the recycling films.

Table 1 provides a listing of diffusers with varying degrees of haze and transmissivity characteristics. FIGS. 28A-F, FIGS. 29A-E, and FIGS. 30A-E illustrate the effect of diffuser haze characteristics on the angular exit distribution of the light source and the backlight output.

TABLE 1

| Diffuser | Transmissivity | Haze |
|---|---|---|
| 1 | 92.2 | 63.3 |
| 2 | 92.5 | 66.2 |
| 3 | 92.6 | 92.1 |
| 4 | 73.6 | 96.8 |
| 5 | 75.4 | 95.3 |

Figure 28A:
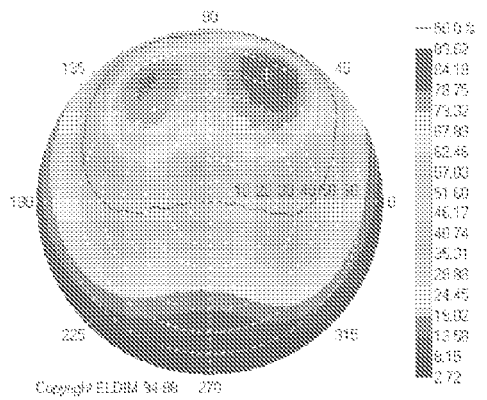
FIG. 28A is a conoscopic plot that illustrates the exit distribution of the lightguide alone without a diffuser.
Figure 28B:
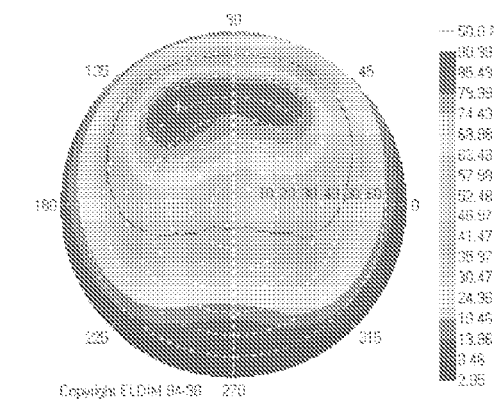
FIGS. 28B-28F are plots depicting the exit distribution of a light source incorporating the lightguide and various diffusers.
Figure 28C:
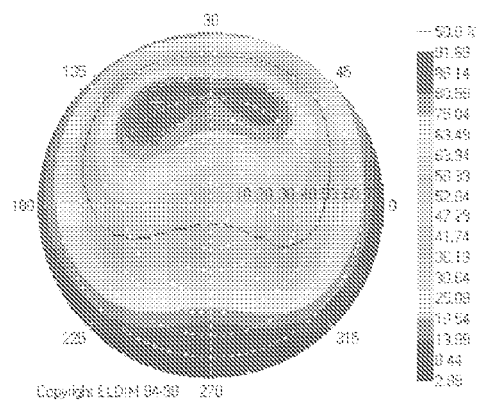
Figure 28D:
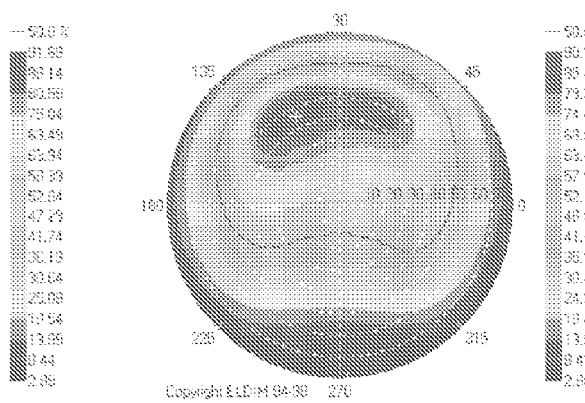
Figure 28E:
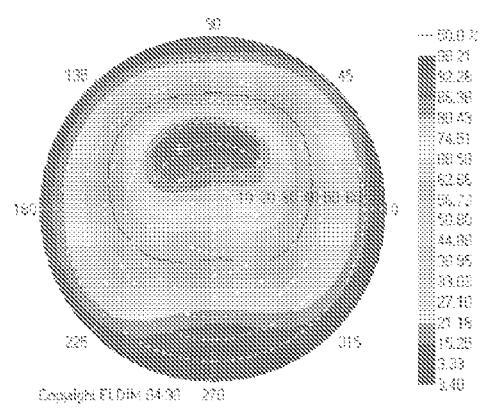
Figure 28F:
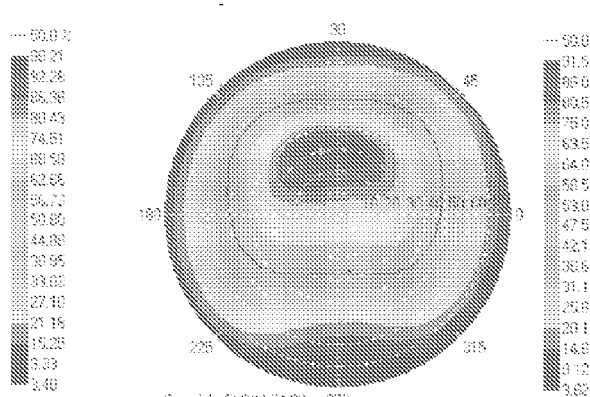
Figure 29A:
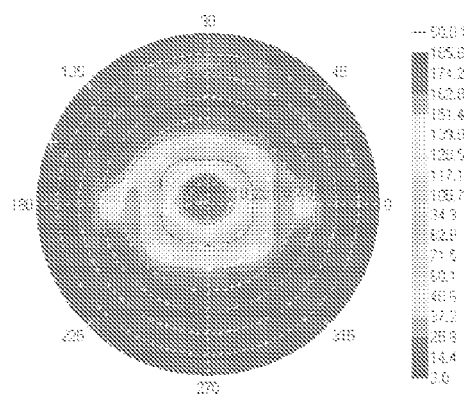
FIGS. 29A-E show the light output from the backlight having crossed recycling films with a refractive index of 1.56 and incorporating various diffusers.
Figure 29B:
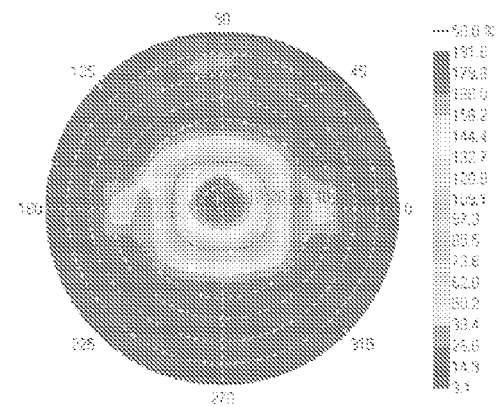
Figure 29C:
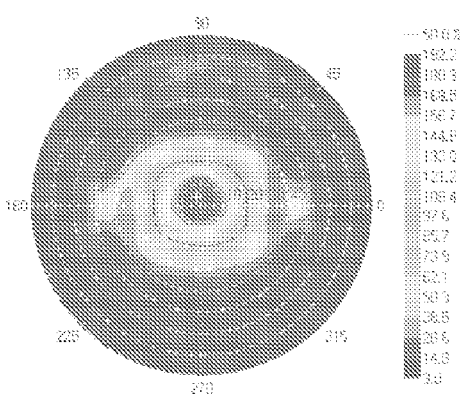
Figure 29D:
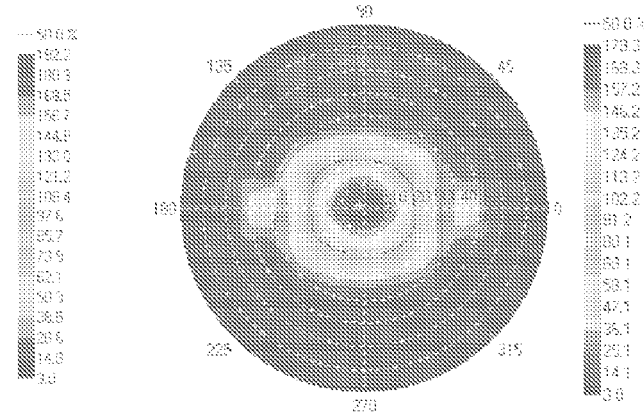
Figure 29E:
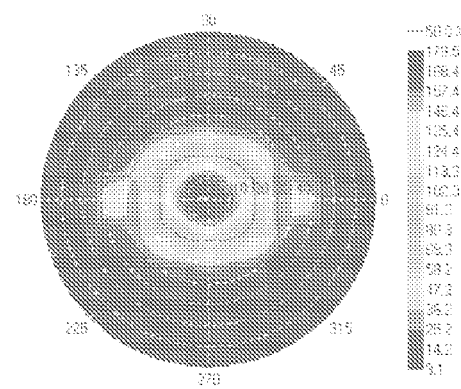

FIG. 28A is a conoscopic plot that illustrates the exit distribution of the lightguide alone. FIGS. 28B-28F are plots depicting the exit distribution of a light source incorporating the lightguide and diffusers 1-5, respectively. FIGS. 29A-E show the light output from the backlight having crossed recycling films with a refractive index of 1.56 and incorporating diffusers 1-5, respectively. FIGS. 30A-E show the light output from the backlight having crossed recycling films with a refractive index of 1.65 and incorporating diffusers 1-5, respectively.

Review of FIGS. 28B-28F shows that the haze and transmissivity characteristics of the diffuser help to shape the exit distribution of the light source. For example, the backlight with diffuser 1 having a relatively lower haze level shown in FIG. 28B exhibits a more spread out exit distribution than the exit distributions of backlights with diffusers 4 and 5, shown respectively in FIGS. 28E and 28F, which have relatively higher haze levels. FIGS. 29A-E are plots of the output distributions for backlights incorporating diffusers 1-5, respectively, used with crossed recycling films having refractive index of 1.56 (BEF2). FIGS. 30A-E are output distribution plots for backlights incorporating diffusers 1-5, respectively, used with crossed recycling films having refractive index of 1.65 (HGBEF). From the output plots of FIGS. 29A-E, FIGS. 30A-E, and Table 3 below, it may be observed that for both levels of refractive index, the backlight incorporating diffuser 3 has the highest luminance.

TABLE 3

| Backlight Structure | Luminance | Gain |
|---|---|---|
| Lightguide (LG) | 48.58 | |
| LG + Diffuser 1 | 55.04 | 1.13 |
| LG + Diffuser 1 and HGBEF | 202.2 | 3.67 |
| LG + Diffuser 1 and BEF2 | 194.2 | 3.53 |
| LG + Diffuser 2 | 55.33 | 1.14 |
| LG + Diffuser 2 and HGBEF | 209.8 | 3.79 |
| LG + Diffuser 2 and BEF2 | 201.4 | 3.64 |
| LG + Diffuser 3 | 60.83 | 1.25 |
| LG + Diffuser 3 and HGBEF | 212 | 3.49 |
| LG + Diffuser 3 and BEF2 | 205.3 | 3.37 |
| LG + Diffuser 4 | 77.22 | 1.59 |
| LG + Diffuser 4 and HGBEF | 201.9 | 2.61 |
| LG + Diffuser 4 and BEF2 | 195.2 | 2.53 |
| LG + Diffuser 5 | 76.77 | 1.58 |
| LG + Diffuser 5 and HGBEF | 207.3 | 2.71 |
| LG + Diffuser 5 and BEF2 | 197.3 | 2.58 |

Some embodiments of the invention are directed to achieving a desired level of overlap between a light source exit distribution and the first-pass input distribution of a particular recycling film configuration based on features of the lightguide. The top and/or bottom surface of lightguides may be non-structured, may have a micropattern of regular dots, or may include microstructured prisms. The particular type of lightguide for a backlight should have an exit distribution that is compatible with the optimal incident angle range of the films to achieve the desired level of overlap.

It may be advantageous for the output exit distribution of the lightguide to have an exit distribution that is tightly centered, but tight centering of the exit distribution is only effective if the exit distribution is compatible with the optimal incident angle range of the recycling films. If a focused exit distribution does not have overlap with the optimal incident angle range of the films, little is gained from the focused light. In these embodiments, a relatively unfocused lightguide exit distribution may be superior to a focused one.

Figure 31:
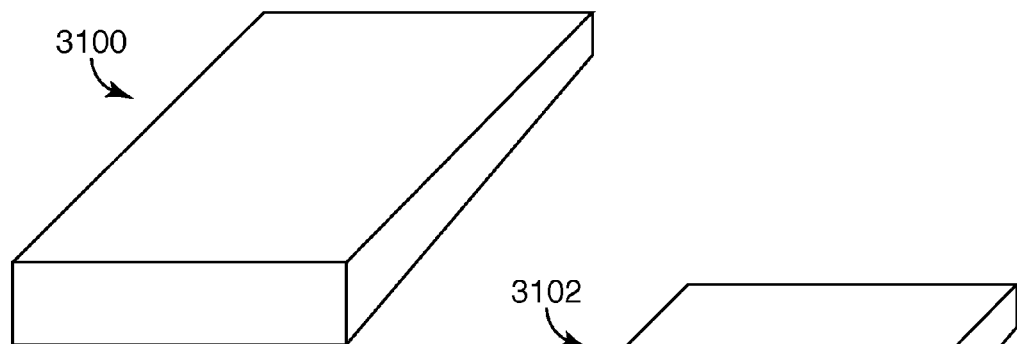
FIG. 31 shows a lightguide having non-structured top and bottom surfaces.
Figure 32:
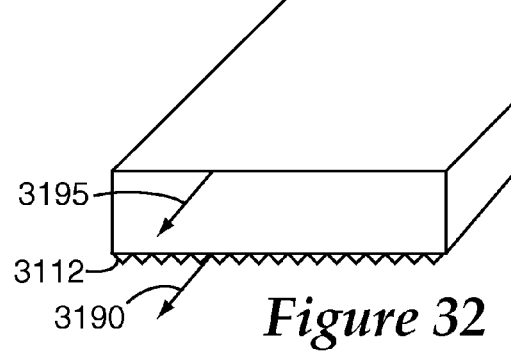
FIG. 32 is a diagram showing a lightguide having structures disposed on the lightguide surface oriented away from the recycling films.
Figure 33:
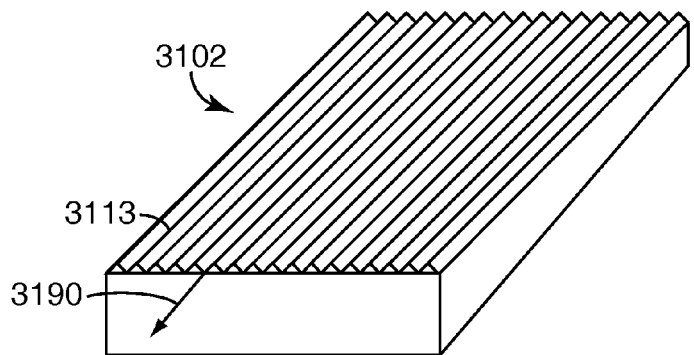
FIGS. 33 and 34 are diagrams showing lightguides having structures disposed on the lightguide surface oriented toward the recycling prisms.
Figure 34:
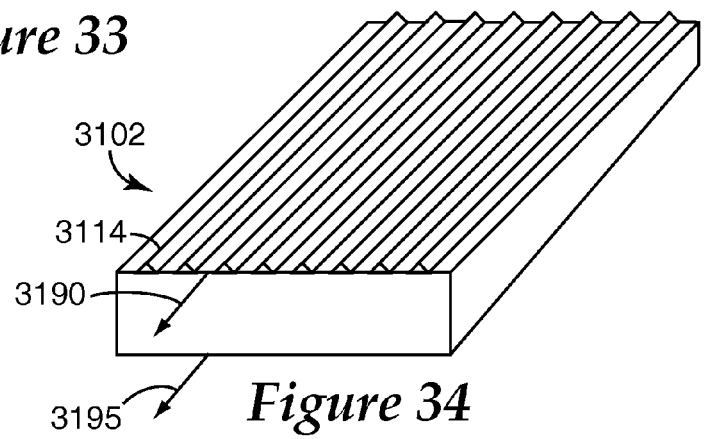

FIG. 31 shows a lightguide 3100 having non-structured top and bottom surfaces. FIGS. 32-34 illustrate three lightguides 3102, 3103, 3104 that include microstructures 3112, 3113, 3114 on one surface. As previously described the lightguide comprises materials that guide the light from a lamp along the optical cavity between the faces of the lightguide. The output surface of the lightguide permits light to leave the optical cavity when it is incident on the output surface at certain angles. In various backlight implementations, it may be beneficial to use a lightguide having non-structured surfaces or prism surfaces in conjunction with compatible recycling films to more closely match the light source exit distribution and the optimal incident angle range of the films.

As illustrated in FIGS. 32-34, the microstructures 3112, 3113, 3114 of the lightguides 3102, 3103, 3104 comprise a series of ridges and grooves formed by a plurality of parallel triangular prisms. The prism axes 3190 of the lightguide prisms may be oriented at an angle or parallel with respect to the longitudinal axis 3195 of the lightguide. The prisms totally internally reflect light incident on the lightguide structured surface as the light is traveling along the optical cavity provided the light is incident on the structured surface within a predetermined angular range.

The lightguide prisms may be disposed on the reflective surface of the lightguide oriented away from the recycling films (FIG. 32) or may be disposed on the surface of the lightguide oriented toward the recycling prisms (FIGS.

33-34). Selection of one or more of the lightguide prism base angles and/or the lightguide prism apex angle may be used to shape the exit distribution of the lightguide.

In some embodiments, controlling the relationship between the recycling film optimal incident angle range and the exit distribution of the light source may involve changing the angle between the prism axes of the recycling films. FIGS. 35A and 35B illustrate recycling film configurations where the angle between the prism films is 90 degrees and 180 degrees, respectively. Note that in FIG. 35A, the prism axis 3510 of the first recycling film 3520 is at an angle of about 90 degrees with respect to the longitudinal axis 3590 of the light source and the prism axis 3511 of the second recycling film 3520 is oriented at an angle of about 0 degrees with respect to the longitudinal angle 3590 of the light source. In FIG. 35B, angle between the prism axes 3510, 3511 has been shifted to 180 degrees and the corresponding angles for the first and second prism films 3520, 3525 with respect to the longitudinal axis 3590 of the light source are 45 degrees and 225 degrees, respectively.

FIG. 36 illustrates the effect of changing the angle between the prism films on the optimal incident angle range. With the index of refraction held constant, the center of the optimal incident angle regions are plotted for angles between the recycling films of 90, 120, 150, 165 and 180 degrees. As can be observed from this plot, the azimuth angle of the center point of the optimal incident angle range changes from 42.6 to 0 degree, and the inclination angle changes from 38.7 to 8.8 degree.

Figure 37:
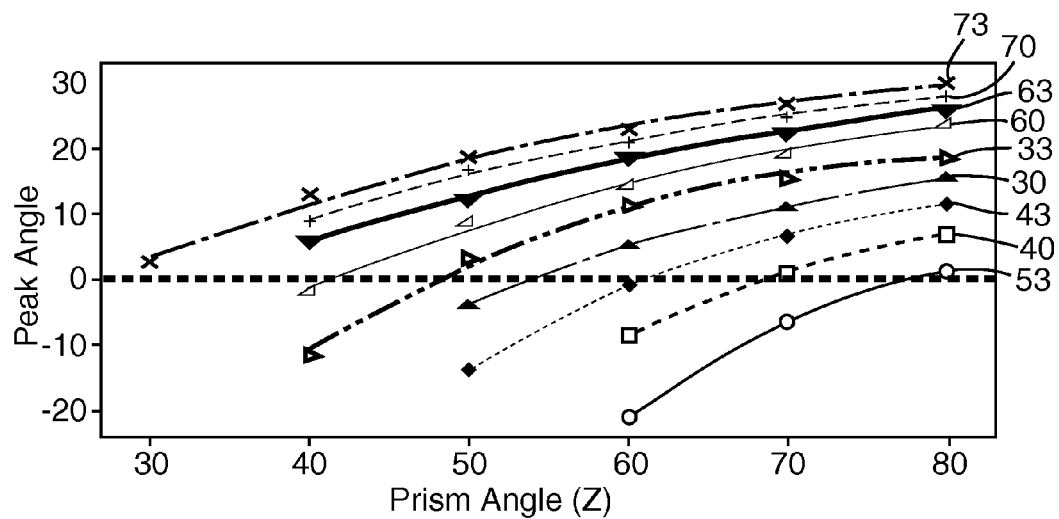
FIG. 37 provides graphs that illustrate the effect of varying the prism apex angle of the recycling films on the peak output angle of the backlight for various angles of light exiting the light source.

In some embodiments the optimal incident angle range of the recycling films may be shaped at least in part by appropriate selection of a combination of the index of refraction, the base angles of the recycling films, and the apex angle of the recycling film prisms. FIG. 37 provides a series of graphs that illustrate the effect of varying the prism apex angle of the recycling films on the peak output angle of the backlight for various angles of light exiting the light source. As can be discerned from the superimposed plots of FIG. 37, a peak output angle of 0 degrees, or other desired viewing angle, may be achieved by appropriate selection of the prism apex angle for different values of the light source exit angle.

Figure 38A:
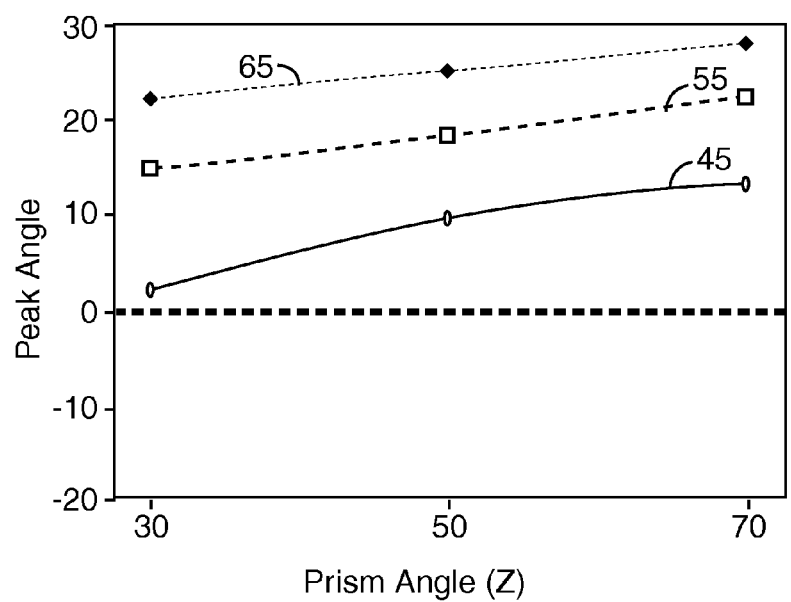
FIGS. 38A-38C provides graphs that illustrate the effect of varying both prism apex angle and refractive index of the recycling films on the peak output angle of the backlight.
Figure 38B:
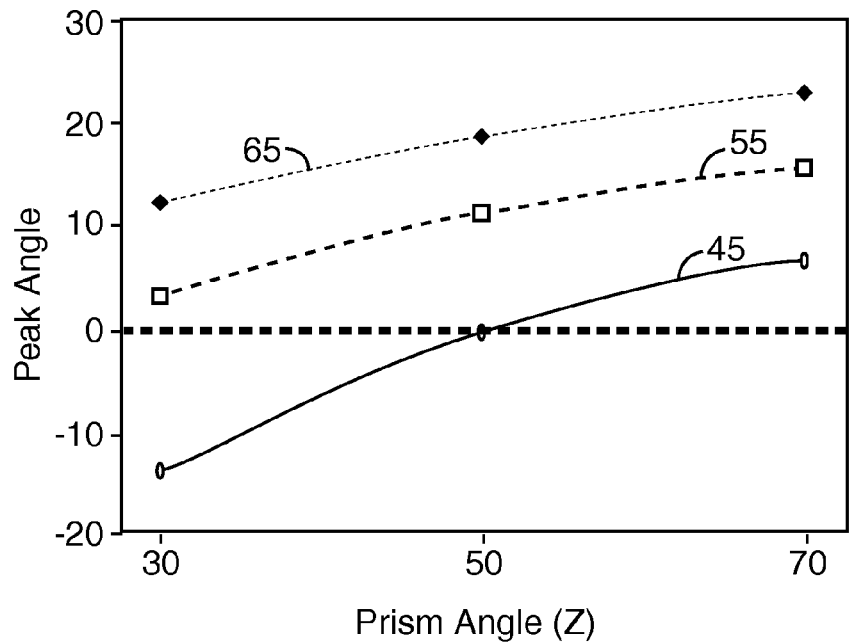
Figure 38C:
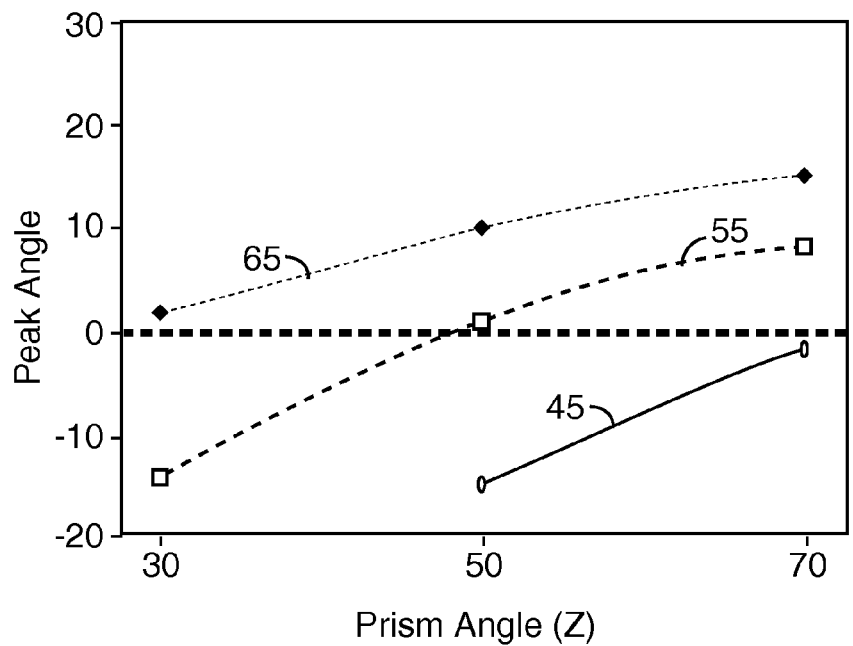

The graphs of FIGS. 38A-38C show the effect of varying both prism apex angle and refractive index of the recycling films on the peak output angle of the backlight. As may be appreciated from these Figures, consideration of both prism apex angle and refractive index is important in the determining a recycling film configuration for use with a light source having a particular exit distribution.

Figure 39:
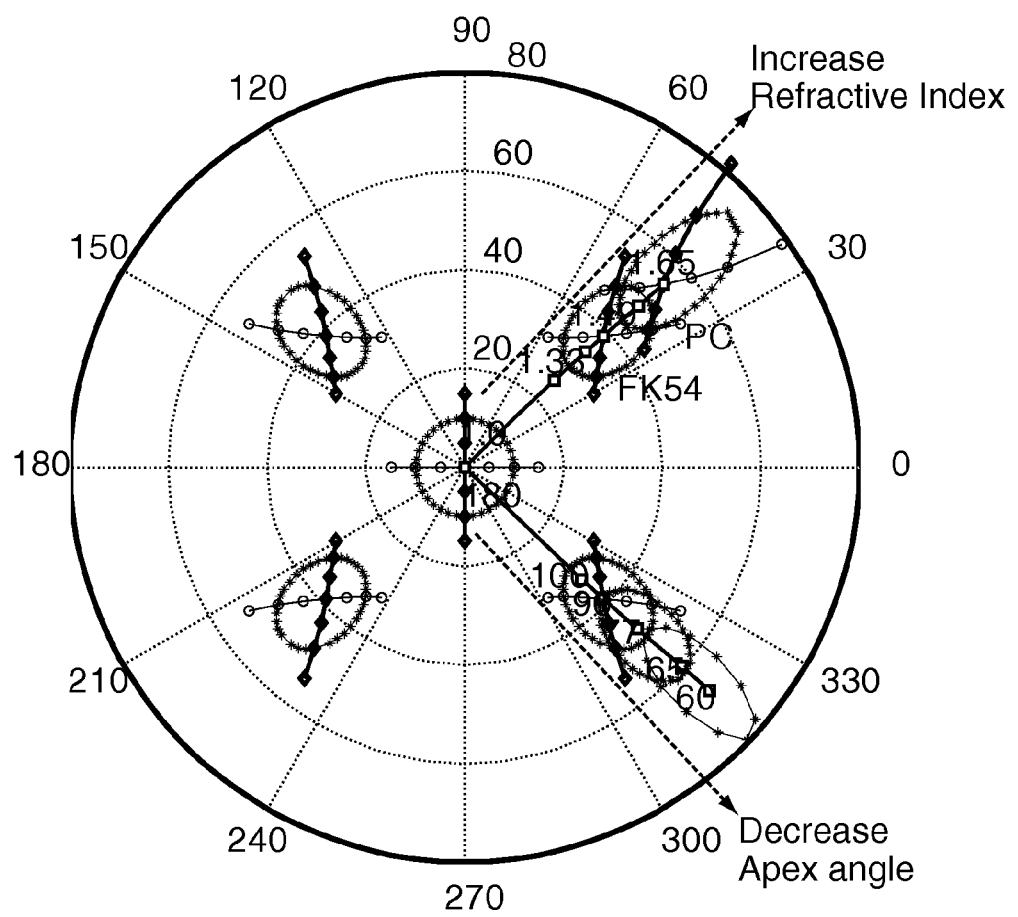
FIG. 39 is a conoscopic plot that illustrates the effects of refractive index and prism apex angle on the optimal incident angle range of the recycling film.

FIG. 39 is a conoscopic plot that illustrates the effects of refractive index and prism apex angle on the optimal incident angle range. The best input region for recycling films moves to edge of conoscopic plot as the refractive index of the recycling film is increased or the prism apex angle is decreased. Many lightguide light sources have angular exit regions on the edge of the conoscopic plot. Hence, increasing the index of refraction of the recycling films, e.g., to about 1.65 may provide a better match for light sources having exit distributions near the edges of the conoscopic plot. In addition, for the higher refractive indices the area of optimal incident angle region of the higher refractive index recycling films is larger, too. Due in part to better correspondence between the exit distribution of the light source and the optimal incident angle range of the recycling films, the light output from the backlight is increased when higher refractive index recycling films are used.

It is apparent from FIG. 39 that both the refractive index and the apex angle of the recycling films can change the optimal range of the recycling films. The conoscopic plot of FIG. 39 indicates that as the apex angle of the prism films is changed from 180 degrees to 60 degrees, the optimal incident angle changes from 0 to 67 degrees. The best incident regions are produced by apex angles of 77 degrees and 65 degrees as indicated in FIG. 39.

As the apex angle of the prisms of the recycling films is decreased, the best input region of the recycling films moves to the edge of the figure, which would normally match the light source exit regions. However, the area of the optimal incident angle range for 65 and 77 degree apex angle films is slightly smaller than the 90 degree regions.

According to Fresnel law, a larger incident angle would cause lower transmittance. However, the apex angle of the recycling films can not be decreased endlessly, and a recycling film with small apex angle does not always mean high gain. As previously discussed, the gain of the backlight depends on the interaction between components of the backlight system, in particular the output of the light source and the relationship between the angular exit distribution of the light source and the optimal incident angle range of the recycling films. Thus, recycling films having 90 degree prism apex angles, or any other apex angle, will likely not be optimal for all light sources. In order to achieve the best match between the light source with the recycling films, prism apex angles other than 90 degrees may be used for recycling films, such as 80 degree, 100 degree, or other prism apex angles.

Figure 40:
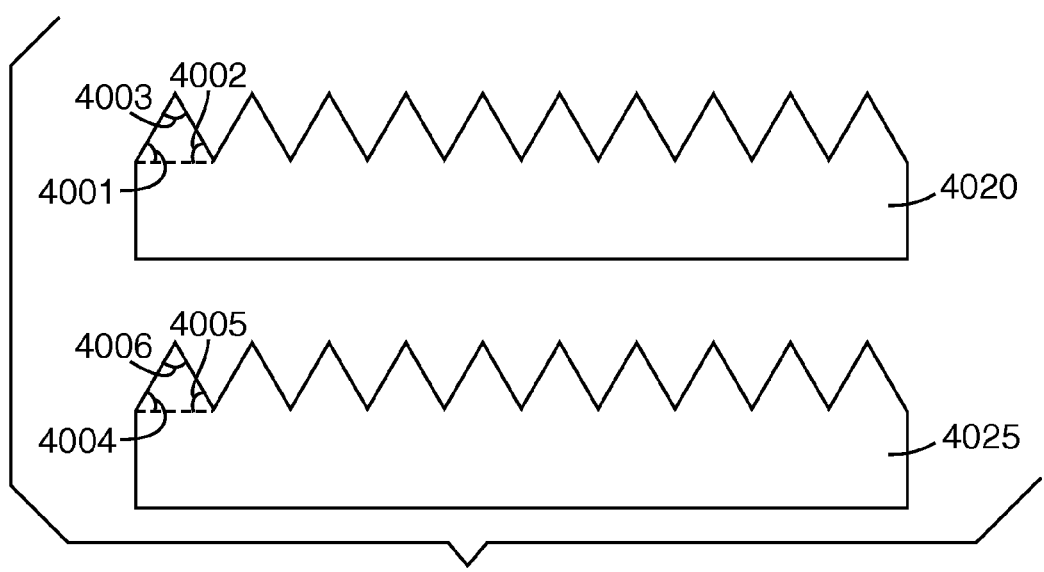
FIG. 40 provides a cross sectional view of two recycling films having prism axes that are substantially parallel.

FIG. 40 provides a cross sectional view of two recycling films 4020, 4025. The prism axes of the recycling films are substantially parallel in FIG. 40. The prisms of the recycling films each have two base angles and an apex angle. Modification of any of these angles causes the optimal incident angle regions of the films to shift and may be used to shape the input region.

Figure 41:
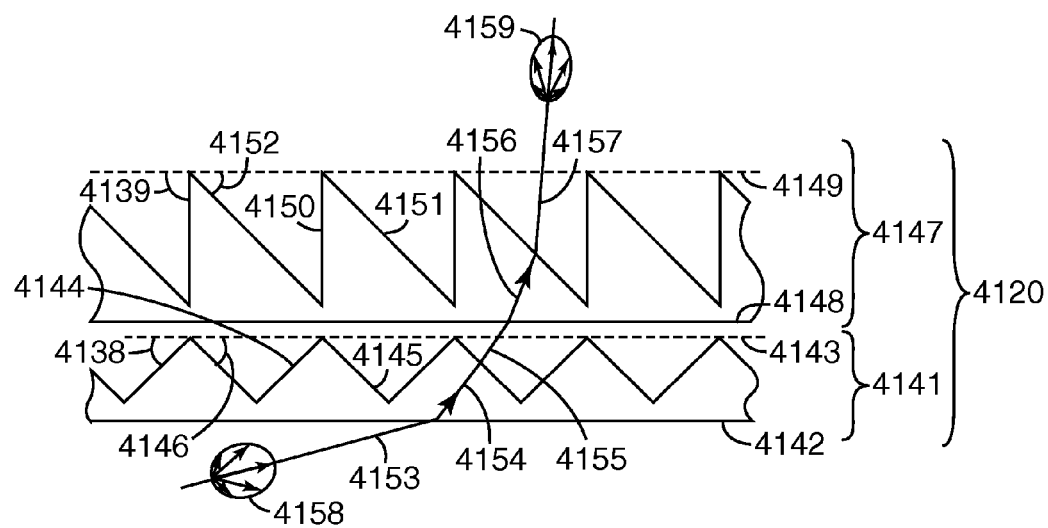
FIG. 41 is a diagram that illustrates the concept of shaping the input distribution of the films based on the prism angles in accordance with embodiments of the invention.

FIG. 41 illustrates the concept of shaping the input distribution of the films based on the prism angles. FIG. 41 shows an exemplary pair of films 4120. The films 4120 are shown in cross-section and extend into the plane of the page. A first film 4141 may be adjacent to and optionally spaced apart from a lightguide (not shown). The first film 4141 has a smooth side 4142 that faces the light guide, which may be considered locally flat to within typical manufacturing tolerances. The first film 4141 has a structured side opposite the smooth side 4142 that faces away from the light guide.

The structured side includes parallel, linear prisms, which may extend along all or a part of the display area. The prisms are formed at the intersection of near (or proximal) sides 4144 with far (or distal) sides 4145, where near and far are denoted with respect to the lamp (the leftmost edge of FIG. 41). The far sides 4145 form an angle 4146 with an imaginary plane 4143 that connects the peaks of the prisms on the structured side of the first film 4141. Similarly, the near sides form an angle 4138 with the imaginary plane 4143.

The second film 4147 is analogous in construction to the first film 4141, having a smooth side 4148 that faces the first film 4141, and a structured side opposite the smooth side 4148. The structured side of the second film 4147 also has parallel, linear prisms that may extend along all or a part of the display area, which are formed at the intersection of near sides 4150 and far sides 4151. The far sides 4151 form an angle 4152 with an imaginary plane 4149 that connects the peaks of the prisms on the structured side of the second film 4147. The near sides form an angle 4139 with the imaginary plane 4149.

The first and second films 4141 and 4147 may be spaced apart slightly in air, so that light does not couple from one film to the other without refracting. Alternatively, they may be in contact, with the imaginary plane 4143 essentially in contact with all or a portion of the smooth side 4148.

The prisms heights may be varied, as described in, for example, U.S. Pat. No. 5,771,328 and/or U.S. Pat. No. 6,354,709 both of which are incorporated by reference herein. Such prism height variation may reduce the quantity of light coupled between films without refraction.

An exemplary light ray is traced through the first and second films, and is labeled in FIG. 41 as elements 4153-4157 in the regions between refractions. Ray 4153 emerges from the light guide and strikes the smooth side 4142 of the first film 4141 at a relatively high angle of incidence (with respect to a surface normal at the smooth side 4142). The ray 4153 is refracted at the smooth side 4142 and is redirected along a direction that lies closer to the surface normal to form ray 4154. Ray 4154 propagates inside the first film 4141 from the smooth surface 4142 to the structured surface, and strikes the far side 4145 at a relatively low angle of incidence. Ray 4154 is then refracted at the interface of the far side 4145, and exits the first film 4141 as ray 4155. Ray 4155 propagates in air from the first film 4141 to the second film 4147, and strikes the smooth side 4148 of the second film 47 at a smaller angle of incidence than that formed by ray 4153 at smooth surface 4142. Ray 4155 refracts at the smooth surface 48 and propagates to the structured side of the second film 4147 as ray 4156. Ray 4156 strikes the far side 4151 of the second film 4147, refracts, and exits the second film 4147 as ray 4157 directed at the desired viewing angle.

The refraction angles at each interface are governed by Snell's Law, which states that the product of the refractive index and the sine of the refraction angle (with respect to the surface normal) is constant, before and after refraction. Before refraction, the refraction angle may be referred to as the incident angle, and after refraction the refraction angle may be referred to as the exiting angle. Rays are traced by subsequent applications of Snell's Law at each interface through the films. The refractive index of air is essentially 1.0.

The refractive index of the films depends on the film materials and may have any suitable value, typically between about 1.4 and about 2.0. For a typical material such as polycarbonate, the refractive index may be between about 1.57 and about 1.62. Alternatively, the film may be made from two different materials, where the prisms are made from one material, and the base film is made from another material. For instance, the prisms may be made from a UV-cured acrylic with a refractive index of about 1.58, and the base film may be made from a polyester with a refractive index of about 1.66. Other suitable materials may be used as well. The first and second films may or may not be made from the same material.

The precise angles 4146 and 4152 of the far sides 4145 and 4151 are typically chosen based on the refractive indices of the materials used for the films 4141 and 4147, and based on the properties of the emission from the light guide. The following raytrace is a specific example, and other refractive indices and angles may be used as well. A ray 4153 is assumed to exit the light guide at a propagation angle (with respect to the plane of the light guide) of 15 degrees. The ray 4153 strikes the smooth surface 4142 of the film 4141 at an incident angle of 75 degrees with respect to the surface normal. The refractive index of the film 4141 is taken to be 1.58. Ray 4153 refracts at the smooth surface and becomes ray 4154, which forms an exiting angle with respect to the smooth surface normal of about 38 degrees. The propagation angle of ray 4154 inside the film 4141 (with respect to the plane of the light guide) is about 52 degrees. The angle 4146 of the far side 4145 is chosen to be 45 degrees. The angle of incidence of ray 4154 with respect to the far surface 45 is about 7 degrees. Ray 4154 refracts at the far surface 4145 and becomes ray 4155. Ray 4155 exits the far surface 4145 with an angle of exitance with respect to the far surface 4145 of about 12 degrees. The propagation angle of ray 4155 (with respect to the plane of the light guide) is about 57 degrees. Ray 4155 strikes the smooth surface 4148 of the film 4147 with an incident angle of about 33 degrees with respect to the surface normal. The refractive index of the film 4147 is taken to also be 1.58. Ray 4155 refracts at the smooth surface 4148 to form ray 4156, which forms an exiting angle with respect to the smooth surface normal of about 20 degrees. The propagation angle of ray 4156 inside the film 4147 (with respect to the plane of the light guide) is about 70 degrees. The angle 4152 of the far side 4151 is chosen to also be 45 degrees. The angle of incidence of ray 4156 with respect to the far surface 4151 is about 25 degrees. Ray 4156 refracts at the far surface and becomes ray 4157. Ray 57 exits the far surface 4151 with an angle of exitance with respect to the far surface 4145 of about 41 degrees. The propagation angle of ray 4157 (with respect to the plane of the light guide) is about 86 degrees; ray 4157 is about 4 degrees from normal from the films 4120, and is directed toward the viewer. Note that tracing exemplary ray 4153 through the films 4120 involves little more than repeated applications of Snell's Law and attention to geometry. Other refractive indices and angles may be used as well.

The above methodology may be used to show that the range of angles becomes compressed as rays propagate through the films 4141 and 4147. Defining the propagation angle with respect to the plane of the backlight (or, equivalently, the imaginary planes 4143 and 4149), propagation angles of rays at various locations throughout the films 20 are considered. Initially the propagation angle of ray 4153 is considered to be 15 degrees+/−1.0 degrees, where the 1.0 degrees will give us an indication of the size of the angular range as the ray propagates. The value of 15 degrees may be considered a primary propagation angle, and the 1.0 degrees may be considered an angular beam width. Note that the actual illumination from the light guide 15 may contain significantly more angles than the 15 degrees+/−1.0 degrees considered here; in this example, we limit the width to +/−1.0 degrees for simplicity.

Tracing rays through the films, we find that ray 4154 has a propagation angle of about 52 degrees+/−0.2 degrees. Ray 4155 has a propagation angle of about 57 degrees+/−0.3 degrees. Ray 4156 has a propagation angle of about 70 degrees+/−0.2 degrees. Ray 4157 has a propagation angle of about 86 degrees+/−0.4 degrees. Compare the range of 1.0 degrees for the incident rays to 0.4 degrees for the exiting rays; a significant reduction is seen. In other words, the exiting angular range 4159 is less than the incident angular range 4158. This implies that more rays are directed toward near-normal exitance toward the viewer, resulting in a greater apparent brightness for near-normal viewing, and a desirably more sharply peaked brightness distribution from the point of view of the viewer.

Although the above example uses far surface angles 4146 and 4152 of 45 degrees, other values may be used, such as any value in the range of 40 to 50 degrees, the range of 35 to 55 degrees, or the range of 30 to 60 degrees. The far surface angles 4146 and 4152 may or may not be equal to each other.

Note that having different far surface angles implies that the propagation angles of the rays through the films may be different than the numerical values of the preceding example. In general, typical values of the propagation angles for ray 4153 may be 5 degrees to 25 degrees, for ray 4155 may be 45 to 65 degrees, and for ray 4157 may be 80 to 100 degrees. These values are not to be considered limiting, and are merely exemplary.

The near surface angles 4138 and 4139 do not play a role in determining the exiting angles of rays 4153-4157 in FIG. 41, which refract at the air/film interfaces and are transmitted to the viewer without any reflections. However, the near surface angles 4138 and 4139 do affect the amount of light that is reflected by the films 4141 and 4147 and returned toward the light guide. Such returned light is "recycled", and is preferably re-reflected toward the films 4120 until it is transmitted to the viewer. The angular criteria for the eventual transmission of such light is in part determined by the angles 4138, 4139, 4146 and 4152 of the prisms in the films 4141 and 4147. This "recycling" of light helps make the backlight output more uniform over its area, which is quite desirable. "Recycled" light can come from Fresnel reflections, scatter, or reflecting polarizers.

For instance, a fraction of the total energy in ray 4153 will be reflected by surface 4142 by Fresnel reflections. Eventually, the redirected rays are transmitted to the viewer, after one or more reflections and/or redirections from the various components in the backlight; this is the "recycling" of light mentioned above.

For the film 4147, the near surface angle 4139 may function less to redirect light and more to simply "stay out of the way" of transmitted ray 4157. An exemplary near surface angle 4139 may be 90 degrees, or may be in the ranges of 80-90 degrees, 70-90 degrees, 80-100 degrees, 70-110 degrees, or any suitable range. As a practical matter, it may be difficult to manufacture a film having a near surface angle of greater than 90 degrees.

The films 4141 and 4147 are drawn in FIG. 41 as if the prisms in one film were parallel to the prisms in the other film. In practice, aligning the two films so that their prisms are truly parallel may lead to undesirable moiré effects. Introducing an angle between the prism axes of the films 4141, 4147 reduces moiré effects. An exemplary angle between prism axes sufficient to reduce moiré effects may be 5 degrees in either direction.

For the films 4141 and 4147, there are various ranges for the pitches of the prisms, or, equivalently, the peak-to-peak spacing of the prism elements. The pitch may be smaller than about 50 or 60 microns, so that the individual prism elements are not visible to the viewer. The other end of the range of pitches may be determined by efficiency issues. During the manufacturing process, there may be rounding of the peaks of the prisms, with a radius on the order of 1 micron or more. This rounding is largely independent of the pitch. As the pitch is made smaller, the effects of the rounding become more prevalent, and show up as a loss in efficiency at very small pitches. As a result, the pitch may be made larger than about 5 microns to avoid losses in efficiency caused by the rounding. A useful range of pitches is about 5 microns to about 60 microns, although other ranges may be used. The pitches of the films 4141 and 4147 may be equal or may be unequal, although unequal pitches may further reduce undesirable moiré effects. In addition, the pitch of one film 4141 or 4147 may be unequal to an integral multiple of the pitch of other film, in order to further reduce undesirable moiré effects. Furthermore, the pitch of one film 4141 or 4147 may be unequal to a rational fraction of the pitch of other film (such as 2/5, or 7/4), in order to further reduce undesirable moiré effects. For the purposes of this document, a rational fraction is said to have a numerator and a denominator that are both integers between 1 and 20.

In various embodiments, one or more characteristics of the recycling films may be selected to move the optimal incident angle range of the films toward the exit distribution of the light source. For example, one or more of the prism index, the prism apex angle, angle between prism axes (denoted bias angle), and/or the symmetry or asymmetry of the prisms may be altered to control the overlap between the optimal incident angle range of the prism films and the exit distribution of the light source. The effect of these recycling film parameters on the optimal incident angle of the recycling films has been assessed using reverse ray trace modeling.

Figure 42:
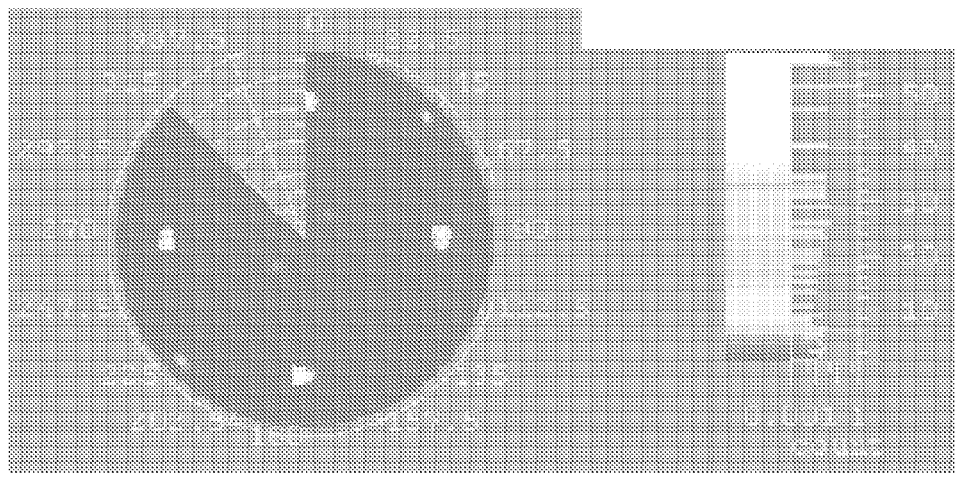
FIG. 42 is a conoscopic plot showing four well defined regions of light received by the detector below the crossed prism films for the reverse ray trace model.

The model used to evaluate the prism refractive index included crossed 45/135 recycling films having a substrate thickness of 0.1 mm, prisms having a 90 degree apex angle, and a prism pitch of 0.05 mm. The prism axis of the top film is oriented at 45 degrees and the prism axis of the bottom film is oriented at an angle of 135 degrees. The light source used in the reverse ray tracing was a narrow cone having a 2 degree full with aimed normal to the films. The light source above the crossed films covered the full spatial extent of the system and the detector was oriented below the films. For this reverse ray trace model, the conoscopic plot, illustrated in FIG. 42, shows four well defined regions of light received by the detector below the crossed prism films. The four major regions of detected light are at azimuth angles of 0, 90, 180, and 270 degrees.

Figure 43:
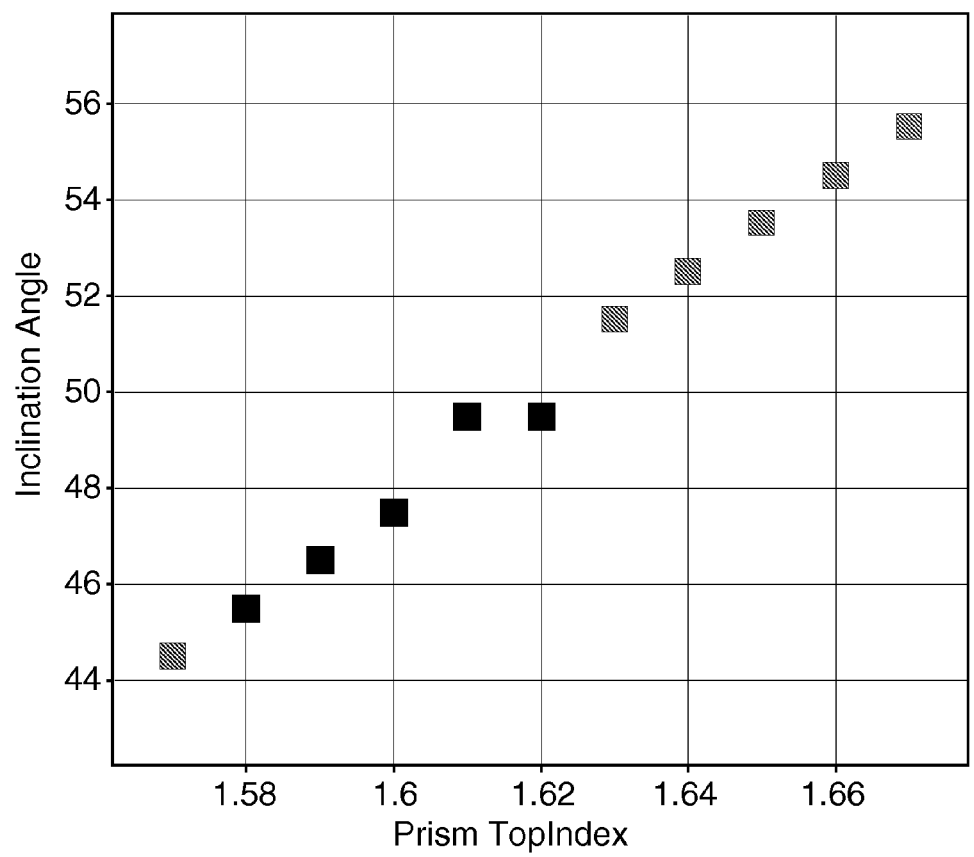
FIG. 43 is a plot of the optimal inclination angle of crossed prism films with respect to prism index.

The inclination angle of light received by the detector was determined as prism refractive index was altered in the model. FIG. 43 illustrates the change in the inclination angle of the light being received by the detector vs. prism index. These inclination angles are interpreted as the optimal incident inclination angle for the crossed prism film system for the prism index given the parameters listed above. For example, for a prism index of 1.57, the optimal incident inclination angle is about 44.5 degrees. The transmitted intensity for each inclination angle, prism index coordinate as determined by the reverse ray trace varied.

The ideal incident inclination angle for crossed prism films having the above-listed characteristics generally increases significantly with increasing prism index. The transmitted intensity and total transmitted flux generally decrease with increasing prism index.

Figure 44:
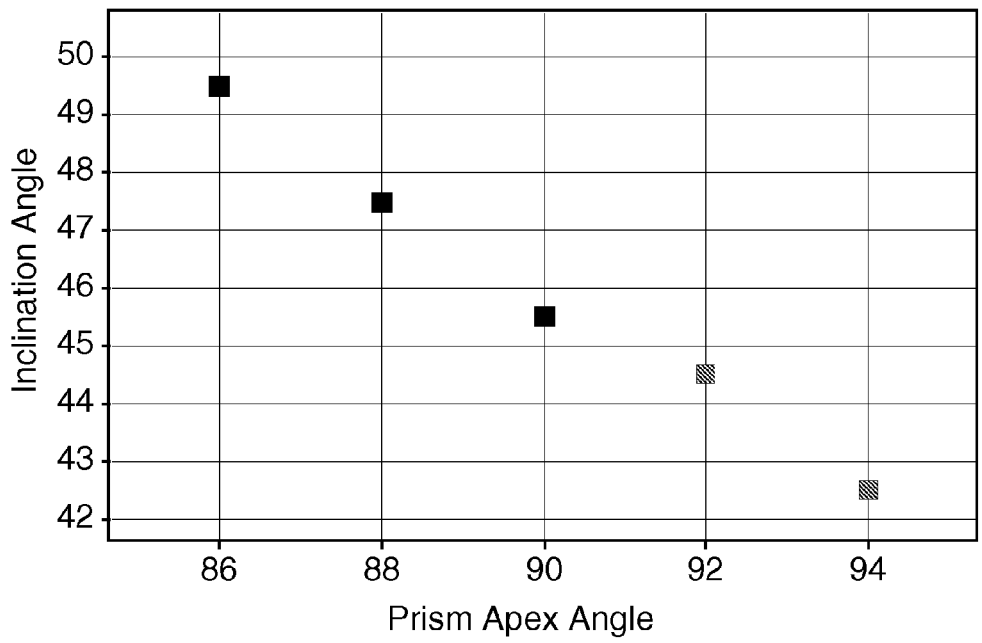
FIG. 44 is a plot of optimal inclination angle of crossed prism films with respect to prism apex angle.

Reverse ray trace modeling was used to evaluate the effect of prism apex angle on the optimal incident inclination angle. The model included crossed 45/135 recycling films having a refractive index of 1.58, a substrate thickness of 0.1 mm, and a prism pitch of 0.05 mm. Again, the light source used in the reverse ray tracing was a narrow cone having a 2 degree full with aimed normal to the films. FIG. 44 illustrates the change in inclination angle as the apex angle of the prisms was modified. The labels for each coordinate indicate the intensity at the detector. The optimal incident inclination angle for the crossed recycling films for this set of parameters generally decreases significantly with increasing prism apex angle. The transmitted intensity generally decreases with increasing prism angle.

Figure 45:
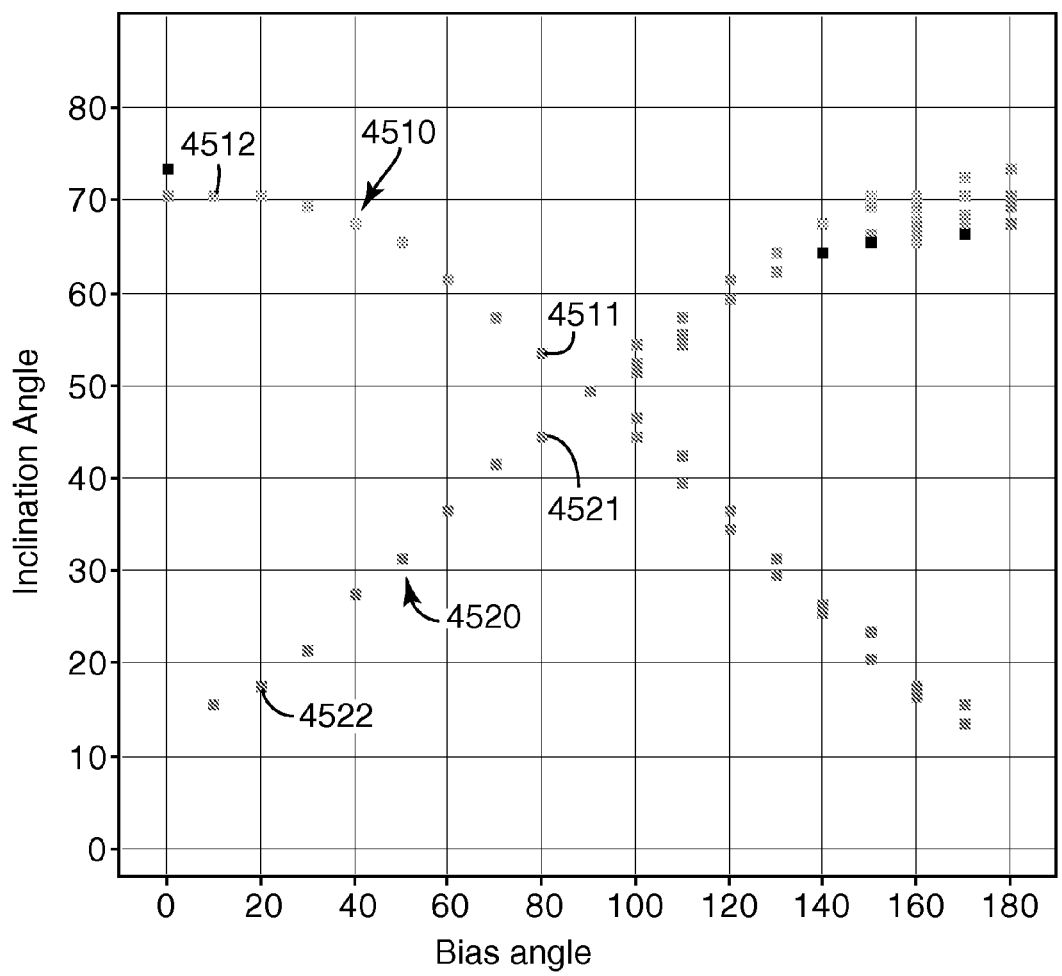
FIG. 45 is a plot of optimal inclination angle of crossed prism films with respect to bias angle.

Reverse ray trace modeling was used to evaluate the effect of the angle between the prism axes (bias angle) of the crossed prism films on the optimal input angle. The model included recycling films having a refractive index of 1.58, a substrate thickness of 0.1 mm, a refractive index of 1.58, and a prism pitch of 0.05 mm. FIG. 45 illustrates the change in the optimal incident input angle as the angle between the prism films is varied.

FIG. 45 depicts curves 4510 and 4520 which illustrate the change in the optimal incident inclination angle for two regions of the output. For example, point 4511 of curve 4510 represents the optimal incident inclination angle of a first region for a bias angle of 80 degrees. Point 4511 corresponds to the top-most incident angle region of FIG. 42. Point 4521 of curve 4520 represents the optimal incident inclination angle of a second region for a bias angle of 80 degrees.

Figure 46:
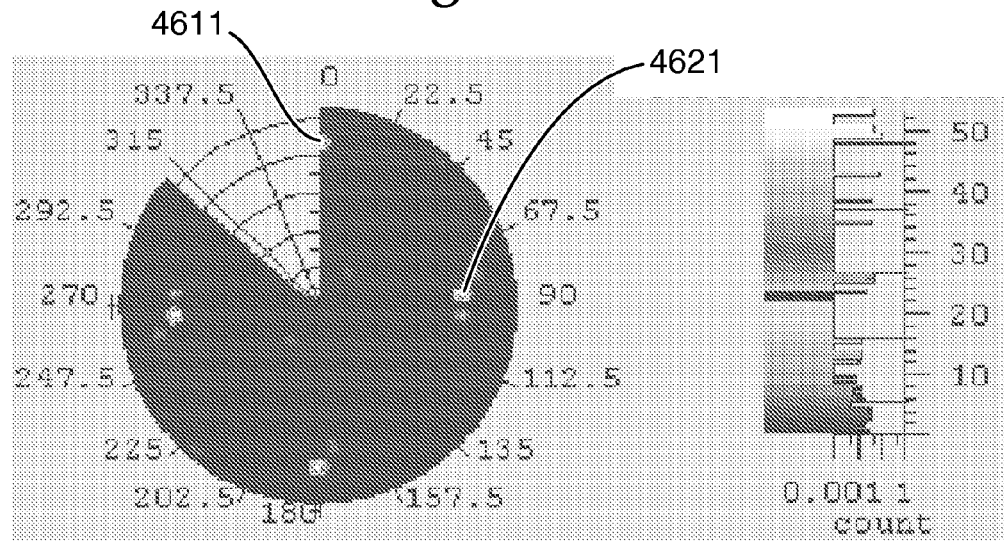
FIG. 46 shows a conoscopic plot of the optimal incident angles for crossed recycling films arranged with a bias angle of 80 degrees.
Figures 47, 48:
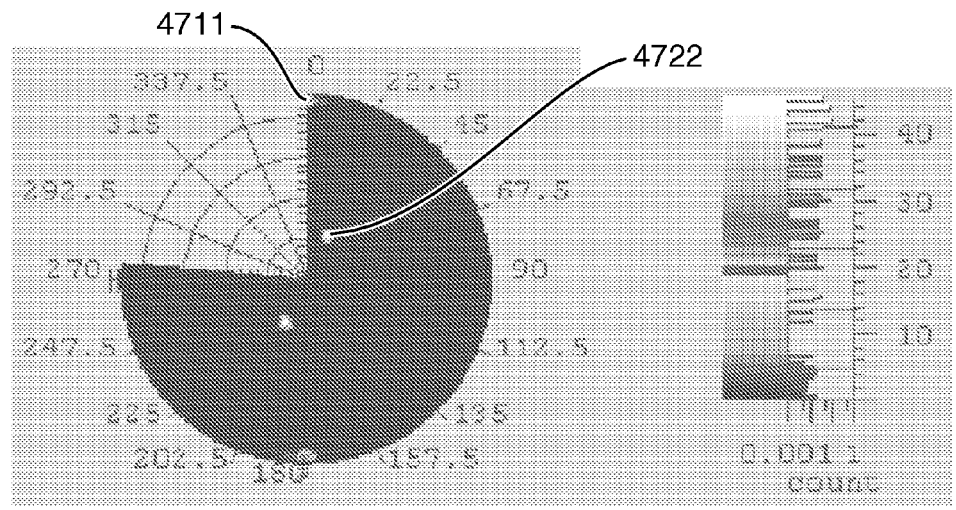
FIG. 47 shows a conoscopic plot of the optimal incident angles for crossed recycling films arranged with a bias angle of 10 degrees.
FIG. 48 shows a portion of a conoscopic plot illustrating the change in optimal incident angle as the angle of one prism facet is varied.

The conoscopic plot of FIG. 46 represents data from the chart of FIG. 45 at an 80 degree bias angle. As the bias angle is varied, the inclination and azimuth angles of the optimal incident angle also vary. The conoscopic plot of FIG. 47 illustrates the output for a bias angle of 10 degrees. Comparing FIGS. 47 and 46, with reference to FIG. 45, the top-most region 4611 shown in FIG. 46 (corresponding to point 4511 of FIG. 45) has moved to region 4711 having azimuth angle close to 0 degrees and an inclination angle of about 70 degrees in FIG. 47 (corresponding to point 4512 of FIG. 45). The region 4621 to the right in FIG. 46 (corresponding to point 4521 in FIG. 45) has moved to region 4722 having azimuth angle of close to 0 degrees and an inclination angle of about 15 degrees in FIG. 47 (corresponding to point 4522 in FIG. 45).

When the bias angle is near 90 degrees, the ideal incident inclination angles are near 45 degrees. When the bias angles are near 0 or 180 degrees, i.e., close to parallel, there are two major intensity peaks, one with a large ideal inclination angle and the other with a significantly smaller inclination angle. Generally, the intensity of the reverse ray trace peaks are greater at the lower optimal incident angles.

Reverse ray trace modeling was applied to determine the effect of asymmetric prisms. In this analysis the facet angle of one side of the prisms was varied. FIG. 48 shows a portion of the conoscopic plot indicating the change in the optimal incident angle as the prism facet is varied. In this example, the prism index is 1.58. Facet angles on one side are fixed at 45 degrees as measured from the major plane of the film. Facet angles on the other side of the prism are variable. The labels corresponding to the points of FIG. 48 are the variable facet angles.

As the facet angle of one side increases, the included angle decreases and the optimal incident inclination angle increases, but the intensity tends to decrease slightly. Generally, the intensity of the reverse ray trace peaks are greater at the lower optimal incident inclination angles.

The various embodiments described herein relate to approaches for achieving a desirable amount of overlap between the exit distribution of the light source and the optimal incident angle range of recycling films in a backlight system. For example, enhanced brightness of the backlight along a desired viewing angle may be achieved by matching the angular exit distribution of the backlight light source with the optimal angular input distribution of the recycling films. Shaping the exit distribution and/or the optimal range may be implemented through design or selection of various components of the backlight system. As described herein, the shape of the exit distribution of the light source may be controlled based on the selection or design of the characteristics or components of the backlight system. The components or characteristics may include, for example, the backlight reflector, the lightguide, diffuser, recycling films, and/or other backlight components. The examples provided herein are not the only approaches to shape the exit and input distributions, but are examples used to illustrate the fundamental concept of matching the backlight components to achieve enhanced brightness along the viewing angle. Any of these light distribution shaping techniques may be used alone, or may be used in conjunction with one or more other distribution shaping techniques. Backlight designs drawn from the exemplary embodiments may be used to achieve a maximum brightness or maybe used to achieve a predetermined ratio of light that exits the backlight on first-pass to light that is recycled in order to achieve both enhanced brightness and the superior defect hiding capabilities provided by light recycling.

Figure 49:
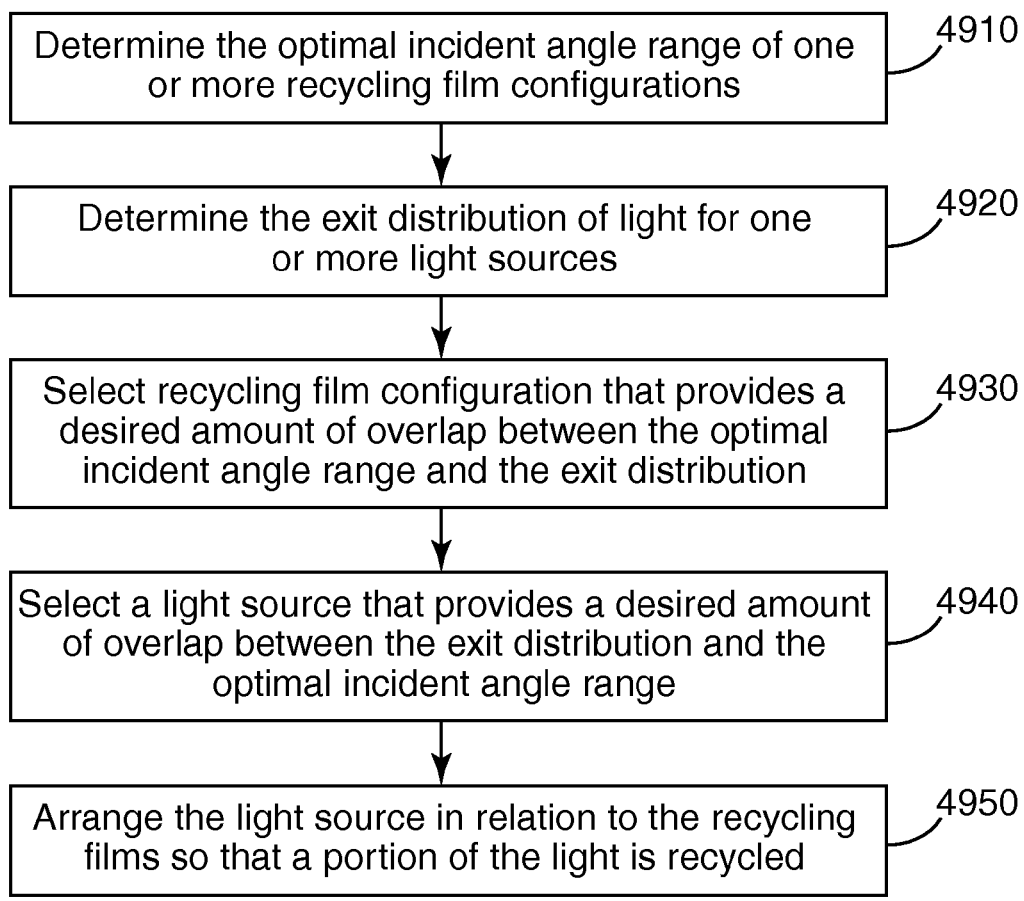
FIG. 49 is a flow diagram of a method of making a backlight in accordance with embodiments of the invention.

FIG. 49 illustrates a process of making a backlight in accordance with embodiments of the invention. The steps of the process are not constrained to any particular order and not all the steps need to be performed for every embodiment.

The optimal incident angle range of each recycling film configuration of a plurality of one or more recycling film configurations is determined 4910. A recycling film configuration may involve particular characteristics or orientations of recycling films. Alternatively or additionally, the exit distribution for each light source of a plurality of light sources is determined 4920. In some embodiments, a recycling film configuration is selected 4930 because the characteristics or recycling film orientation of the arrangement provide or facilitate a desired amount of overlap between the optimal incident angle range and the exit distribution. In some embodiments, one or more light source characteristics or components are selected 4940 because the light source components or characteristics provide or facilitate a desired amount of overlap between the exit distribution and the optimal incident angle range. In some embodiments, both one or more recycling film configurations and/or characteristics and one or more light source components and/or characteristics are selected to provide the desired amount of overlap. Any configuration, characteristic and/or component of the light source and/or recycling films that shifts the light source exit distribution and/or shifts the optimal incident angle range to provide or facilitate achieving the desired overlap may be selected. For example, any combination of light source and/or recycling films, including any of the components, characteristics or configurations described herein may be selected to achieve the desired overlap between the light exit distribution and the optimal incident angle range.

The selected light source and the selected recycling film configuration are arranged 4950 in the backlight so that the recycling films recycle a portion of the light from the light source.

FIGS. 50-53 are block diagrams of exemplary devices incorporating displays having backlights in accordance with embodiments of the present invention. In addition to the exemplary devices described below, many other applications for displays incorporating backlights as described herein exist and will be readily apparent to the skilled practitioner. The systems illustrated in FIGS. 50-53 may be used, for example, with any configuration of brightness enhancement films described herein.

Figure 50:
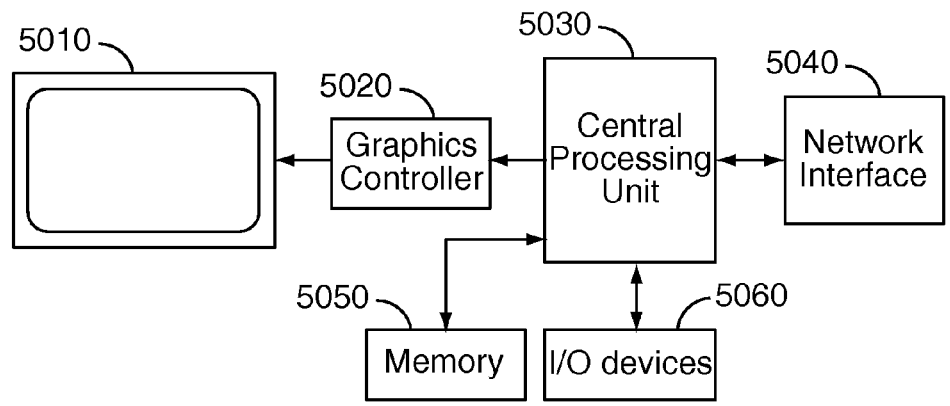
FIG. 50 shows basic components of a tablet, laptop, or desktop computer having a monitor that incorporates a backlight in accordance with embodiments of the invention.

FIG. 50 shows basic components of a tablet, laptop, or desktop computer having a monitor that incorporates one or more optical films as described in the examples provided above. The computer includes a central processing unit 5030 coupled to an input device 5060 such as a keyboard, mouse, joystick or other pointing device. Memory storage 5050 may include RAM, ROM, disc drives or flash memory modules which can be used for program and/or data storage. A graphics controller 5020 controls an LCD or other type of display 5010 incorporating one or more optical films in accordance with embodiments of the present invention. Network connectivity for the computer may be provided through a wired or wireless network module 5040.

Figure 51:
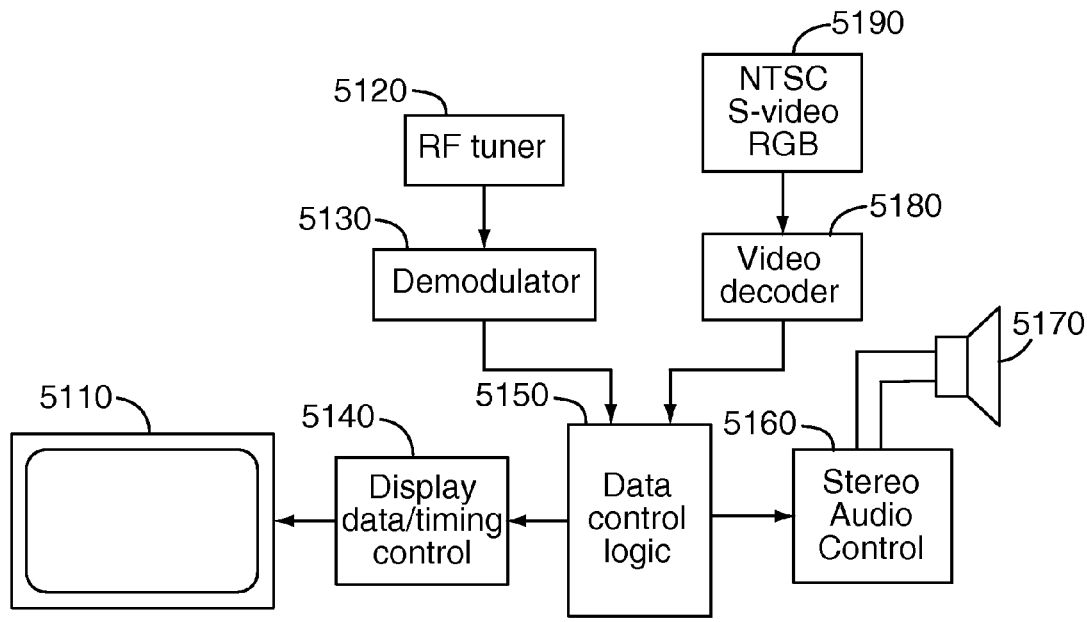
FIG. 51 illustrates a block diagram of a television using a backlight in accordance with various embodiments of the invention.

FIG. 51 illustrates another application for a display incorporating one or more of the optical films illustrated in various embodiments herein. A television may include RF and video input modules 5120, 5190. The RF tuner 5120 is coupled via a demodulator 5130 to television data and control logic 5150. Additionally, or alternatively, video input in formats such as NTSC, S-video, RGB and/or other video formats is decoded by video decoder 5180 and presented to the data/control logic 5150. Audio control circuitry 5160 is used to present audio information via speakers 4470. Video is presented on a display 5110 constructed in accordance with various embodiments described herein under control of a display data/timing module 5140.

Figure 52:
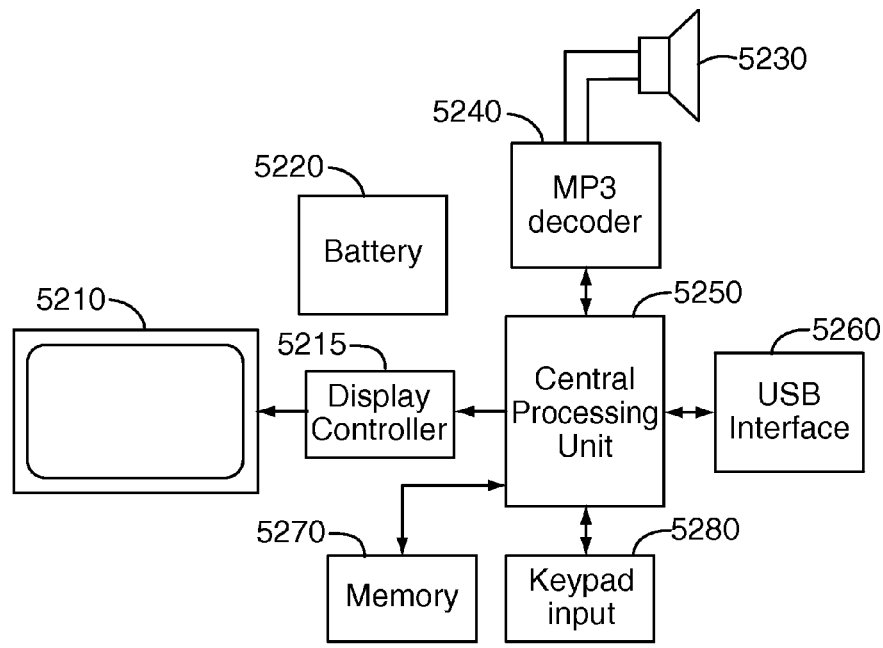
FIG. 52 is a block diagram of a handheld MP3 player that includes a display using a backlight fabricated in accordance with embodiments of the invention.

FIG. 52 is a block diagram of a handheld MP3 player that includes a display 210 using one or more optical films fabricated in accordance with embodiments of the invention. The MP3 player is controlled by a central processing unit (CPU) 5250. Under control of the CPU 5250, data stored in MP3 format in memory 5270 is decoded via an MP3 decoder 5240. The MP3 decoder 5240 produces an output used to drive speakers or headphones 5230. The CPU 5250 presents graphics or text images on the display 5210 and receives input from a user via keypad 5280. The MP3 player may also include a USB, Bluetooth, or other wired or wireless interface 5260 to connect to a computer or other device. Power to the MP3 player is supplied by a battery 5220.

Figure 53:
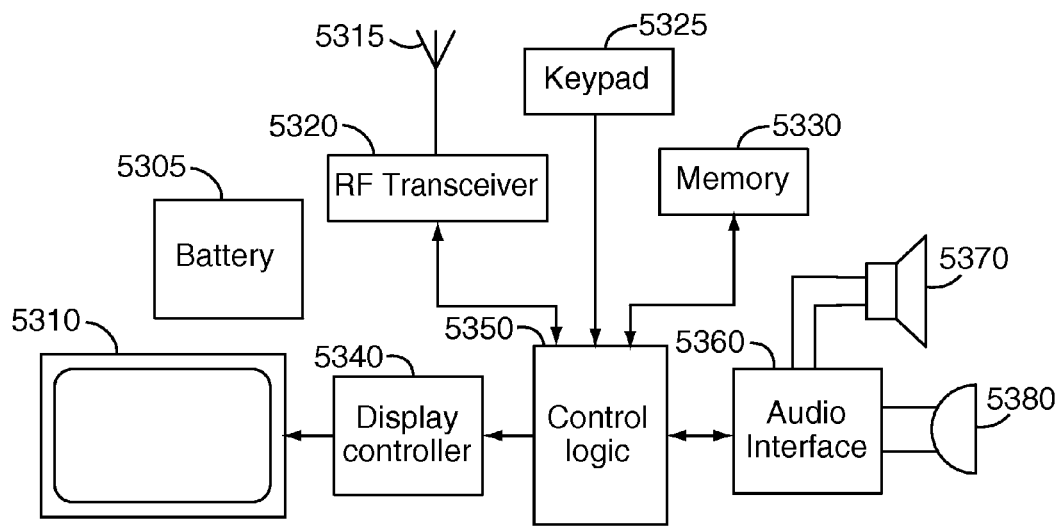
FIG. 53 provides a block diagram of a cellular telephone incorporating a display having a backlight constructed in accordance with embodiments of the invention.

A cellular telephone incorporating a display in accordance with embodiments of the invention is illustrated in FIG. 53. The cellular telephone includes an RF transceiver 5320 coupled to an antenna 5315 configured to transmit and receive data and control signals to and from a base station operating in a cellular network. Data received via the transceiver 5320 is demodulated and converted to audio via the cell phone controller circuitry 5350. Voice data is presented to a user through an audio interface 5360 coupled to a speaker 5370. A microphone 5380 transduces voice to electrical signals which are then further processed by the transceiver 5320 prior to output via the antenna 5315. The cellular telephone includes a display 5310, e.g., an LCD display, having one or more optical films as described herein. Information is presented to a user on the display 5310 through an LCD controller 5340. The cellular telephone receives input from the user through a keypad 5325 and may also have memory 45330 for storing user information. The cellular telephone is powered by a rechargeable battery 5305.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A backlight, comprising:
   a light source configured to generate light, the light exiting the light source having an angular exit distribution; and
   one or more light recycling prism films having prism peaks oriented away from the light source, the recycling films having a range of optimal incident angles that allows non-recycled light to exit from a plane of the recycling films within a desired range of output angles, and wherein one or more components of the light source are configured to preferentially shape the exit distribution of the light source to control overlap between the exit distribution of the light source and the optimal incident angle range of the recycling films, wherein the one or more components of the light source comprise a specular reflector, and the light source comprises a light guide arranged between the specular reflector and the recycling films.

2. The backlight of claim 1, wherein one or more components of the light source are configured to preferentially shape the exit distribution of the light source to provide an amount of recycled light relative to an amount of non-recycled light.

3. The backlight of claim 1, wherein the one or more components of the light source are configured to preferentially shape the exit distribution of the light source to increase the overlap between the exit distribution of the light source and the optimal incident angle range of the recycling films.

4. The backlight of claim 1, wherein one or more characteristics of the recycling films are configured to preferentially shape the optimal incident angle range of the films to increase the overlap between the exit distribution and the optimal input distribution.

5. The backlight of claim 4, wherein:
   the one or more light source components are configured to shift the exit distribution of the light source toward the optimal incident angle range of the films; and
   the one or more characteristics of the recycling films are configured to shift the optimal incident angle range toward the exit distribution of the light source.

6. The backlight of claim 1, wherein the specular reflector comprises a structured surface including angled reflective features.

7. The backlight of claim 1, wherein:
   the specular reflector comprises triangular features having apex angles of about 150 degrees; and
   the recycling films comprise at least one recycling film having prisms with apex angles of about 90 degrees.

8. The backlight of claim 1, wherein:
   the one or more components comprise a specular reflector having structured features, the structured features including triangular features having one or more interior angles of about 20 degrees; and
   the recycling films comprise one prism film oriented at about 45 degrees with respect to a feature axis of the specular reflector and another prism film oriented at about 135 degrees with respect to a feature axis of the specular reflector.

9. The backlight of claim 1, wherein the specular reflector comprises:
   a microstructured substrate; and
   a reflective layer disposed on the microstructured substrate.

10. The backlight of claim 1, wherein the reflective layer comprises a thin film polymeric layer laminated to the substrate.

11. The backlight of claim 1, wherein the specular reflector comprises a layer of prisms.

12. The backlight of claim 1, wherein the specular reflector comprises:
   a reflective substrate;
   a prism film; and an adhesive between the reflective substrate and the prism film.

13. The backlight of claim 12, wherein the reflective substrate comprises a polymeric film.

14. The backlight of claim 12, wherein a prism axis of the prism film is disposed substantially perpendicular to a longitudinal axis of the light guide.

15. The backlight of claim 12, wherein the prisms of the prism film are asymmetric.

16. The backlight of claim 1, wherein the lightguide comprises a tapered light guide having a microstructured surface.

17. The backlight of claim 1, wherein:
an index of refraction of at least one of the recycling films is greater than 1.6; and
the one or more components of the light source comprise a diffuser having a haze characteristic between about 70% and about 90%.

18. A backlight, comprising:
a light source configured to generate light, the light exiting the light source having an angular exit distribution; and
one or more light recycling prism films having prism peaks oriented away from the light source, the recycling films having range of optimal incident angles that allows non-recycled light to exit from a plane of the recycling films within a desired range of output angles, wherein one or more characteristics of the recycling films are configured to preferentially shape the optimal incident angle range of the recycling films to control overlap between the exit distribution of the light source and the optimal incident angle range of the recycling films, wherein the one or more components of the light source comprise a specular reflector, and the light source comprises a light guide arranged between the specular reflector and the recycling films.

19. The backlight of claim 18, wherein the one or more characteristics of the recycling films comprises a refractive index of the recycling films.

20. The backlight of claim 18, wherein the one or more characteristics of the recycling films comprises a prism apex angle of the recycling films.

21. The backlight of claim 18, wherein the one or more characteristics of the recycling films comprises an angle between prism axes of the recycling films.

22. The backlight of claim 18, wherein the one or more characteristics of the recycling films comprises an angle between one or both of the recycling films relative to a longitudinal axis of the light source.

23. A backlight, comprising:
a light source comprising:
a light guide; and
a gain diffuser having microstructured features oriented toward the light guide; and
one or more light recycling prism films having prisms oriented away from the light guide, wherein the gain diffuser is configured to shape an exit distribution of light exiting the light source so that the exit distribution overlaps, at least in part, a range of optimal incident angles of the recycling films, the optimal incident angle range allowing non-recycled light to exit from the backlight within a preferred range of output angles.

24. The backlight of claim 23, wherein the one or more recycling films have a refractive index of about 1.6.

25. The backlight of claim 23, wherein:
a prism axis of one of the recycling films is oriented at an angle of 45 degrees relative to a longitudinal axis of the light guide; and
a prism axis of another of the recycling films is oriented at an angle of 135 degrees relative to the longitudinal axis of the light guide.

26. The backlight of claim 23, wherein an apex angle of prisms of the one or more recycling films is about 90 degrees.

27. A method of directing light through a backlight that includes a light source and one or more recycling films, the method comprising:
generating light using the light source, the light source associated with an angular exit distribution;
directing the light through the backlight via the one or more prism recycling films, the one or more recycling films associated with a range of optimal incident angles, wherein directing the light comprises one or both of:
controlling the exit distribution of the light source toward the optimal incident angle range of the recycling films; and
controlling the optimal incident angle range of the recycling films toward the exit distribution of the light source;
passing a first portion of the light through the recycling films without recycling, the first portion of light emerging from the backlight at an angle that falls within the optimal angular input range of the recycling films; and
recycling a second portion of the light.

28. The method of claim 27, wherein controlling the exit distribution of the light source comprises controlling the exit distribution using one or more of a gain diffuser, a specular reflector, a light guide having a microstructured surface, and diffuser selected haze and transmission parameters.

29. The method of claim 27, wherein controlling the exit distribution of the light source comprises controlling the exit distribution using a gain diffuser having a microstructured surface oriented away from the recycling films.

30. The method of claim 27, wherein controlling the optimal incident angle range of the recycling films comprises controlling the optimal incident angle range using one or more of a refractive index of the recycling films, an apex angle of the recycling films, an angle between prism axes of the recycling films, an angle between at least one of the recycling films and a longitudinal axis of the light source.

31. The method of claim 27, wherein controlling the exit distribution and controlling the optimal incident angle range comprises increasing an overlap between the exit distribution and the optimal incident angle range.

32. A method of making a backlight that includes a light source and one or more light recycling prism films, the method comprising:
characterizing backlight components, comprising one or both of:
determining an exit distribution of light exiting the light source; and
determining an optimal incident angle range of the recycling films that allows the light to pass through the recycling films without recycling;
selecting backlight components to control an overlap between the exit distribution and the optimal incident angle range, selecting the backlight components comprising one or both of:

selecting one or more light source components that provide a desired amount of overlap between the exit distribution and the optimal incident angle range; and selecting one or more characteristics of the recycling films that provide the desired amount of overlap between the exit distribution and the optimal incident angle range; and arranging the light source in relation to the recycling films so that prism peaks of the recycling films are oriented away from the light source.

33. The method of claim 32, wherein:

selecting the light source components comprises selecting a gain diffuser having a microstructured surface; and arranging the light source in relation to the recycling films comprises orienting the microstructured surface of the gain diffuser away from the recycling films.

34. The method of claim 32, wherein selecting the light source components comprises selecting a specular reflector having characteristics that enhance overlap between the exit distribution and the optimal incident angle range.

35. The method of claim 32, wherein the characteristics of the specular reflector that enhance overlap between the exit distribution and the optimal incident angle range comprise microstructures.

36. The method of claim 32, wherein the selecting the light source components comprises selecting a diffuser having characteristics that enhance overlap between the exit distribution and the optimal incident angle range.

37. The method of claim 32, wherein selecting the light source components comprises selecting light source components that increase a region of the exit distribution to encompass one or more regions of the optimal incident angle range.

38. The method of claim 32, wherein selecting the light source components comprises selecting light source components that shift the exit distribution towards the optimal incident angle range.

39. The method of claim 32, wherein selecting the characteristics of the recycling films comprises selecting a prism apex angle of the recycling films.

40. The method of claim 32, wherein selecting the characteristics of the recycling films comprises selecting a refractive index of the recycling films.

41. The method of claim 32, wherein selecting the characteristics of the recycling films comprises selecting an angle between prism axes of the recycling films.

42. The method of claim 32, wherein selecting the characteristics of the recycling films comprises selecting an angle between a prism axis of at least one of the recycling films and a longitudinal axis of the light source.

43. The method of claim 32, wherein selecting the characteristics of the recycling films comprises selecting characteristics that shift the optimal incident angle range toward the exit distribution.

44. The method of claim 32, wherein selecting the characteristics of the recycling films comprises selecting characteristics that increase or decrease the optimal incident angle range.

45. The method of claim 32, wherein:

characterizing the backlight comprises characterizing both the light source and the recycling films; and selecting the backlight components comprises selecting components of the light source and characteristics of the recycling films.

* * * * *